235-412
SR
XR 2,538,253
SEARCH ROOM
NO XR

Jan. 16, 1951 E. LAKATOS ET AL 2,538,253

ARTILLERY COMPUTER

Filed Dec. 29, 1944 19 Sheets-Sheet 1

INVENTORS E. LAKATOS
H. G. OCH
BY W. Dawson
ATTORNEY

Jan. 16, 1951 E. LAKATOS ET AL 2,538,253

ARTILLERY COMPUTER

Filed Dec. 29, 1944 19 Sheets-Sheet 2

INVENTORS E. LAKATOS
BY H. G. OCH

W. L. Dawson

ATTORNEY

SEARCH ROOM

Jan. 16, 1951 E. LAKATOS ET AL 2,538,253

ARTILLERY COMPUTER

Filed Dec. 29, 1944 19 Sheets-Sheet 3

INVENTORS E. LAKATOS
H. G. OCH

BY W. R. Dawson

ATTORNEY

SEARCH ROOM

INVENTORS E. LAKATOS
H. G. OCH
BY
W. A. Dawson
ATTORNEY

SEARCH ROOM

INVENTORS E. LAKATOS
H. G. OCH
BY W. L. Dawson
ATTORNEY

INVENTORS E. LAKATOS
H. G. OCH
BY W. L. Dawson
ATTORNEY

ARTILLERY COMPUTER

Filed Dec. 29, 1944 19 Sheets-Sheet 7

INVENTORS
E. LAKATOS
H. G. OCH
BY
W. H. Dawson
ATTORNEY

SEARCH ROOM

INVENTORS E. LAKATOS
H. G. OCH
BY
W. H. Dawson
ATTORNEY

SEARCH ROOM

INVENTORS E. LAKATOS
H. G. OCH
BY
W. H. Dawson
ATTORNEY

SEARCH ROOM

INVENTORS E. LAKATOS
H. G. OCH
BY W. A. Dawson
ATTORNEY

INVENTORS E. LAKATOS
H. G. OCH
BY W. H. Dawson
ATTORNEY

Jan. 16, 1951 E. LAKATOS ET AL 2,538,253

ARTILLERY COMPUTER

Filed Dec. 29, 1944 19 Sheets-Sheet 12

INVENTORS E. LAKATOS
H. G. OCH

BY W. L. Dawson

ATTORNEY

INVENTORS E. LAKATOS
H. G. OCH
BY
W. Dawson
ATTORNEY

Jan. 16, 1951 E. LAKATOS ET AL 2,538,253

ARTILLERY COMPUTER

Filed Dec. 29, 1944 19 Sheets-Sheet 14

INVENTORS E. LAKATOS
H. G. OCH
BY
W. Dawson
ATTORNEY

INVENTOR E. LAKATOS
H. G. OCH
BY W. L. Dawson
ATTORNEY

INVENTORS E. LAKATOS
H. G. OCH
BY
W. Dawson
ATTORNEY

INVENTORS E. LAKATOS
H. G. OCH
BY W. Dawson
ATTORNEY

Jan. 16, 1951 E. LAKATOS ET AL 2,538,253

ARTILLERY COMPUTER

Filed Dec. 29, 1944 19 Sheets-Sheet 18

INVENTORS E. LAKATOS
H. G. OCH
BY W. Dawson
ATTORNEY

FIG. 29

RELAY OPERATION TABLE

| | CAM SWITCHES | | | | RELAYS | | | | | | | | X CARDS | | | BRUSH | | Y CARDS | | | BRUSH | |
|---|---|---|---|---|---|---|---|---|---|---|---|---|---|---|---|---|---|---|---|---|---|---|
| AFI | 541 | 542 | 543 | 544 | 421 | 422 | 423 | 424 | 425 | 426 | 427 | 428 | 545 | 549 | 546 | 551 | 552 | 547 | 550 | 548 | 553 | 554 |
| 0 | R | O | O | O | R | O | O | O | R | O | R | O | - | - | + | G | - | - | + | + | G | + |
| 2 | R | O | R | O | R | O | R | O | R | O | O | O | - | - | + | + | - | + | + | + | + | + |
| 45 | O | O | R | O | O | O | R | O | R | O | O | O | - | + | + | + | - | + | + | + | + | + |
| 88 | O | O | R | R | O | O | R | R | R | O | O | R | - | + | + | + | - | + | + | - | + | + |
| 90 | O | O | R | R | O | O | R | R | R | O | O | R | - | + | + | + | G | + | + | - | + | G |
| 92 | O | O | O | R | O | O | O | R | O | O | O | R | + | + | + | + | + | + | + | - | + | - |
| 135 | O | R | O | R | O | R | O | R | O | O | O | R | + | + | + | + | + | + | - | - | + | - |
| 178 | O | R | O | O | O | R | O | O | O | R | O | R | + | + | - | + | + | + | - | - | + | - |
| 180 | O | R | O | O | O | R | O | O | O | R | O | R | + | + | - | G | + | + | - | - | G | - |
| 182 | O | R | R | O | O | R | R | O | O | R | R | R | + | + | - | - | + | - | - | - | - | - |
| 225 | R | R | R | O | R | R | R | O | O | R | R | R | + | - | - | - | + | - | - | - | - | - |
| 268 | R | R | R | R | R | R | R | R | O | R | R | O | + | - | - | - | + | - | - | + | - | - |
| 270 | R | R | R | R | R | R | R | R | O | R | R | O | + | - | - | - | G | - | - | + | - | G |
| 272 | R | R | O | R | R | R | O | R | R | R | R | O | - | - | - | - | - | - | - | + | - | + |
| 315 | R | O | O | R | R | O | O | R | R | R | R | O | - | - | - | - | - | - | + | + | - | + |
| 358 | R | O | O | O | R | O | O | O | R | O | R | O | - | - | + | - | - | - | + | + | - | + |
| 360 | R | O | O | O | R | O | O | O | R | O | R | O | - | - | + | G | - | - | + | + | G | + |

INVENTORS E. LAKATOS
H. G. OCH
BY W. Dawson
ATTORNEY

Patented Jan. 16, 1951

2,538,253

UNITED STATES PATENT OFFICE 2,538,253

ARTILLERY COMPUTER

Emory Lakatos, Summit, and Henry G. Och, Short Hills, N. J., assignors to Bell Telephone Laboratories, Incorporated, New York, N. Y., a corporation of New York Application December 29, 1944, Serial No. 570,283

6 Claims. (Cl. 235—61.5)

This invention relates to apparatus for the control of artillery fire and particularly to electromechanical artillery computers.

The object of the invention is an apparatus for the production of physical quantities proportional to the predicted changes in the coordinates of the position of a target during the time of flight of a projectile.

A feature of the invention is the provision of means for modifying the predicted changes, as based on the time of flight of the projectile, to account for the interaction on the time of flight of ballistic effects due to non-standard density of the air, muzzle velocity of the gun and temperature.

In prior electromechanical computers, the observations of the target controlled the generation of physical quantities varying in magnitude with the coordinates of the position of the target. From these physical quantities, other physical quantities were derived, varying in magnitude with the rates of change in the coordinates of the position of the target. The magnitudes of the latter quantities were then modified in accordance with the time of flight of the projectile as given in the firing tables for the gun and projectile, to produce quantities varying in magnitude with the predicted changes in the coordinates during the time of flight of the projectile.

In accordance with the present invention, the physical quantities, varying in magnitude with the rates of change in the coordinates of the position of the target, are modified in accordance with the normal time of flight of the projectile as given in the firing tables for the gun and projectile, and from these modified quantities, other quantities are derived varying in magnitude with the effects on the time of flight of non-standard density of the air, muzzle velocity of the gun and temperature. These other quantities are algebraically added to the modified quantities to produce quantities more accurately proportional to the predicted changes in the coordinates of the target.

In a specific embodiment of the invention the observations of the target control the generation of a first set of voltages varying in magnitude with the rectangular coordinates of the present position of the target. From this first set of voltages are derived a second set of voltages varying in magnitude with the rates of change of the first set of voltages for maximum time of flight of the projectile. This second set of voltages is fractionated proportionally to the normal time of flight of the projectile to produce a third set of voltages varying in magnitude with the normal predicted changes in the coordinates of the target, and is also fractionated proportionally to the air density, muzzle velocity and temperature to produce a fourth set of voltages. The fourth set of voltages is algebraically added to the third set of voltages to produce a set of voltages more accurately proportional to the predicted changes in the coordinates of the position of the target during the time of flight of the projectile.

In the drawings:

Fig. 1 schematically shows a system for transmitting data from the observing stations to the computer;

Fig. 2 schematically shows a system for generating voltages proportional to the coordinates of the present position of the target;

Fig. 3 schematically shows a system for synthetically generating voltages proportional to the coordinates of the present position of the target, or voltages proportional to the rates of change in said coordinates;

Fig. 4 schematically shows a system for indicating the present position of the target with respect to the gun, for generating voltages proportional to the rates of change in the coordinates, and voltages proportional to the coordinates of the predicted position of the target;

Fig. 5 schematically shows a system for indicating the azimuths and quadrant elevations of two guns, generating a voltage proportional to the range of the second gun, and generating voltages proportional to the maximum effects of the wind;

Fig. 6 schematically shows a system for indicating the deflection angle of a first gun, for generating voltages proportional to the range of the first gun, and for indicating the ballistic elevation angle of a second gun;

Figs. 7 and 8 schematically show a system for indicating the ballistic elevation angle of a first gun;

Figs. 9 and 10 show, in elevation and plan, the geometric relationships between the observation stations, target and guns;

Fig. 11 schematically shows a summing amplifier used in Figs. 1 to 8;

Fig. 12 schematically shows a control circuit used in Figs. 4, 5, 6, 8;

Figs. 13A to 13H schematically show a number of potentiometer networks;

Fig. 29 shows an operation table for the switches and potentiometers of Fig. 5 and the relays and amplifiers of Fig. 4.

The present director is primarily intended for the control of coast defense artillery, but the invention is not limited to such use, as it may be used in many other artillery directors in which unusual accuracy is required.

The largest coast defense weapons have ranges of twenty miles or more, thus, a target moving along the coast may be under observation for twenty to thirty miles on each side of the gun. A number of observation stations are distributed at convenient points along the coast and, as these stations may be more than twenty miles from the director, the transmission of the observed data from the observation stations to the director by the usual synchronous transmission systems, may be impractical. In the present system, the even degrees of azimuth or the hundreds of yards may be transmitted orally at regular intervals over a telephone system between the observing station and the director, while the fractional values of the data less than one degree or one hundred yards, are transmitted by a data transmission system of the type shown in United States Patent 1,483,235, February 12, 1924, R. V. Morse.

Figures 1, 30:
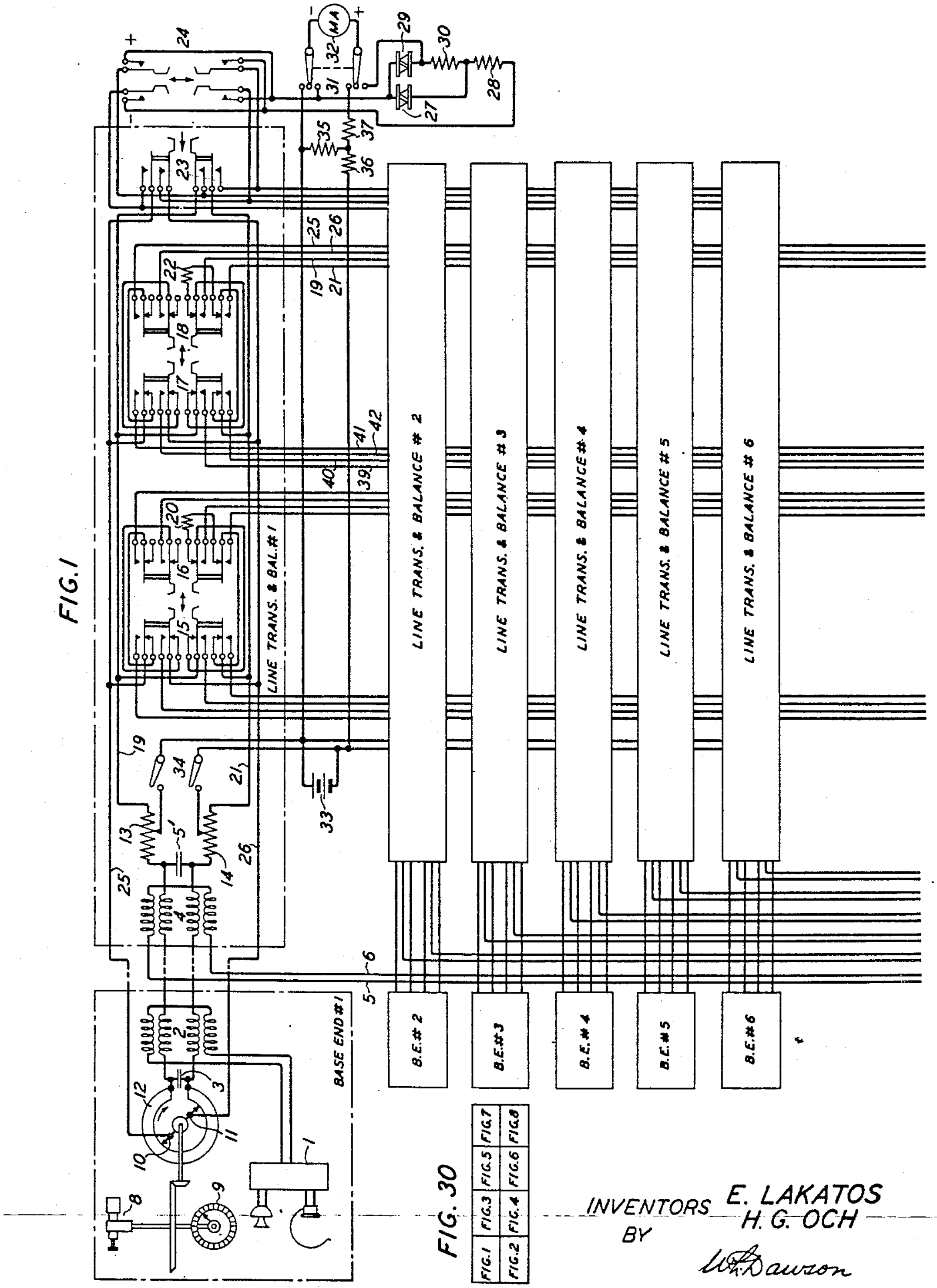

As shown in Fig. 1, each base end station is furnished with a telephone instrument 1 connected to the secondary winding of a composite coil 2 having line windings intercalated in series with the data transmission line. A capacitor 3 confines the telephone current to the transmission line. At the director, a similar composite coil 4 has line windings intercalated in the transmission line, in combination with a capacitor 5'. The secondary winding of composite coil 4 is connected by connection 5, 6 to a telephone switchboard 7, Fig. 2, located near the director. The switchboard operator and the fire control officer may convenienty be furnished with complete telephone instruments, while the director attendants may be furnished with headsets plugged into jacks mounted at convenient places on the director and connected to the telephone switchboard.

The majority of the observation stations are equipped with some known form of azimuth instrument, though some of the stations may be equipped with a known form of range finder, such as a depression position finder. The azimuth instruments, symbolically represented by the instrument 8, Fig. 1, may be simple theodolites arranged to indicate the whole degrees of the azimuth angle on a scale 9. Similarly, the depression position finders are equipped with convenient scales to indicate the range in even hundreds of yards. The brushes 10, 11 of the data transmitting potentiometer are rotated by a shaft geared to the shaft of the azimuth instrument 8 or to the range shaft of the depression position finder. If one complete rotation of the brushes 10, 11 represents one degree in azimuth, the gearing will have a step-down ratio of 1 to 360. Similarly, if the full range is 36,000 yards and one complete rotation of the brushes 10, 11 represents one hundred yards, the gearing for the range finder will have the same ratio as for the azimuth instrument.

The upper end of potentiometer winding 12 is connected through the upper line winding of transformer 2, one side of the transmission line, the upper line winding of transformer 4, the winding of a potentiometer 13, connection 19, the armature and break springs of the third pile-up of key 15, the armature and break springs of the third pile-up of key 16, resistor 20, the break spring and armature of the lowest pile-up of key 16, the break spring and armature of the lowest pile-up of key 15, connection 21, the winding of potentiometer 14, the lower line winding of transformer 4, the other side of the transmission line, and the lower line winding of transformer 2 back to the lower end of potentiometer winding 12. Connection 19 is also connected through the armature and break spring of the third pile-up of key 17, the armature and break spring of the third pile-up of key 18, resistor 22, the break spring and armature of the lowest pile-up of key 18, and the break spring and armature of the lowest pile-up of key 17 to connection 21. The near end of the transmission line is thus shunted by the two resistors 20 and 22 in parallel.

Connection 19 is also connected to the armature of the third pile-up of key 23. The make spring of the third pile-up of key 23 is connected to the armature of the upper right-hand pile-up of key 24. Similarly the connection 21 is connected to the armature of the lowest pile-up of key 23 and the make spring of this pile-up is connected to the armature of the lower right pile-up of key 24.

The brush 10 is connected by connection 25 to the armature of the upper pile-up of key 23, the make spring of this pile-up being connected to the armature of the upper left pile-up of key 24. Similarly the brush 11 is connected by connection 26 to the armature of the second pile-up of key 23, the make spring of this pile-up being connected to the armature of the lower left pile-up of key 24.

Thus, when the key 23 is operated, the brush 10, through the connection 25, and the upper end of the potentiometer winding 12 through the connection 19, are respectively connected to the armatures of the upper pile-ups of key 24. Similarly, the brush 11 through the connection 26 and the lower end of the potentiometer winding 12 through the connection 21, are connected to the armatures of the lower pile-ups of the key 24.

The upper right make springs and the lower left make springs of key 24 are connected through varistor 27 and resistor 28 to the upper left make and lower right make springs of the key 24. The varistor 27 is shunted by a second varistor 29 in series with a resistor 30. The varistors 27 and 29 may each comprise a pair of copper copper-oxide elements connected in opposing relationship. The lower make springs of key 31 are connected to the two sides of the varistor 29. A sensitive meter, such as a milliammeter, 32 is connected to the armatures of the key 31. The network formed by the varistors 27 and 29, and the resistors 28 and 30, protects the meter 32 from injury if too large a current should accidentally be applied to the meter 32.

A source of voltage 33 may be connected by switch 34 to the brushes of the potentiometers 13 and 14. The observation stations may be located at widely different distances from the director, thus, as disclosed in copending United States patent application Serial No. 451,857, filed July 22, 1942, by W. Koenig, Jr., now Patent No. 2,443,623 and assigned to the assignee of the present application, for accurate results, it is necessary to balance each of the transmission lines. Over the telephone the operator of the observing instrument is instructed to rotate the brush 10 to the upper end of the potentiometer winding 12. Key 31 is placed on the lowest contacts and key 23 is operated. Key 24 is then operated upward and the brush of potentiometer 13 is adjusted until the meter 32 indicates zero current. The operator of the azimuth instrument is then instructed by telephone to rotate the brush 11 to the lower end of the potentiometer winding 12, key 24 is operated downward, and the brush of potentiometer 14 adjusted until the meter 32 again registers zero. These adjustments are repeated until key 24 may be operated upward or downward without affecting the zero reading of meter 32. The transmission line and potentiometer winding 12 is then balanced against the resistors 20, 22.

The switch 31 may also be operated to the upper contacts so that the meter 32 in conjunction with the network formed by ~~the~~ resistors 35, 36 and 37 will form a voltmeter for checking the voltage of the source 33.

The meter key 24 is multiplied to all the line balance test keys, such as key 23 for each of the transmission lines to the other observation stations, and each of the other data transmission lines is balanced as described above for the data transmission line No. 1.

After the data transmission line has been balanced, the line transfer key 17 is operated connecting brush 10 and connection 25 through the make contacts of the upper pile-up to connection 41, connecting the upper end of the potentiometer winding 12 through the transmission line and connection 19 and the make contacts of the third pile-up to connection 39, connecting brush 11 and connection 26 through the make contacts of the second pile-up to connection 42 and connecting the lower end of the potentiometer winding 12 through the transmission line and connection 21 and the make contacts of the lower pile-up to connection 40. The operation of key 17 thus connects the data transmission line through connections 19 and 21 to the ends of the potentiometer winding 44, Fig. 2, and connects the brushes 10 and 11 through connections 41 and 42 through resistors 51 and 52 to the springs of the right-hand pile-up of relay 49, Fig. 2, and through the transient reducing capacitors 51′ and 52′ to ground. The brushes 45 and 46 are respectively connected through resistors 47 and 48 to the springs of the left-hand pile-up of relay 49, and through transient reducing capacitors 47′ and 48′ to ground. The armatures of relay 49 are respectively connected to the control grids of a double triode 50, the anodes of the vacuum tube 50 being energized by the grounded source of voltage 53. The control grids of vacuum tube 50 are respectively grounded through resistors 56 and 57. The cathodes of the vacuum tube 50 are respectively grounded through resistors 58 and 59, and are connected to the ends of the winding of potentiometer 54. A grounded source of voltage 55 has its negative pole connected to the brush of potentiometer 54, and a sensitive meter, such as a milliammeter 60 in series with a resistor 61 and shunted by a protective varistor 62 is connected in series with resistor 63 across the winding of potentiometer 54. The armature of relay 49 may be temporarily insulated from the make springs and grounded, then with equal voltages applied to the control grids of the vacuum tube 50, the brush of potentiometer 54 is adjusted until the meter 60 reads zero. Preferably the meter 60 is arranged to read zero at mid-scale. After this adjustment, if unequal voltages are applied to the grids of the vacuum tube 50, they will cause an amplified deflection of the meter 60. The vacuum tube 50, meter 60 and associated elements together form the differential electronic meter 43.

Figure 2:
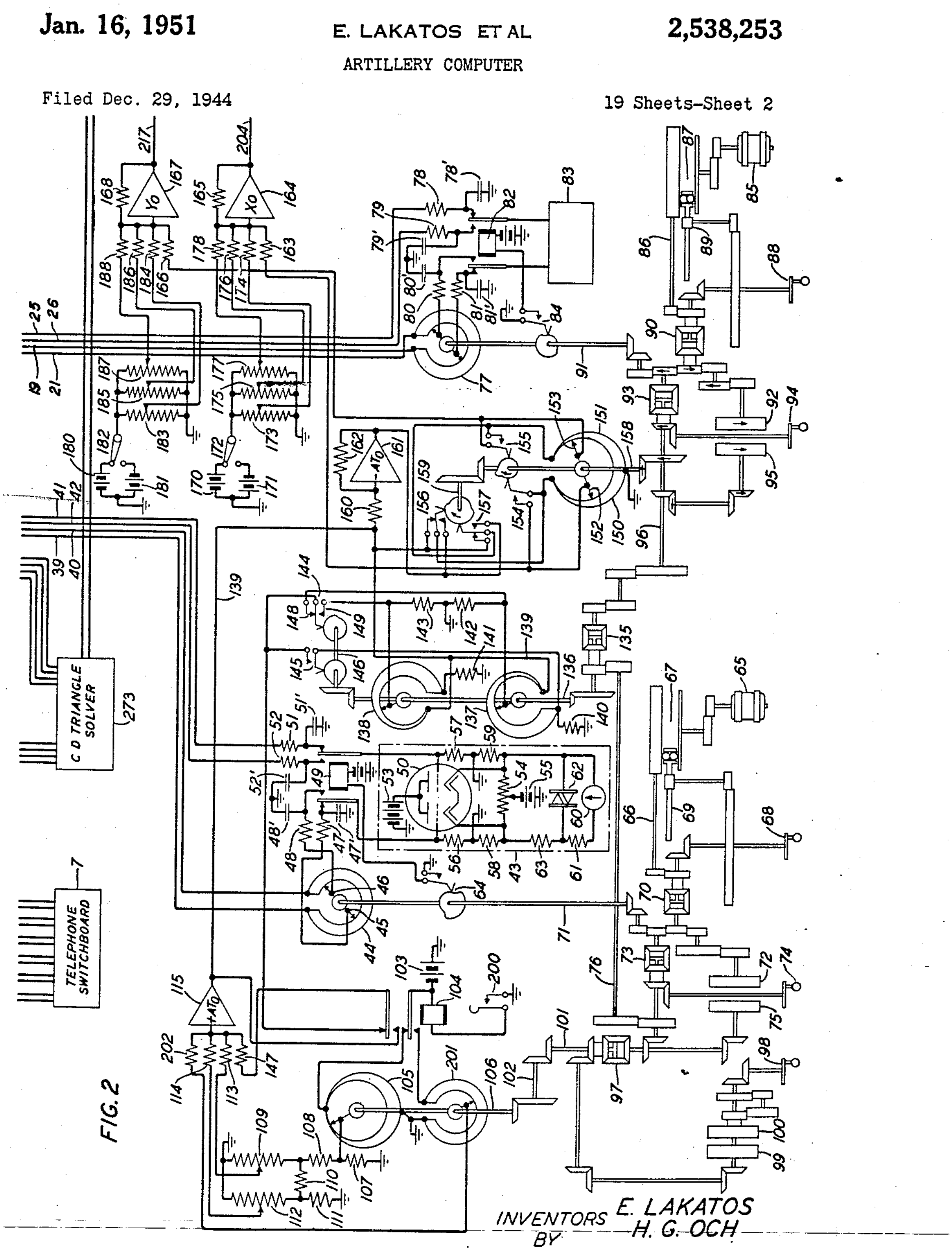

Thus when the relay 49 is in the non-operated state, the differential meter 43 indicates the difference in voltage between the wiper 10, Fig. 1, and the wiper 45, Fig. 2. When the brush 45 has rotated within one quarter of a revolution of the end of the potentiometer winding 44, the cam operated switch 64 operates relay 49, disconnecting brushes 10, Fig. 1, and 45, Fig. 2, from the differential voltmeter 43 and connecting brushes 11, Fig. 1, and 46, Fig. 2, to the differential voltmeter 43. Thus as only the voltages selected from the middle half of the potentiometer winding 44, Fig. 2, are supplied to the differential meter 43, there is no danger that lack of synchronism between the brushes of the transmitting and receiving potentiometers at the end of the potentiometer windings, could apply the full battery voltage to the differential meter 43.

The motor 65 drives the shaft 66 through a variable speed drive 67 which may be of the familiar disc, ball, and cylinder type, such as disclosed in United States Patent 1,448,490, March 13, 1923, to H. Moakley. The handwheel 68 is geared to the rack and pinion 69 controlling the speed ratio of the drive 67. The shaft 66 is geared to one pinion of a differential gear 70, the other pinion of the differential gear 70 being geared to the shaft 71 rotating the brushes 45 and 46. The handwheel 68 is also geared to the planet gears of the differential gear 70, so that, rotation of the handwheel 68 will change the speed of rotation of the shaft 71 and will also produce an angular displacement of the shaft 71. Thus as a rotation of the observing instrument 8, Fig. 1, changes the voltage selected by the brush 10 or 11, the operator manipulates the handwheel 68 changing the displacement and rate of rotation of the brushes 45 and 46 to keep the meter 60 reading zero, thus causing the shaft 71 to rotate in synchronism with the rotation of the observing instrument. The rotation of shaft 71 may conveniently be indicated on a dial 72 suitably geared to shaft 71.

The shaft 71 is also geared to one pinion of a differential gear 73, the other pinion being geared to a handwheel 74, the planet pinion being geared to a suitable dial 75. The operator manipulates the handwheel 74 to set in the whole degrees as received over the telephone, which are indicated on the dial 75. With the whole degrees set in by the handwheel 74, and the part of a degree set in by the rotation of the shaft 71, the shaft 76, which is geared to the planet gear of the differential 73, is rotated in accordance with the whole angle turned through by the observing instrument 8, Fig. 1.

Each of the data transmission lines is equipped with line balancing equipment and duplicates of the keys 15, 16, 17, 18 shown in Fig. 1, thus by the operation of the key corresponding to key 18, Fig. 1, the winding of the transmitting potentiometer at a second station may be connected through the transmission line and connections 19, 21 to the winding of potentiometer 77 and the brushes of the transmitting potentiometer may be respectively connected through connections 25, 26, and resistors 78, 79, Fig. 2, to the springs of the right-hand pile-up of relay 82, corresponding to relay 49, and through the transient reducing capacitors 78′, 79′ to ground. The brushes of potentiometer 77 are similarly connected through resistors 80 and 81, to the springs of the left-hand pile-up of relay 82; and through the transient capacitors 80′, 81′ to ground; the armatures of relay 82 being respectively connected to a differential voltmeter 83, similar to the differential voltmeter 43. The relay 82 is controlled by the cam-operated switch 84, in the same manner that relay 49 is controlled by the switch 64.

The motor 85 drives the shaft 86 through the variable speed drive 87 under the control of the handwheel 88 which adjusts the ball race of the variable speed drive 87 by means of the rack and pinion 89. The rotation of the shaft 86 and the rotation of the handwheel 88 are combined in the differential gear 90 and geared to drive the shaft 91, rotating the brushes of the potentiometer 77, and are also geared to rotate the dial 92. The whole degrees of rotation of the observing instrument at the second station, as received over the telephone, are set in by the handwheel 94 and combined in the differential gear 93 with the rotation of the shaft 91 to produce a rotation of shaft 96 proportional to the complete angle of rotation of the observing instrument at the second station, which is indicated on the dial 95.

Figure 10:
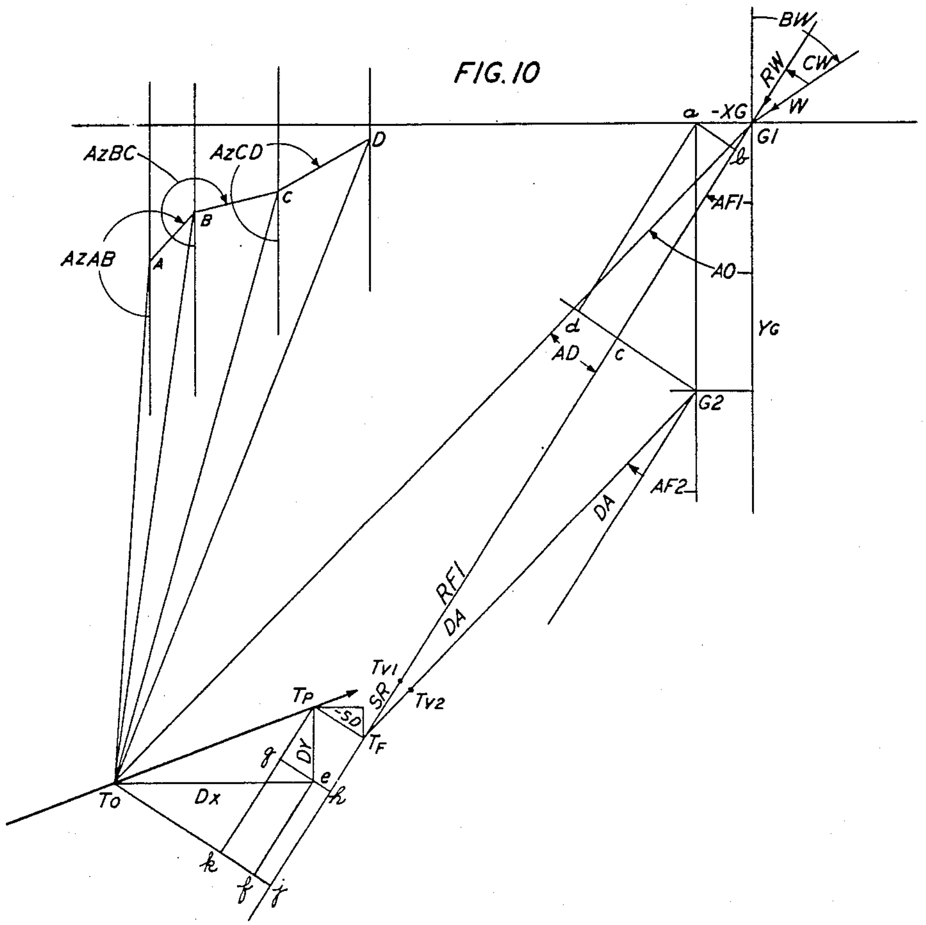

In Fig. 10 a target is moving at constant speed along a course from $T_0$ to $T_p$, and is under observation from two observing stations A and B at the ends of a known base line AB. Applying the rule of sines $$\frac{AT_0}{\sin ABT_0}=\frac{AB}{\sin AT_0B};\ AT_0=\sin ABT_0\times AB\times\frac{1}{\sin AT_0B}$$

Let $A_zAT_0$ be the azimuth of the target T with respect to the station A, $A_zBT_0$ be the azimuth of the target T with respect to the station B, and $A_zAB$ be the azimuth of the base line AB.

Then $$AT_0=AB\frac{\sin(A_zBT_0-A_zAB)}{\sin(-A_zAT_0+A_zBT_0)} \qquad (1)$$

In Fig. 2 the observation station B is connected to operate in conjunction with the receiving potentiometer 44, so that the shaft 76 rotates in accordance with the azimuth $A_zBT_0$. The shaft 76 is geared to one pinion of the differential gear 97. The handwheel 98 is geared to the other pinion of the differential gear 97 and is manipulated to set in the azimuth of the base line $A_zAB$, as indicated on the coarse dial 99 and the fine dial 100. The shaft 101 is connected to the planet gear of the differential 97 and will be rotated in accordance with the difference between the azimuth of the base line $A_zAB$ and the azimuth $A_zBT_0$, that is, in accordance with the angle $ABT_0$.

A grounded source of voltage 103 is connected through the break contact of a relay 104 to the winding of a potentiometer 105. The winding of potentiometer 105 may conveniently be in the form of a card of insulating material having one straight edge, closely and evenly wound with insulated wire, the wire being bared along the straight edge of the card in order to make a good contact with the potentiometer brush. The card is so shaped in width that the resistance of the potentiometer windings will have the desired variation in resistance. The potentiometer card is arranged on an arc of a circle concentric with the center of rotation of the brush.

The winding of potentiometer 105 has a sinusoidal variation of resistance and the brush is designed to select a voltage proportional to sin $ABT_0$. However, as the angle $ABT_0$ cannot exceed 180 degrees, an improved scale factor may be attained by spreading the winding of potentiometer 105 over 360 degrees and moving the brush of the potentiometer through the angle $2ABT_0$. Thus the shaft 106 rotating the brush of the potentiometer 105 is geared to the shaft 102 so as to rotate through twice the angle of rotation of the shaft 102.

The voltage selected by the brush of potentiometer 105 is supplied to resistor 107. Resistor 108 and the winding of potentiometer 109 are connected in parallel with resistor 107. The brush of potentiometer 109 is adjusted to select a voltage proportional to the even thousands of yards in the base line AB and is connected through resistor 113 to the input circuit of an amplifier 115, of the type shown in Fig. 11. Resistors 110 and 111 form a potential divider connected across the winding of potentiometer 109. The winding of potentiometer 112 is connected across resistor 111 and is adjusted to select a voltage proportional to the portion of the base line AB exceeding the nearest 1,000 yard unit and is connected through resistor 114 to the input circuit of amplifier 115.

Figure 11:
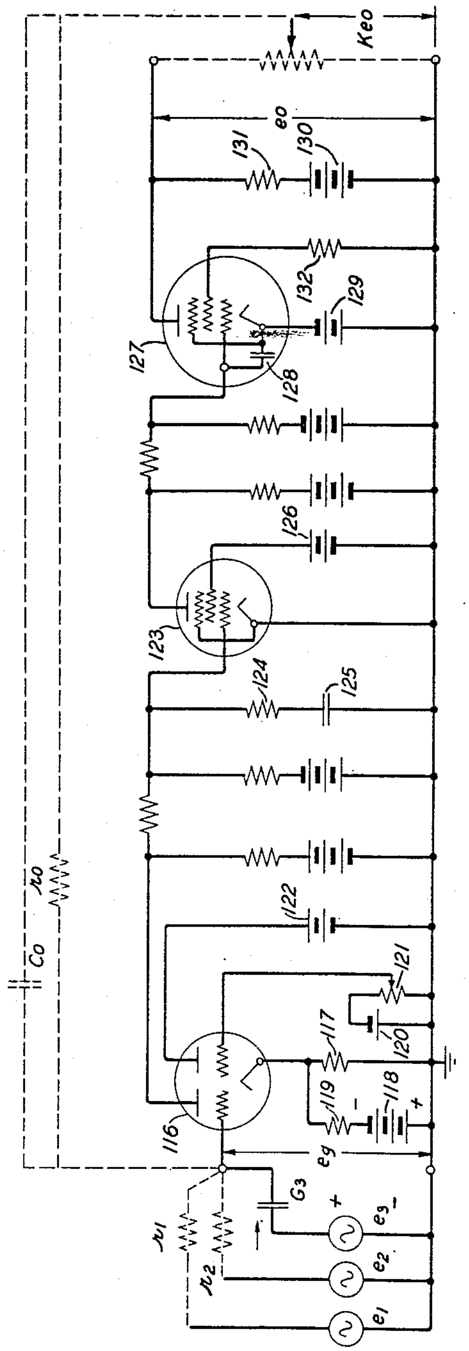

The amplifier shown in Fig. 11 is of the type disclosed in United States patent application Serial No. 391,331, filed May 1, 1941, by K. D. Swartzel, patented June 11, 1946, Patent No. 2,401,779, and assigned to the assignee of the present application. The first stage of the amplifier shown in Fig. 11 has a double triode 116, with a common cathode connected to ground through resistor 117, and a grounded source of voltage 118 with its negative pole connected through resistor 119 to the cathode of vacuum tube 116. The resistances of resistors 117 and 119 are so selected that the negative voltage applied to the cathode of vacuum tube 116 neutralizes the positive potential difference produced across the resistor 117 by the anode currents flowing in the vacuum tube 116, thus the cathode of the vacuum tube 116 is substantially at ground potential. A grounded source of voltage 120 is connected across the winding of a potentiometer 121, the brush of potentiometer 121 being connected to the control grid of one section of the vacuum tube 116 and adjusted so that the output voltage of the amplifier, for zero input signal voltage, is accurately reduced to zero. A source of voltage 122 is connected to the anode of this section of the vacuum tube 116, thus compensating for variations in the activity of the cathode of vacuum tube 116 as described in an article "Sensitive D. C. Amplifier with A. C. Operation" by S. E. Miller, Electronics, November 1941, page 27.

The input circuit is connected to the control grid of the second section of the vacuum tube 116, and the anode of this section is connected to the control grid of vacuum tube 123 by an interstage coupling network of the type disclosed in United States Patent 1,751,527, March 25, 1930, H. Nyquist. A resistor 124 in series with a capacitor 125 connected from the control grid of vacuum tube 123 to ground compensates for the phase shift due to the interelectrode capacitances of the vacuum tube and the capacitance of the wiring. The screen grid of vacuum tube 123 is energized in the usual manner by a source of voltage 126. The anode of vacuum tube 123 is connected to the control grid of vacuum tube 127 by a similar interstage coupling network having a compensating capacitor 128. The screen grid of vacuum tube 127 is grounded through a low resistor 132. A grounded source of voltage 129 has its negative pole connected to the cathode of vacuum tube 127, while another grounded source of voltage 130 has its positive pole connected through resistor 131 to the anode of vacuum tube 127. The potentials of the sources 129 and 130 are so selected that they form with the resistances of the resistor 131 and the anode-cathode path of vacuum tube 127, a balanced bridge. Thus in the absence of a voltage applied to the signal grid of vacuum tube 127, the anode of vacuum tube 127 is at ground potential. If a negative voltage be applied to the control grid of vacuum tube 116, an amplified negative voltage will be applied to the control grid of vacuum tube 127 decreasing the anode-cathode resistance of vacuum tube 127 and causing a positive voltage to be produced across the output circuit of the amplifier. Thus the amplifier reverses the polarity of a voltage applied to the input circuit.

Assume that a source of voltage $e_1$ is connected through a resistor having a resistance $r_1$, that the winding of a potentiometer is connected across the output circuit of the amplifier from the anode of vacuum tube 127 to ground, and that the brush of this potentiometer is connected through a resistor having a resistance $r_0$ to the input of the amplifier. Assume that the source applies a positive voltage $e_1$ to the input circuit, that the voltage from the control grid of vacuum tube 116 to ground is $e_g$, that the output voltage is $e_0$, and that the fraction of this voltage selected by the wiper of the potentiometer is $ke_0$. The positive voltage applied to the control grid of vacuum tube 116 will cause a negative voltage to be produced across the winding of the potentiometer in the output circuit, thus, a current can flow from the source $e_1$, through resistor $r_1$, resistor $r_0$ and the lower portion of the potentiometer winding back to the source $e_1$. If the voltage gain of the complete amplifier is fairly high, this current will increase until the voltage $e_g$ between the control grid of vacuum tube 116 and ground is reduced substantially to zero. Let this current be $i$, then $$e_1=ir_1$$

$$i=\frac{e_1}{r_1}$$

$$-ke_0-ir_0$$

Substituting the value for $i$, then $$-ke_0=\frac{e_1r_0}{r_1}$$

or, $$-e_0=\frac{e_1}{k}\frac{r_0}{r_1} \qquad (2)$$

If the ratio $r_0/r_1$ is unity $$-e_0=\frac{e_1}{k} \qquad (3)$$

that is, the output of the amplifier is equal to the input voltage $e_1$ divided by the voltage ratio of the potentiometer connected across the output circuit. The voltage ratio $k$ of the potentiometer will vary with the variation in resistance of the winding. Thus, by shaping the card of the potentiometer, the ratio $k$ may have a desired functional variation. If the voltage ratio $k$ of the potentiometer is unity, $$e_0=e_1\frac{r_0}{r_1}$$

that is, the voltage ratio for this input is determined by the ratio of the resistances of the feedback resistor and the input resistor.

Let a second source of voltage $e_2$ be connected through a resistor having a resistance $r_2$ across the input circuit of the amplifier.

Let the current from the source $e_1$ be $i_1$ and the current from source $e_2$ be $i_2$ then, as the voltage $e_g$ will again be substantially zero, $$e_1=i_1r_1;\ e_2=i_2r_2$$

Also, $$-ke_0=(i_1+i_2)r_0$$

thus $$-e_0=\frac{1}{k}\left(e_1\frac{r_0}{r_1}+e_2\frac{r_0}{r_2}\right) \qquad (4)$$

If $k$=unity, and $r_0=r_1=r_2$, the output voltage of the amplifier will equal the negative of the sum of the input voltages.

The shaft 76, Fig. 2, rotating in accordance with the azimuth $A_zBT_0$, is geared to one pinion of a differential gear 135; while the shaft 96 rotating in accordance with the azimuth $A_zAT_0$, is geared to the other pinion of the differential gear 135. The planet pinion of the differential gear 135 is geared to the shaft 136, which will thus be rotated in accordance with the difference between the two azimuths, that is, the target angle $AT_0B$. With base lines of adequate length and a sufficient number of observation stations, the target angle $AT_0B$ need never be less than 3 degrees and, of course, cannot exceed 180 degrees. Thus to secure increased accuracy and a better scale factor with potentiometers of reasonable diameter, the shaft 136 is geared to turn through four times the angle of rotation of the planet pinion of the differential gear 135, thus giving a four-fold increase in scale factor.

The potentiometer cards 137 and 138 are designed as shown in U. S. Patent 2,417,442, March 18, 1947, D. B. Parkinson, assigned to the assignee of the present application, so that 90 degrees of the target angle are spread over 360 degrees of the potentiometer circle. The potentiometer cards 137 and 138 are shaped approximately in accordance with a cosine function extending over one quadrant, except that some of the turns of wire on the wide end of the card are short-circuited and at the narrow end of the card, the card is of constant width and a number of turns at the end are also short-circuited. The short-circuited turns on the narrow ends of the two cards actually overlap at the zero angle but, in order to more clearly show the connections to the windings on these cards, the ends of the cards are shown spaced apart. With zero angle at the bottom and clockwise rotation, and expressing angles in terms of the target angle, the potentiometer winding 137 has the following variations, 0 to 0.3 degree short-circuited turns on narrow end; 0.3 to 2.3 degrees the space is filled with an insulating bridge on which the brush can slide; 2.3 to 3.0 degrees short-circuited turns on the wide end of the card; 3.0 to 88.7 degrees the width of the card decreases in accordance with a cosine function; 88.7 to 89.4 degrees the card has a narrow constant width; 89.4 to 90.0 degrees the turns on the narrow end of constant width are short-cuited. With 90 degrees at the bottom, clockwise rotation, and expressing the angle in terms of the target angle, the potentiometer winding 138 has the following variations 90.0 degrees to 90.6 degrees, the turns of the winding on the narrow end of the card are short-circuited; 90.6 to 91.3 degrees the potentiometer card is of narrow constant width; 91.3 to 177 degrees, the potentiometer card varies in width with the cosine function; 177.0 to 177.7 degrees the turns on the windings at the wide end of the potentiometer card are short-circuited; 177.7 to 179.7 degrees an insulating bridge is inserted on which the potentiometer brush can slide; 179.7 to 180.0 degrees the turns of the winding on the narrow end of the card are short-circuited. The output circuit of amplifier 115 is connected by connection 139 to the short-circuited turns on the narrow ends of the potentiometer cards 137 and 138. The short-circuited turns on the broad ends of the potentiometer cards 137 and 138 are respectively grounded through resistors 140 and 141. Resistors 140 and 141 have resistances equal to the resistance of 3 degrees of the potentiometer winding at the wide end. The brushes of potentiometers 137 and 138 are respectively connected through resistors 142 and 143 to ground, and are connected to the springs of the cam-operated switch 144. The cam shaft 146 is geared to the shaft 136 and turns at one half the speed of the shaft 136, that is, through twice the target angle.

The junction of the winding of potentiometer 137 and resistor 140 is connected to the armature of cam-operated switch 145, the spring of switch 145 being connected through the back contacts of relay 104 and the resistor 147 to the input circuit of amplifier 115. The brushes of potentiometers 137 and 138 are respectively connected to the break 148 and the make 149 springs of cam-operated switch 144, the armature of switch 144 being connected through the back contact and armature of relay 104 and resistor 147 to the input circuit of amplifier 115.

The cams of the cam switches 144 and 145 are shaped so as to produce the following sequence of operations, expressed in terms of the target angle. From 0 to 2.6 degrees switches 148 and 149 are open, and switch 145 is closed, thus a voltage proportional to the sine of 3 degrees is sent back through resistor 147 to the input circuit of amplifier 115. At 2.6 degrees switch 148 closes connecting the brush of potentiometer 137 through resistor 147 to the input circuit of amplifier 115. At 3.0 degrees, switch 145 opens, and switch 148 remains closed for one complete revolution of the brush of potentiometer 137. At 88.7 degrees, switch 149 closes connecting the brush of potentiometer 138 in parallel with the brush of potentiometer 137 through resistor 147 to the input circuit of amplifier 115. At 91.3 degrees switch 148 opens and remain opened for the remainder of this revolution. At 177.2 degrees switch 145 again closes and at 178.7 degrees, switch 149 opens. Switch 145 remains closed, and switch 149 remains opened, for the remainder of the revolution.

Thus in terms of the target angle, for the first three degrees of rotation, a constant voltage proportional to the sine of 3 degrees is supplied through the switch 145; from 3.0 degrees to 88.7 degrees, a voltage varying in accordance with a sinusoidal function is supplied by the brush of potentiometer 137 through switch 148, this voltage increasing linearly from 88.7 degrees to 89.4 degrees and then remaining constant. At 88.7 degrees the brush of potentiometer 138 is connected in parallel with the brush of potentiometer 137. At 91.3 degrees, the brush of potentiometer 137 is disconnected and the brush of potentiometer 138 supplies a constant voltage up to 90.6 degrees, then a constantly decreasing voltage to 91.3 degrees, and after that a voltage decreasing in accordance with a sinusoidal function to the angle of 177.2 degrees, when switch 145 is closed and a constant voltage proportional to the sine of three degrees is supplied through resistor 147 to the input circuit of amplifier 115 for the remainder of the revolution of the brushes.

The input voltages to amplifier 115 are proportional to $-\sin ABT_0 \cdot AB$, and the feedback voltage from potentiometers 137, 138 is proportional to sin $AT_0B$, thus the output voltage of amplifier 115 is proportional to $+AT_0$, the distance from the observing station A to the present position $T_0$ of the target.

The output circuit of amplifier 115 is connected by connection 139 to the windings of potentiometers 137, 138 to the break springs of cam-operated switches 156 and 157, and through resistor 160 to the input circuit of a unity gain amplifier 161, of the type shown in Fig. 11, having a feedback resistor 162. The output circuit of amplifier 161 is connected to the make springs of cam-operated switches 156 and 157. The shaft 96 is rotated proportionally to the azimuth $A_zAT_0$. The output voltages of amplifiers 115 and 161 are respectively proportional to the positive and negative values of the distance $AT_0$. In the present director, the prediction is made in a system of rectangular coordinates, preferably having the axes aligned with the cardinal directions, thus $$Y = -AT_0 \cos A_zAT_0 \qquad (5)$$

$$X = -AT_0 \sin A_zAT_0 \qquad (6)$$

To secure a better scale factor in this conversion, without entailing the use of potentiometers of inconvenient size, the conversion potentiometers may be of the type disclosed in U. S. Patent 2,417,425, March 18, 1947, C. A. Lovell and J. F. Muller, to operate with a scale factor of 2.

The shaft 96 is geared to the shaft 158 through gearing having a ratio of 2 to 1, thus the shaft 158 rotates through twice the angle of the shaft 96. The cam shaft 159 is geared to the shaft 158 through gearing having a ratio of 1 to 2, thus the shaft 159 rotates through the same angle as the shaft 96.

The potentiometer winding is distributed over two sections 150 and 151, each section varying in width in accordance with a cosinusoidal function extending over substantially a complete quadrant. The description of this potentiometer will be given in terms of the azimuth angle $A_zAT_0$, and not in terms of the angle of rotation of the shaft 158. About 1¾ degrees from the narrow end, the sections 150 and 151 become of constant width for about 1 degree, the turns of the winding on the latter half of this section being short-circuited. The windings terminate about ¾ of a degree on each side of the junction line, the intervening space of 1½ degrees being filled by an insulating bridge.

As the shafts 158 and 159 are rotated, the cam switches 156 and 157 connect voltages of the proper polarity from the output circuits of amplifiers 115 and 161 to the short-circuited portions of the windings on the narrow ends of the sections 150 and 151, the wide portions of these sections being grounded. These voltages are switched just before the brush passes through the grounded sections to the section being switched.

The brush 152 is connected to the spring of switch 154 and through resistor 163 to the input circuit of amplifier 164 of the type shown in Fig. 11, having a feedback resistor 165. The brush 153 is connected to the spring of the switch 155 and through resistor 166 to the input circuit of amplifier 167 of the type shown in Fig. 11 having a feedback resistor 168.

While a brush is passing over the short-circuited portion of the narrow end of the winding 150 or 151, the appropriate switch 154 or 155 is operated, applying a constant voltage to the input of the amplifier 164 or 167, which continues until the brush has passed over the insulating bridge to the short-circuited portion of the other section of the winding. Thus for about 2½ degrees, where the function is a maximum, a constant voltage is applied to one of the amplifiers, 164 or 167, but as the function is changed rather slowly in this range, the error produced is inappreciable. The voltages applied to the sections 150 and 151 of the winding, the voltages selected by the brushes 152 and 153, and the operations of the switches 154, 155, 156, and 157, are shown in the following tabulation in which G represents ground; 0 represents an unoperated condition or no voltage; and + and − represent the polarity of the voltages applied, transmitted or selected.

*Azimuth potentiometer switching—scale factor 2*

| $A_{ze}$ | Card | | Brush | | Switch | | | |
|---|---|---|---|---|---|---|---|---|
| Angle | 150 | 151 | 152 | 153 | 154 | 155 | 156 | 157 |
| 0 | + | − | G | O | O | + | + | − |
| ½ | + | + | + | O | O | + | + | + |
| 1 | + | + | + | + | O | O | + | + |
| 89 | + | + | + | + | + | O | + | + |
| 89½ | − | + | O | + | + | O | − | + |
| 90 | − | + | O | G | + | O | − | + |
| 91 | − | + | + | − | O | O | − | + |
| 179 | − | + | + | − | O | − | − | + |
| 180 | − | + | G | O | O | − | − | + |
| 180½ | − | − | − | O | O | − | − | − |
| 181 | − | − | − | − | O | O | − | − |
| 269 | − | − | − | − | − | O | − | − |
| 269½ | + | − | O | − | − | O | + | − |
| 270 | + | − | O | G | − | O | + | − |
| 271 | + | − | − | + | O | O | + | − |
| 359 | + | − | − | + | O | + | + | − |
| 360 | + | − | G | O | O | + | + | − |

The rectangular coordinates of the position of the target with respect to the point of observation may be converted into the rectangular coordinates of the position of the target with respect to the pivot gun by adding thereto the rectangular coordinates of the observation stations with respect to the pivot gun.

Switch 172 is operated to select a voltage of appropriate polarity from the source 170 or 171, and is connected to the windings of potentiometers 173, 175 and 177. The wiper of potentiometer 173 is adjusted to select a voltage proportional to the nearest unit of 10,000 yards in the X-coordinate of the observing station with respect to the pivot gun, and is connected through resistor 174 to the input circuit of amplifier 164. The wiper of potentiometer 175 is adjusted to select a voltage proportional to the nearest unit of 1,000 yards in the X-coordinate and is connected through resistor 176 to the input circuit of amplifier 164. The wiper of potentiometer 177 is adjusted to select a voltage proportional to the nearest yard of the X-coordinate and is connected through resistor 178 to the input circuit of amplifier 164. The output circuit of amplifier 164 will thus have a voltage proportional to $+X_0$, a rectangular coordinate of the present position of the target with respect to the pivot gun.

Similarly, the switch 182 is adjusted to select a voltage of appropriate polarity from the source 180 or 181 and is connected to the windings of potentiometers 183, 185 and 187. The brushes of potentiometers 183, 185 and 187 are respectively connected through resistors 184, 186 and 188 to the input circuit of amplifier 167, and are respectively adjusted to select voltage proportional to the nearest unit of 10,000 yards, the nearest unit of 1,000 yards and the nearest yard in the Y-coordinate of the observation station with respect to the pivot gun. The output circuit of amplifier 167 will thus produce a voltage of polarity proportional to the rectangular coordinate $+Y_0$ of the present position of the target with respect to the pivot gun.

In some cases, as when a target is first brought under observation at extreme range, the target may only be visible from one of the base line end stations. In such cases, this base line station is equipped with some form of range finder, such as a depression position finder, in addition to the azimuth instrument. The data transmission potentiometer associated with the azimuth instrument is connected as usual by the transmission line and the appropriate key 16 to the receiving potentiometer 77, Fig. 2. The range finder is also equipped with a data transmitting potentiometer which is connected through a second transmission line and the appropriate key 17 (Fig. 1) to the receiving potentiometer 64, Fig. 2. The base line azimuth handwheel 98 is rotated to set the dials 99 and 100 to zero. The even hundreds of yards as received over the telephone are set in by the handwheel 74, and are indicated by special graduations of the dial 75. The handwheel 68 is manipulated to keep the meter 60 on zero thus causing the brushes 45 and 46 to track the corresponding brushes of the range finder transmitting potentiometer and the shaft 71 to rotate in accordance with the units of distance less than 100 yards, as indicated on a special graduation of the dial 72. The rotations proportional to the hundreds of yards and of the distances less than 100 yards, are combined in the differential gear 73 so that the shafts 101 and 102 are rotated proportionally to the measured distance to the target and the shaft 106 is rotated proportionally to twice this distance.

The key 200 is operated operating relay 104, disconnecting the battery 103 from the windings of potentiometers 105, 109 and 112, and connecting the battery 103 to the winding of potentiometer 201. The winding of potentiometer 201 is of uniform resistance, and the brush is connected through resistor 202 to the input circuit of amplifier 115. The operation of relay 104 also disconnects the potentiometers 137 and 138 from the resistor 147, and connects the output circuit of amplifier 115 to the input circuit through resistor 147. The positive voltage in the output circuit of amplifier 115 will thus be proportional to the distance from the observing station to the present position of the target and, as before, this voltage is supplied to the potentiometer windings 150 and 151 to produce voltages proportional to the rectangular coordinates of the present position of the target with respect to the observation stations which are supplied to the amplifiers 164 and 167.

Figure 3:
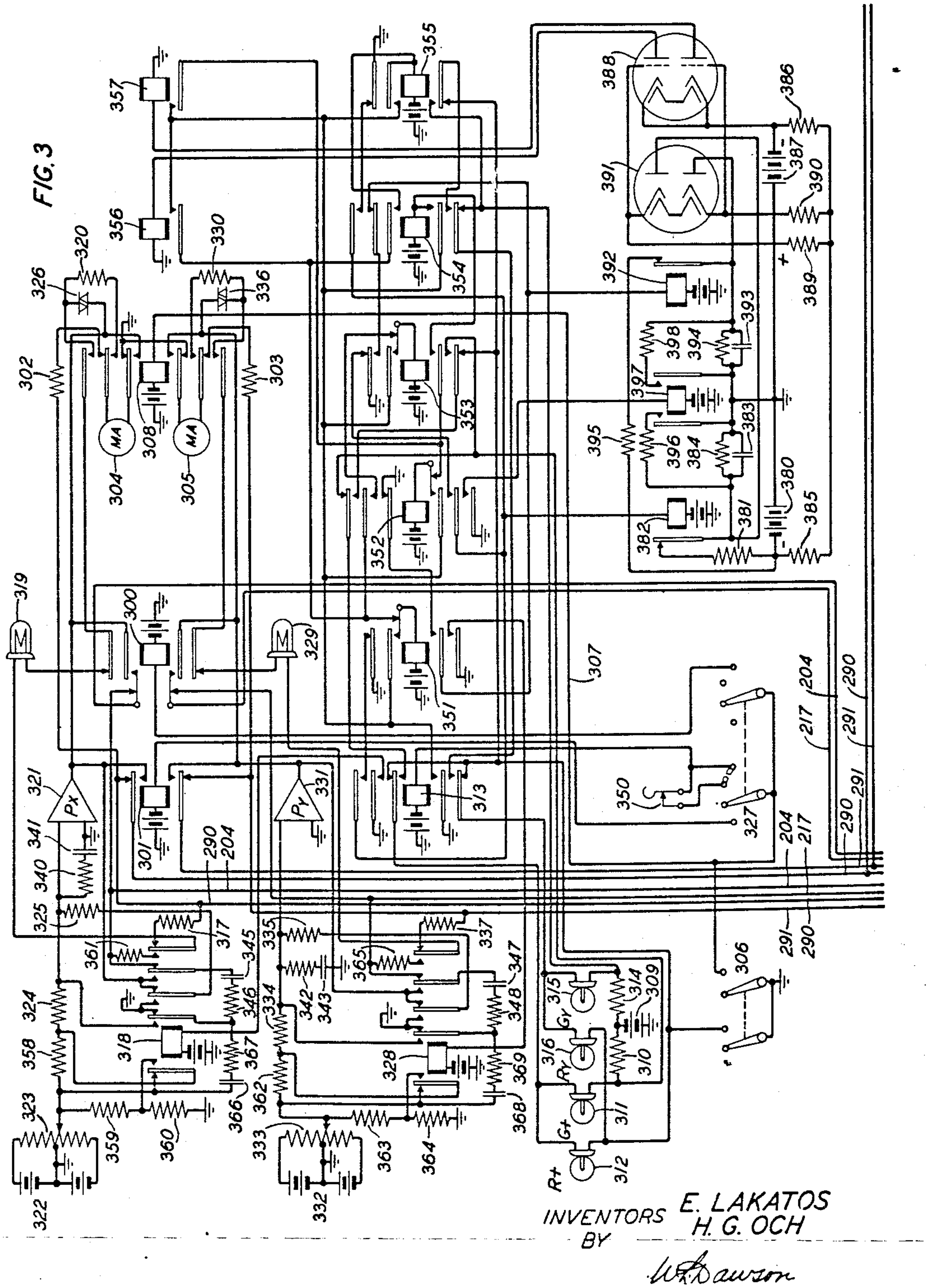
Figure 4:
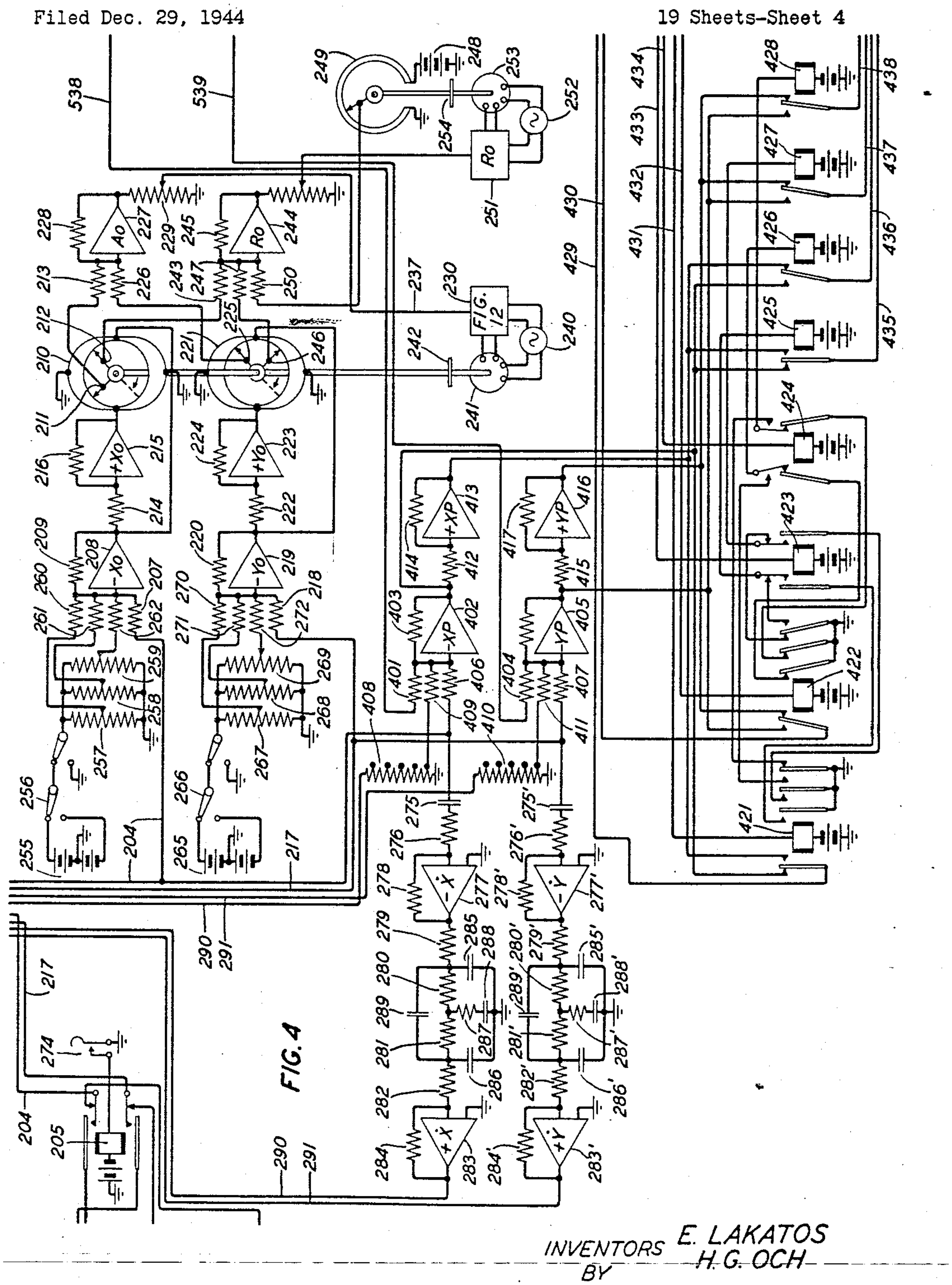

The output circuit of amplifier 164, Fig. 2, is connected by connection 204 through the upper make-before-break springs of relay 205, Fig. 4, the upper make-before-break springs of relay 300, Fig. 3, and resistor 207, Fig. 4, to the input circuit of an amplifier 208, of the type shown in Fig. 11, having a feedback resistor 209. The potentiometer winding 210 is on a card varying in width with a cosinusoidal function extending through a complete revolution, the winding being grounded at the points where the card is of maximum width. The output circuit of amplifier 208 is connected to the potentiometer winding 210 at the point where the card is of minimum width, and through resistor 214 to the input circuit of a unity gain amplifier 215, of the type shown in Fig. 11, having a feedback resistor 216. The output circuit of amplifier 215 is connected to the winding 210 at the other point where the card is of minimum width.

The output circuit of amplifier 167, Fig. 2, is connected by connection 217 through the lower make-before-break springs of relay 205, Fig. 4, and the lower make-before-break springs of relay 300, Fig. 3, through resistor 218, Fig. 4, to the input circuit of amplifier 219, of the type shown in Fig. 11 having a feedback resistor 220. The potentiometer winding 221 is similar to the potentiometer winding 210, and is grounded at the points where the card is widest. The output circuit of amplifier 219 is connected to the potentiometer winding 221 at one of the points where the card is narrowest, and through resistor 222 to the input circuit of a unity gain amplifier 223, of the type shown in Fig. 11, having a feedback resistor 224. The output circuit of amplifier 223 is connected to the potentiometer winding 221 at the other point where the card is narrowest.

In Fig. 10, let the azimuth of the present position of the target, $T_0$, with respect to the pivot gun, G1, be $A_0$, then, as $X_0$ and $Y_0$ are the rectangular coordinates of the present position of the target with respect to the pivot gun, it follows that:

$$-X_0 \cos A_0 + Y_0 \sin A_0 = 0 \qquad (7)$$

In Fig. 4, with zero angle at the lower ground in the potentiometer windings 210 and 221, and clockwise rotation of the brushes for increasing angle, the brush 211 will select a voltage proportional to the cosine of the angle of rotation, and is connected through resistor 213 to the input circuit of an amplifier 227 of the type shown in Fig. 11, having a feedback resistor 228. The output circuit of amplifier 227 is connected to the windings of a potentiometer 229, the brush of potentiometer 229 being connected by connection 237 to a control circuit 230, of the type shown in Fig. 12.

Figure 12:
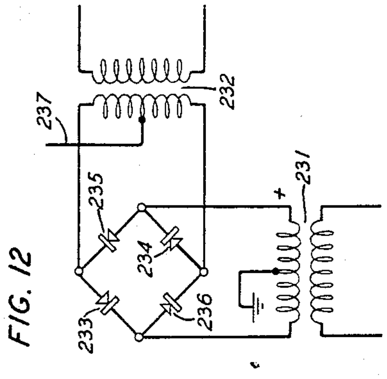

The control circuit, Fig. 12, includes two transformers 231 and 232, connected to the conjugate points of a bridge formed by the elements 233, 234, 235, and 236. The elements 233, 234, 235, and 236, are non-linear resistances, such as copper, copper-oxide couples, the arrows indicating the direction of flow of the biasing current to produce a low resistance in these elements. The mid-point of one winding of the transformer 231 is grounded, and the mid-point of one winding of the transformer 232 is connected to the control circuit. With positive voltage supplied by the connection 237, the elements 233 and 234 will be of low resistance, thus, if an alternating voltage be applied to the primary winding of transformer 231 so as, at a given instant, to make the right-hand end of the secondary winding of transformer 231 positive, the current from this source will flow upward in the primary winding of transformer 232. If a negative voltage be supplied by the connection 237, the elements 235 and 236 will be of low resistance, thus when an alternating voltage makes the right-hand end of the secondary winding of transformer 231 positive, current will flow downward in the primary winding of transformer 232. The polarity of the control voltage supplied by the connection 237 thus controls the phase of the alternating current transmitted through the network from transformer 231 to transformer 232.

In Fig. 4, a source of two-phase current 240, has one phase connected directly to one winding of a two-phase motor 241, and the other phase connected through the controlling network 230 to the other winding of motor 241.

The voltages supplied to the input circuit of amplifier 227 are approximately proportional to $-X_0 \cos A_0 + Y_0 \sin A_0$ and from Equation 7, this quantity should equal zero. If the output voltage of amplifier 227 is not equal to zero, current will be supplied by connection 237 to the control network 230, unbalancing the network and supplying power to the motor 241, which rotates the brushes 211 and 225, until the output of amplifier 227 is reduced to zero. The brushes 211 and 225 have thus been rotated to the angle $A_0$, which may be indicated on a suitable dial 242. The sensitivity of the response of the control circuit and motor may be adjusted by adjusting the brush of potentiometer 229.

The brush 212 is connected through resistor 243 to the input circuit of an amplifier 244, of the type shown in Fig. 11, having a feedback resistor 245. Brush 246 is connected through resistor 247 to the input circuit of amplifier 244. The winding of potentiometer 249 is connected across the grounded source of voltage 248, and the brush is connected through resistor 250 to the input circuit of amplifier 244. A source of two-phase power 252 is connected directly to one winding of the motor 253, and through the control network 251, of the type shown in Fig. 12, to the other winding of the motor 253. The output circuit of amplifier 244 is connected to the control circuit 251.

The voltages selected by the brushes 212 and 246 are respectively equal to $+X_0 \sin A_0$ and $+Y_0 \cos A_0$, and the sum of these voltages is equal to the distance from the pivot gun to the present position of the target. These voltages are balanced by the positive voltage selected by the brush of potentiometer 249. If the output voltage of amplifier 244 is not equal to zero, the motor 253 will start moving the brush of potentiometer 249 until the positive voltage selected by this brush is equal to the voltages suppled by the brushes 212 and 246, reducing the output voltage of amplifier 244 to zero and stopping motor 253. The brush of potentiometer 249 has thus been rotated to the value of the distance from the pivot gun to the present position of the target, and this distance may be indicated on a suitable dial 254.

In Fig. 10, as the target moves along its course, it will tend to move so far from the station A that observation becomes difficult and it is advisable to transfer the observations to stations B and C. From the rectangular coordinates of the present position of the target with respect to the pivot gun, the rectangular coordinates of the target with respect to the station C may be obtained, and from these rectangular coordinates the azimuth $A_2CT_0$ may be computed. This azimuth is transmitted by telephone to station C, where the operator sets in the angle on his azimuth instrument, identifies the target and brings the target under observation. The director may then be switched so that it is controlled by the observations from stations B and C, and not by the observations from stations A and B.

In Fig. 4, voltage of appropriate polarity from the source 255 is selected by the switch 256 and applied to the windings of potentiometers 257, 258 and 259. The brushes of potentiometers 257, 258 and 259 are respectively connected through resistors 260, 261 and 262 to the input circuit of amplifier 208. The brushes of potentiometers 257, 258 and 259 are respectively adjusted to the ten thousands of yards, the thousands of yards, and the odd yards of the X coordinate of the station C with respect to the pivot gun.

Similarly, voltage of appropriate polarity from the source 265 is selected by the switch 266 and applied to the windings of potentiometers 267, 268 and 269. The brushes of potentiometers 267, 268 and 269 are respectively connected through resistors 270, 271 and 272 to the input circuit of amplifier 219, and are respectively adjusted to select voltages proportional to the ten thousands of yards, the thousands of yards, and the odd yards of the Y coordinate of station C with respect to the pivot gun. The output voltages of amplifiers 208 and 219 will thus respectively be equal to the X coordinate and the Y coordinate of the present position of the target with respect to station C, and the motor 241 will be driven to rotate the brushes 211 and 223 to the angle corresponding to the coordinates, that is, to the angle $A_2CT_0$.

In Fig. 1 the operation of key 18 connected the transmitting potentiometer of station A to potentiometer 77, Fig. 2, and the operation of a key corresponding to key 17, connected the transmitting potentiometer of station 3 to potentiometer 44, Fig. 2. The complete equipment shown in Fig. 2, which may be termed the AB triangle solver, is duplicated in the director, and may be termed the CD triangle solver 273. The key, corresponding to key 16, is operated to connect the receiving potentiometer of the CD triangle solver 273, corresponding to potentiometer 77, to station B. It will be noted that this operation has connected two receiving potentiometers in parallel to the transmission line to station B. It is for this reason that the transmission lines are balanced with two resistors 20 and 22 in parallel, these resistors having the same resistances as the windings of the receiving potentiometers. By the operation of a key corresponding to key 15, the transmission line from station C is connected to the potentiometers in the CD triangle solver 273 corresponding to potentiometer 44, Fig. 2. The outputs of the summing amplifiers in the CD triangle solver 273 are respectively connected to the armatures of relay 205, Fig. 4. As soon as the CD triangle solver has been properly adjusted, as described above in connection with Fig. 2, the key 274, Fig. 4, is operated, operating relay 205, connecting the outputs of the summing amplifiers in the CD triangle solver to the director, and disconnecting the outputs from the summing amplifiers 204 and 217, Fig. 2, of the AB triangle solver.

While the transfer of observations from stations AB, Fig. 10, to stations BC has been described, it is evident that the observation could be transferred from stations AB to stations CD. Then, as the target progresses farther along its course, another pair of observation stations, say EF, could be connected to the AB triangle solver and observations transferred from stations CD to stations EF, and so on.

The output circuits of the amplifiers 164 and 167, Fig. 2, or the output circuits of the corresponding amplifiers in the CD triangle solver 273, are connected through the contacts of relay 205, Fig. 4, by connections 204 and 217 through the contacts of relay 300, Fig. 3, respectively, through the capacitors 275 and 275', Fig. 4, the resistors 276 and 276' to the input circuits of the amplifiers 277 and 277', of the type shown in Fig. 11, having feedback resistors 278 and 278'.

In Fig. 11, let a grounded source of voltage $e_3$ be connected through a capacitor of capacitance $C_3$ to the control grid of vacuum tube 116, and let $K=1$. As before, $e_g$ is nearly zero, thus $i_3=C_3\dot{e}_3$. Then $-e_0=i_3r_0=C_3r_0\dot{e}_3$, that is, the output voltage is proportional to the derivative or time rate of change of the input voltage. If the voltage $e_3$ is positive increasing or negative decreasing, $e_0$ is of negative polarity if $e_3$ is positive decreasing or negative increasing, $e_0$ is of positive polarity.

The output circuits of amplifiers 277 and 277', Fig. 4, are respectively connected through resistors 279 and 279', 280 and 280', 281 and 281', 282 and 282', to the input circuit of amplifiers 283 and 283', of the type shown in Fig. 11, having feedback resistors 284 and 284'. The shunt capacitors 285 and 285', 286 and 286', with the shunt arms formed by the resistors 287 and 287' in series with the capacitors 288 and 288', and the bridged capacitors 289 and 289', form smoothing networks of the type disclosed in United States patent application, Serial No. 523,514, filed February 23, 1944, by W. H. Boghosian and H. G. Och now Patent Number 2,458,553 and assigned to the assignee of the present application. The networks together with the capacitors 275 and 275' and the resistors 276 and 276' produce in the output circuits of the amplifiers 283 and 283' voltages respectively proportional to the time rates of change of the voltages from the output circuits of the amplifiers 164 and 167, Fig. 2, that is, respectively proportional to the rate or speed of the target in the direction of the X and Y coordinates. These rates will be respectively designated as $\dot{X}$ and $\dot{Y}$.

The output circuits of the amplifiers 283 and 283' are respectively connected by connections 290 and 291 through resistor 302, the break springs of the second pile-up of relay 308, and meter 304, Fig. 3, to ground, and through resistor 303, the break springs of the fifth pile-up of relay 308' and meter 305 to ground.

When a target is moving with unaccelerated motion, that is, motion in a straight line at constant speed, the rates $\dot{X}$ and $\dot{Y}$, in the direction of the rectangular coordinates X and Y, should be constant. Thus the readings of the meters 304 and 305 should be constant. However, as some of the observations are telephoned to the computer at regular intervals; as observations of the target may be difficult due to natural causes; and as the smoothing networks may not have completely settled down, the readings of the meters 304 and 305 may vary in an irregular manner, thus indicating that the predictions based upon the values of $\dot{X}$ and $\dot{Y}$ may be unsatisfactory for predicting the future position of the target.

If the readings of the meters 304 and 305 are found to be undesirably unsteady, switch 306 may be operated, thus supplying ground through the right-hand switch blade over connection 307 to operate relay 308.

The operation of switch 306 permits current to flow from a suitable source 309 through resistor 310, lamp 311, the break springs in the third pile-up of relay 313 back through the left blade of switch 306 to ground, thus lighting lamp 311. Similarly, current can flow from the source 309 through resistor 314 and lamp 315, the break springs of the fifth pile-up of relay 313 through switch 306 to ground lighting lamp 315. The lamps 312 and 316 are short-circuited by the springs of relay 313 and thus do not light. The lamps 311 and 315 produce a green light and will be designated $G_X$ and $G_Y$. The lamps 312 and 316, when lighted, give a red light and will be designated $R_X$ and $R_Y$.

The operation of relay 308 connects the connection 290 through resistor 317, the break springs of the fifth pile-up of relay 318, lamp 319, break springs of first pile-up of relay 300, make springs of first pile-up of relay 308, resistor 320, make springs of the second pile-up of relay 308, to one side of the meter 304. The other side of the meter 304 is connected through the make springs of the third pile-up of relay 308 to the output circuit of amplifier 321, of the type disclosed in Fig. 11.

A source of voltage 322, having an intermediate point grounded, is connected across the winding of a potentiometer 323. The brush of potentiometer 323 is connected through the break springs of the first pile-up of relay 318 and resistor 324 to the input circuit of amplifier 321. The feedback resistor 325 is connected from the input circuit of the amplifier 321 through the break springs of the third pile-up of relay 313 to the output circuit of amplifier 321. The meters 304 and 305 are sensitive meters having center zeroes. The output voltage of the amplifier 321 opposes, in the meter 304, the voltage supplied by the connection 290, thus by adjusting the brush of potentiometer 323, the reading of the meter 304 can be reduced to irregular movements equally spaced on each side of the zero. The output voltage of amplifier 321 is then equal to a smoothed average of the observed values of $\dot{X}$.

The operation of relay 308 also connects a nonlinear resistor 326, which may be copper-copper-oxide couple, across the resistor 320 and meter 304, and this resistor 326, together with the resistance lamp 319, protects the meter 304 during the adjustment of the brush of potentiometer 323.

When the brush of potentiometer 323 has been adjusted to a satisfactory value, switch 327 is moved to the first contact, thus supplying ground through the right-hand blade of switch 306 and the left-hand blade of switch 327 to operate relay 301.

Figure 7:
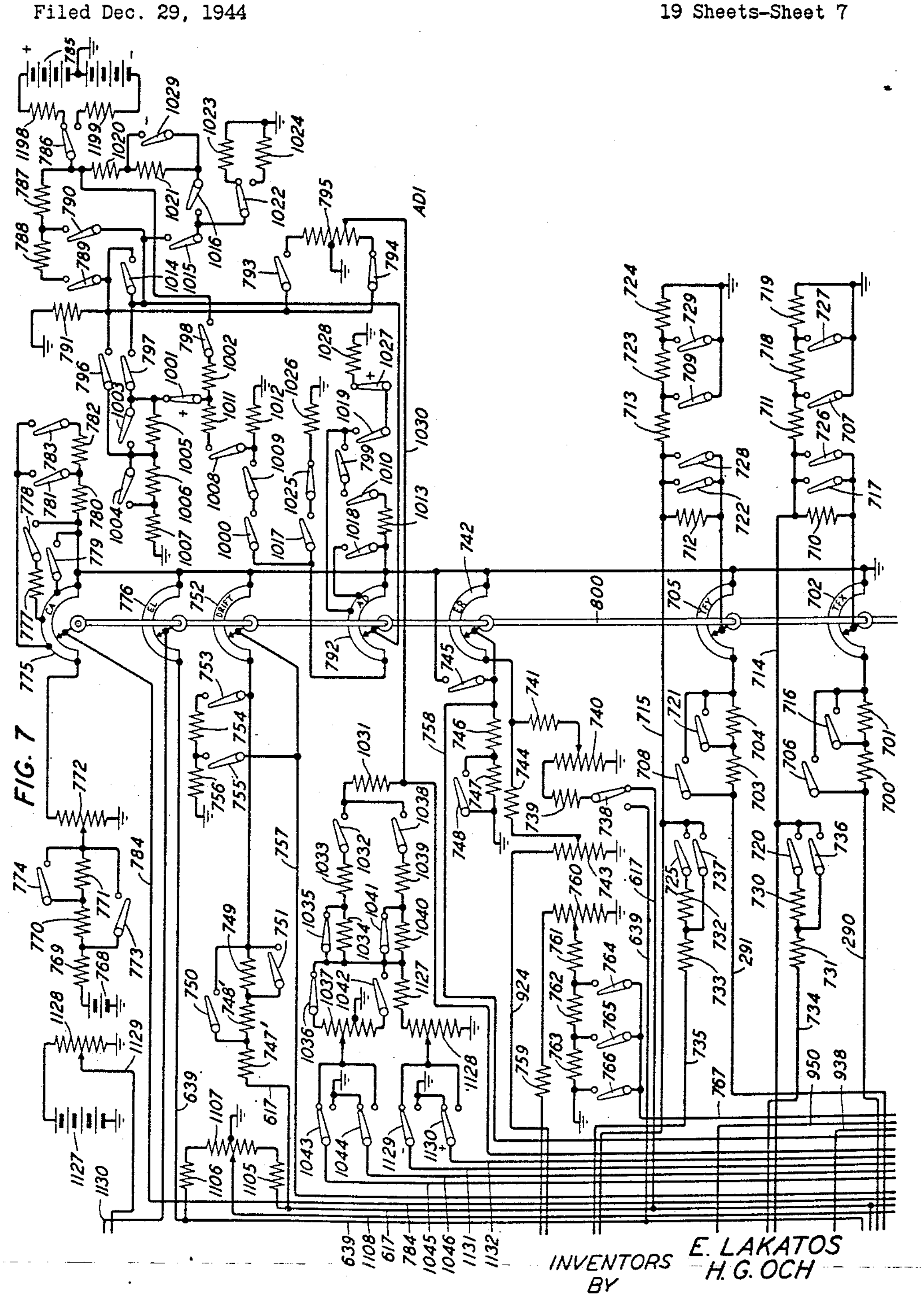

The connection 290 is normally connected through the break springs of the first pile-up of relay 301, to the circuit in Fig. 7 which predicts the future position of the target. The operation of relay 301 breaks this connection and connects the output circuit of the amplifier 321 to the prediction circuits. The prediction of the future position of the target is then based upon the smooth handset voltage from the output circuit of amplifier 321, in place of the unsteady voltages from the observing equipment.

When the voltages derived from the observations have settled down to a satisfactory degree of smoothness, as shown by reduced movements of the needle of meter 304, the switch 327 may be moved to the second contact, thus releasing relay 301 and again connecting connection 290 through the break springs of the first pile-up of relay 301 to the circuits of Fig. 7.

In a similar manner, the operation of relay 308 connects the connection 291 through resistor 337, the break springs of the fifth pile-up of relay 328, lamp 329, the break springs of the fourth pile-up of relay 300, the make springs of the sixth pile-up of relay 308, resistor 330, the make springs of the fifth pile-up of relay 308 to one side of the meter 305. A source of voltage 332, having an intermediate point grounded, is connected across the winding of potentiometer 333. The brush of potentiometer 333 is connected through the break springs of the first pile-up of relay 328 and resistor 334 to the input circuit of an amplifier 331, of the type shown in Fig. 11. The output circuit of amplifier 331 is connected through the make springs of the fourth pile-up of relay 308 to the other side of meter 305. A feedback resistor 335 is connected from the input circuit of amplifier 331 through the break springs of the third pile-up of relay 328 to the output circuit of amplifier 331. The brush of potentiometer 333 is adjusted until the readings of meter 305 are evenly spaced about zero. The connection 291 is normally connected through the break springs of the second pile-up of relay 301 to the prediction circuit of Fig. 7. The operation of relay 301 connects the output circuit of amplifier 331 through the make springs of the second pile-up of relay 301 to the prediction circuit of Fig. 7.

The resistors 340 in series with the capacitor 341 connected across the input circuit of the amplifier 321, and 342 in series with the capacitor 343 connected across the input circuit of the amplifier 331, correct for slight phase shifts in these amplifiers and prevents the amplifiers from singing at a high frequency.

The output voltages of amplifiers 164 and 167, Fig. 2, are respectively proportional to the coordinates $X_0$ and $Y_0$, of the present position of the target. In some cases, it may be apparent that the target is about to disappear behind some obscuring medium, such as fog, a smoke screen, or other obstruction, and it is desirable to be able to continue to fire at the target, even though further observation of the target may be impossible for a fairly prolonged interval. The circuit of Fig. 3 thus may be arranged to generate a synthetic course which will be an extrapolation, along a straight line at constant speed, of the course of the target being observed. This means that the circuit of Fig. 3 must be adjusted to generate a voltage proportional to the instant values of the voltages from the output circuits of amplifiers 164 and 167, Fig. 2, and that these voltages will have the same rates of change as the voltages from the observations, so that, throughout the desired time interval, the generated voltages will at all times be equal to the values which the voltages derived from the observations would have had, if it had been possible to continue observations of the target. It is thus necessary to generate voltages which at the instant of change-over, will be equal to the instant values of the voltages proportional to $X_0$ and $Y_0$; to generate voltages equal to $\dot{X}$ and $\dot{Y}$; to integrate the voltages proportional to $\dot{X}$ and $\dot{Y}$ over the desired time interval, and to add the integrated voltages to the generated voltages proportional to $X_0$ and $Y_0$, so that the algebraic sum of the generated voltages throughout the desired time interval will be, at all times, equal

SEARCH ROOM to the voltages which would be obtained from the observations.

In Fig. 11, let resistor $r_0$ be replaced by a capacitor of capacitance $C_0$, let $k=1$, and grounded source $e_1$ be connected through resistor $r_1$ to the grid of vacuum tube 116. As before $e_g$ is nearly zero, and $e_1=i_1r_1$ also $i_1=-C_0\dot{e}_0$. Thus $$-\dot{e}_0=\frac{e_1}{r_1C_0}$$

or $$-e_0=\frac{1}{r_1C_0}\int e_1dt$$

The output voltage of the network will thus be the integral of the applied voltage. If the applied voltage $e_1$ be constant, $i_1$ will also be constant and $-e_0$ will increase linearly with time, the slope or rate of increase depending upon the magnitude of $e_1$. If the capacitor $C_0$ be first charged to some desired voltage, then connected to the amplifier, as $e_g$ is nearly zero, $-e_0$ will rise immediately to the value of the desired voltage and will then rise or fall in accordance with the integral of the applied voltage $e_1$.

With switches 306 and 327, Fig. 3, on their second contacts, and relay 308 operated, the brushes of potentiometers 323 and 333 are adjusted to the best values to make the readings of the meters 304 and 305 vibrate equally about zero reading. Connection 204 is connected through the break springs of the fourth pile-up of relay 318, capacitor 345, resistor 346, the break springs of the second pile-up of relay 318 to ground, thus charging capacitor 345 to a voltage proportional to $X_0$. Similarly connection 217 is connected through the break springs of the fourth pile-up of relay 328, capacitor 347, resistor 348, and the break springs of the second pile-up of relay 328 to ground, thus charging capacitor 347 to a voltage corresponding to $Y_0$.

As the adjustments of the potentiometers 323 and 333 may not be the best approximation to the average rate of the target, and as the constants of the circuits may not be exactly as desired, an integrating period is provided in which the outputs of the amplifiers 321 and 331 are respectively compared with the observed results from the outputs of amplifiers 164 and 167, Fig. 2. At the end of this period, the potentiometers 323 and 333 are adjusted to correct for the errors accumulated during the interval. Since the operator cannot adjust the potentiometers 323 and 333 at the same time, the integrating period for the X coordinate is arranged to start first, then after a short interval the integrating period for the Y coordinate commences. Thus, when the integrating period for the X coordinate ends, a short interval is provided for the adjustment of potentiometers 323, followed by an interval for the adjustment of potentiometer 333, thus completing the adjustment.

With switch 306 on the second contact, the operator moves switch 327 to the third contact, thus completing a circuit from ground through the right-hand blade of switch 306, the left-hand blade of switch 327, and key 350, through the winding of relay 313 to battery, thus operating relay 313.

The operation of relay 313 extinguishes the Gx lamp, 311, by completing a short-circuit from the upper terminal of the lamp through the make springs of the third pile-up of relay 313, the break springs of the first pile-up of relay 352 back to the lower side of the lamp 311. A circuit is also completed from the source 309 through resistor 310, the break springs of the first pile-up of relay 352, the make springs of the third pile-up of relay 313, lamp 312, left blade of switch 306 to ground, thus lighting the Rx lamp 312. Similarly, the operation of relay 313 extinguishes the Gy lamp 315 by completing a circuit from the upper terminal of the lamp 315 through the make springs of the fifth pile-up of relay 313 and the break springs of the fifth pile-up of relay 354 back to the lower terminal of the lamp 315. A circuit is also completed from the source 309 through resistor 314, the break springs of the fifth pile-up of relay 354, the make springs of the fifth pile-up of relay 313, through lamp 316, and the left blade of switch 306 to ground, thus lighting the Ry lamp 316. The extinguishment of the two green lamps 311 and 315 and the lighting of the two red lamps 312 and 316, warns the operator that the integrating period has commenced.

The operation of relay 313 closes a circuit from ground through the make springs of the second pile-up of relay 313 to the winding of relay 318, operating relay 318.

The maximum voltage selected by the brush of potentiometer 323, when used as a source of handset rates produces in the output circuit of amplifier 321, a voltage proportional to the maximum target velocity multiplied by the maximum time of flight of the shell, that is, proportional to the maximum predicted displacement of the target. If this voltage were to be applied to the amplifier 321, when the amplifier 321 is used to integrate the applied voltage, the resistor 324 would have to have a very large value of resistance, and the capacitor 345 would have to have a very large value of capacitance. It is thus necessary to reduce the voltage supplied by the brush of potentiometer 323 to the input circuit of amplifier 321. The operation of relay 318 connects resistor 358 through the make springs of the first pile-up of relay 318, in parallel relationship with resistor 359, the combination of resistors being connected in series relationship with resistor 360 from the brush of potentiometer 323 to ground, and connects the upper end of resistor 360 through the make springs of the first pile-up of relay 318 through resistor 324 to the input circuit of amplifier 321. The resistors 358, 359 and 360 thus form a potential divider reducing the voltage supplied by the brush of potentiometer 323, yet maintaining constant the impedance presented to the brush of potentiometer 323, so that the voltage selected by this brush will not be changed.

The operation of relay 318 connects the output circuit of amplifier 321 through the make springs of the fourth pile-up of relay 318, capacitor 345 and resistor 346, through the make springs of the second pile-up of relay 318 to the input circuit of amplifier 321, thus causing the output voltage of amplifier 321 to rise instantly to the current value of $X_0$, and then to continue changing proportionately to the setting of the brush of potentiometer 323, thus starting the integrating period.

The operation of relay 318 also connects the connection 204 through resistor 361 and the make springs of the fifth pile-up of relay 318, through lamp 319, the break springs of the first pile-up of relay 300, the make springs of the first pile-up of relay 308, and resistor 320 to one side of the meter 304. The output circuit of amplifier 321 is connected through the make springs of the third pile-up of relay 308 to the other side of meter 304 thus opposing in meter 304 the voltage of the connection 204, proportional to the observed values of $X_0$ against the output voltage of amplifier 321. Thus inequality of these voltages will be indicated by the meter 304.

A source of voltage 380, having its positive pole grounded, is connected through resistor 381, the break springs of relay 382, and capacitor 383 in parallel with resistor 384, to ground, thus charging the capacitor 383. The source of voltage 380 is also connected through resistor 385 and resistor 386 to a second source of voltage 387, also having the positive pole grounded. The voltage of the source 380 is appreciably larger than the voltage of the source 387, and may be, say, −350 volts, while the voltage of the source 387 may be, say, −190 volts. The negative pole of the source 387 is connected to the cathodes of the double triode 388, which is preferably a high amplification tube having a sharp grid voltage anode current cut-off. The end of resistor 386 is connected through resistors 389 and 390 to the control grids of the double triode 388, thus negatively biasing the control grids of the triodes 388 so that the anode currents are reduced to a small value. The ungrounded terminal of the capacitor 383 is connected to the anode of the upper section of a double diode 391, the cathode of this section being connected to the control grid upper section of the double triode 388. The operation of relay 313 completes a path from ground through the break springs of the first pile-up of relay 351, the make springs of the first pile-up of relay 313, through the winding of relay 382 to battery, thus operating relay 382. As soon as relay 382 is operated, the capacitor 383 commences to discharge through resistor 384, thus reducing the negative potential applied to the anode of the upper section of the double diode 391. When the potential of this anode has fallen until the anode is less negative than the cathode, that is, the anode is positive with respect to the cathode, current will flow from the anode of the upper section of the double diode 391 through resistor 389, resistor 386, and source 387, to ground, thus producing a voltage drop across resistor 389 which tends to impress a positive potential on the control grid of the upper section of the double triode 388, reducing the bias on this control grid so that the grid potential is above the cut-off point. Current can then flow from ground through relay 356, the anode of the upper section of the triode 388 to the cathode and through source 387 to ground, operating relay 356.

The operation of relay 356 completes a circuit from battery through the winding of relay 351, the break springs of the second pile-up of relay 351, the make springs of relay 356 and the make springs of the fourth pile-up of relay 313 to ground, operating relay 351. Relay 351 locks up through the make springs of the second pile-up of relay 351 and the make springs of the fourth pile-up of relay 313.

The operation of relay 351 opens the circuit through the break springs of the first pile-up of relay 351, thus releasing relay 382.

The operation of relay 351 completes a circuit from ground through the make springs of the fourth pile-up of relay 351 and the winding of relay 328 to battery, thus operating relay 328. The operation of relay 328 connects resistors 362, 363 and 364 to form a potential divider reducing the voltage supplied by the brush of potentiometer 333 to the input of amplifier 331, connects the capacitor 347 and resistor 348 from the output circuit to the input circuit of amplifier 331, and connects the connection 217 through resistor 365, lamp 329, break springs of fourth pile-up of relay 300, make springs of sixth pile-up of relay 308 through resistor 330 to one side of the meter 305, the other side of the meter 305 being connected through the make springs of the fourth pile-up of relay 308 to the output of amplifier 331. The voltage generated by the amplifier 331 is thus opposed to the voltage proportional to $Y_0$ supplied by the connection 217, and the difference is indicated on the meter 305. The operation of relay 328 thus starts the integrating period for the Y coordinate.

The operation of relays 318 and 328 respectively grounded the resistors 325 and 335, to prevent these resistors from conducting any undesired voltages to the input circuits of the amplifiers 321 and 331.

The source 380 is connected through resistor 395, the break springs of relay 392, capacitor 393 and resistor 394 in parallel relationship, to ground, thus charging the capacitor 393 to the voltage of the source 380.

The operation of relay 351 completes a path from ground at the break springs of the third pile-up of relay 352 through the make springs of the third pile-up of relay 351 and the winding of relay 392 to battery, thus operating relay 392. Immediately upon the operation of relay 392, capacitor 393 commences to discharge through the resistor 394. The ungrounded terminal of the capacitor 393 is connected to the anode of the lower section of the double diode 391, the cathode of this section being connected to the control grid of the lower section of the double triode 388. The outer end of resistor 386 is connected through resistor 390 to the cathode of the lower diode of the double diode 391, and to the signal grid of the lower section of the double triode 388, thus biasing the control grid of the lower section of the triode 388 so that the anode current is reduced to a small value. As the voltage across the capacitor 393 diminishes, eventually the anode of the lower section of the double diode 391 will become positive with respect to its cathode and current can flow from the anode to the cathode and through resistors 390 and 386 to the source 387, thus reducing the bias on the control grid of the lower section of the double triode 388 and permitting current to flow from ground through the winding of relay 357, the anode and cathode of the lower triode 388 and source 387 to ground, thus operating relay 357.

The operation of relay 357 completes a circuit from battery through the winding of relay 352, the break springs of the fourth pile-up of relay 352, the make springs of relay 357. and the make springs of the fourth pile-up of relay 313 to ground, thus operating relay 352, which locks up through the make springs of the fourth pile-up of relay 352, and the make springs of the fourth pile-up of relay 313.

The operation of relay 352 completes a circuit from the source 309 through resistor 310, the Gx lamp 311, the make springs of the third pile-up of relay 313, the make springs of the first pile-up of relay 352, the break springs of the fourth pile-up of relay 353, through the left blade of switch 306 to ground, thus lighting the green Gx lamp 311, to notify the operator that the period of integration for the X coordinate has been completed, and that the period for adjustment of the brush of potentiometer 323 has commenced. The red Rx lamp 312 is extinguished by a short circuit from the upper terminal of the lamp through the make springs of the third pile-up of relay 313, the make springs of the first pile-up of relay 352, the break springs of the fourth pile-up of relay 353, back to the lower terminal of the lamp 312.

The operation of relay 352 completes a circuit from ground through the make springs of the sixth pile-up of relay 352 and the winding of relay 397 to battery, thus operating relay 397. The operation of relay 397 connects resistors 396 and 398, respectively, in parallel with resistors 384 and 394, thus reducing the times of discharge of the capacitors 383 and 393.

The operation of relay 352 completes a circuit from ground through the break springs of the first pile-up of relay 353, the make springs of the fifth pile-up of relay 352 and the winding of relay 382 to battery, thus operating relay 382. The operation of relay 382 permits ~~the~~ capacitor 383 to discharge through the resistors 384 and 396 in parallel and eventually the anode of the upper section of the double diode 391 will become positive with respect to the cathode, thus reducing the bias on the upper section of the double triode 388, and permitting current to flow from battery through the winding of relay 356, the anode-cathode path of the upper section of the double triode 388 and battery 387 to ground, operating the relay 356, thus ending the period for adjustment of the potentiometer 323.

The operation of relay 356 completes a circuit from battery through the winding of relay 353, the break springs of the second pile-up of relay 353, the make springs of the second pile-up of relay 352, the make springs of relay 356, and the make springs of the fourth pile-up of relay 313, to ground, thus operating relay 353, which locks up through the make springs of the second pile-up of relay 353 and the make springs of the fourth pile-up of relay 313.

The operation of relay 353 removes ground from the make spring of the first pile-up of relay 353, thus releasing relay 382 and permitting capacitor 383 to recharge from the source 380, and completes a circuit from ground through the make spring of the first pile-up of relay 353, the break springs of the second pile-up of relay 354 and the winding of relay 392 to battery operating relay 392.

The operation of relay 353 completes a circuit from the source 309 through resistor 310, the make springs of the fourth pile-up of relay 353, the make springs of the first pile-up of relay 352, and the make springs of the third pile-up of relay 313 through the red Rx lamp 312 and the left blade of switch 306 to ground, thus lighting the red Rx lamp 312 to notify the operator that the time for adjustment of potentiometer 323 has ended, and completes a circuit from the lower terminal of lamp 311 through the make springs of the fourth pile-up of relay 353, the make springs of the first pile-up of relay 352, and the make springs of the third pile-up of relay 313 to the upper terminal of lamp 311, thus short-circuiting and extinguishing lamp 311.

Immediately upon the operation of relay 392, capacitor 393 commences to discharge through resistors 394 and 398 in parallel, and eventually the anode of the lower section of the double diode 391 will become positive with respect to its cathode, thus reducing the bias on the control electrode of the lower section of the double triode 388 permitting current to flow from ground through the winding of relay 357, the anode-cathode path of the lower section of the double triode 388 to the source 387, operating relay 357.

The operation of relay 357 completes a circuit from battery through the winding of relay 354, the make springs of the third pile-up of relay 353, the make springs of relay 357 and the make springs of the fourth pile-up of relay 313 to ground, thus operating relay 354, which locks up through the make springs of the fourth pile-up of relay 313. The operation of relay 354 completes a circuit from the source 309 through resistor 314 and the green Gy lamp 315, through the make springs of the fifth pile-up of relay 313, the make springs of the fifth pile-up of relay 354, the break springs of the third pile-up of relay 355, and the left blade of switch 306 to ground, thus lighting the green Gy lamp 315 to notify the operator that the period for adjustment of the brush of potentiometer 333 has commenced, and also completes a circuit from the upper terminal of lamp 316 through the make springs of the fifth pile-up of relay 313, the make springs of the fifth pile-up of relay 354, and the break springs of the third pile-up of relay 355 back to the lower terminal of the lamp 316, thus extinguishing the red Ry lamp 316.

The operation of the break springs of the second pile-up of relay 354 opens the circuit to relay 392, releasing relay 392.

The operation of relay 354 completes a circuit from ground through the break springs of the first pile-up of relay 355, the make springs of the first pile-up of relay 354, and the winding of relay 382 to battery, thus operating relay 382.

The operation of relay 382 permits the capacitor 383 to discharge through the resistors 384 and 396, and eventually the anode of the upper section of the double diode 391 will become positive with respect to its cathode, thus reducing the bias on the control electrode of the upper section of the double triode 388 and permitting current to flow from ground through the winding of relay 356, the anode-cathode path of the upper section of the double triode 388 and the source 387, operating the relay 356.

The operation of relay 356 completes a circuit from battery through the winding of relay 355, the make springs of the third pile-up of relay 354, the make springs of relay 356, and the make springs of the fourth pile-up of relay 313 to ground, thus operating relay 355 which locks up through the make springs of the second pile-up of relay 355 and the make springs of the fourth pile-up of relay 313.

The operation of the break springs of the first pile-up of relay 355 opens the circuit to relay 382, thus releasing relay 382.

The operation of relay 355 completes a circuit from the source 309 through resistor 314, make springs of the third pile-up of relay 355, make springs of the fifth pile-up of relay 354, make springs of the fifth pile-up of relay 313, through the red Ry lamp 316 and the left blade of switch 306 to ground, thus lighting the red Ry lamp 316, notifying the operator that the time for adjustment of the potentiometer 333 has ended. A circuit is also closed from the lower terminal of the green Gy lamp 315 through the make springs of the third pile-up of relay 355, the make springs of the fifth pile-up of relay 354, the make springs of the fifth pile-up of relay 313 to the upper terminal of lamp 315, thus short-circuiting and extinguishing the lamp 315.

If the operator should find that he has not been able to obtain a satisfactory adjustment of the potentiometers 323 and 333 in the intervals allotted by the adjustment sequence, he can press the push-button key 350, thus releasing relay 313, which in turn releases all the relays 351, 352, 353, 354 and 355, and the operator can then restore the key 350 again operating relay 313 and instituting a new sequence of adjustment.

In a typical system of this character, the operations occurred in the following sequence, counting time from the instant that switch 327 was moved to the third position, thus operating relays 313 and 318. After 5 seconds, relay 328 operates. At 39 seconds after the start, the red Rx lamp 312 is extinguished, and the green Gx lamp 311 is lighted warning the operator to adjust potentiometer 323. At 41 seconds after the start, the green Gx lamp 311 is extinguished and the red Rx lamp 312 is lighted notifying the operator that the adjustment period has ended. At 44 seconds after the commencement, the red Ry lamp 316 is extinguished and the green Gy lamp 315 is lighted notifying the operator that the period for adjustment of potentiometer 333 has commenced. At 46 seconds, the green Gy lamp 315 is extinguished, and the red Ry lamp 316 is lighted, notifying the operator that the period for adjustment of potentiometer 333 has ended.

The sequence of discharge times for the capacitors 383 and 393 will then be for capacitor 383, 5 seconds, for capacitor 393, 34 seconds, for capacitor 383, second operation, 2 seconds, for capacitor 393, second operation, 3 seconds, and for capacitor 383, third operation, 2 seconds. With this timing sequence, a source 380 of −350 volts and a source 387 of −190 volts, the constants of the circuit were as follows: Capacitor 383, 1.08 microfarads, capacitor 393, 4.00 microfarads, resistor 384, 7.83 megohms, resistor 396, 5.23 megohms, resistor 394, 14.4 megohms, resistor 398, 1.39 megohms, resistor 385, 150,000 ohms, resistor 386, 7000 ohms, resistors 381 and 395, 50,000 ohms each, resistors 389 and 390, 1 megohm each.

In a typical embodiment of the system, resistors 324, 325, 334 and 335 were 10 megohms, and capacitors 345, 347 were 2 microfarads. If the settings of the brushes of potentiometers 323 and 333 are incorrect during the integrating period of 40 seconds, the outputs of the amplifiers 321 and 331 will have an accumulated error. When relay 318 is operated, capacitor 366 in series with resistor 367 is connected from the brush of potentiometer 323 to the input circuit of amplifier 321 and the operation of relay 328 similarly connects capacitor 368 in series with resistor 369 from the brush of potentiometer 333 to the input circuit of amplifier 331.

The potential divider formed by resistors 358, 359, 360 applies one-fifth of the voltage selected by the brush of potentiometer 323 to the input circuit of amplifier 321. If $\Delta e_3$ be the voltage error in the setting of this brush, then since $$-e_0=\frac{1}{r_1C_0}\int e_3 dt$$

the integrated error in an integration period of 40 seconds will be $$-\Delta e_0=-\frac{1}{10\times 2}\times\frac{\Delta e_3}{5}\times 40=-\frac{4}{10}\Delta e_3$$

In Fig. 11, assume that a source of voltage $e_3$ is connected through capacitor $C_3$ to the control grid of vacuum tube 116, and that a capacitor $C_0$ is connected from the control grid of vacuum tube 116 to the anode of vacuum tube 127. Let $K=1$, and, as before, $e_g$ will be nearly zero and $e_0$ will equal the voltage across capacitor $C_0$. Let the voltage $e_3$ change by a small amount $\Delta e_3$, then a charge $\delta=C_3\Delta e_3$ will flow into capacitor $C_3$ and an equal charge will flow into capacitor $C_0$, changing the voltage across $C_0$ by the amount $$-\frac{q}{C_0}$$

and causing an equal change $-e_0$ in the output voltage. Thus, $$-\Delta e_0=-\frac{q}{C_0}=-\frac{C_3}{C_0}\Delta e_3$$

Thus, $$C_3=C_0\cdot\frac{\Delta e_0}{\Delta e_3}$$

The capacitors 366 and 368, Fig. 3, thus should be $$2\times\frac{4}{10}=0.8 \text{ microfarad each}$$

The resistors 346, 348, 367, 369 are necessary in order to prevent the amplifiers from singing. They also serve to reduce transient disturbances in switching and may be of the order of 1 or 2 megohms. It has been proven mathematically, and demonstrated experimentally that these resistors do not materially change the effects of capacitors 345, 347, 366, 368, if the product of resistance 367 and capacitance 366 is equal to the product of resistance 346 and capacitance 345, and similarly for resistances 367 and 348 and capacitances 368 and 347, respectively.

After the brushes of potentiometers 323 and 333 have been satisfactorily adjusted, switch 327 is moved to the fourth contact. The left-hand blade of switch 327 bridges the third and fourth contacts so that relay 313 is not released. The right-hand blade of switch 327 completes a circuit from battery through the winding of relay 300, right-hand blade of switch 327 and right-hand blade of switch 306 to ground, operating relay 300. The operation of relay 300 disconnects the connections 204 and 217 from the meters 304 and 305, opens the output circuits of the amplifiers 164 and 167, Fig. 2, and connects the output circuits of the amplifiers 321 and 331, Fig. 3, to the connection 204 and 217 leading to the amplifiers of Fig. 4.

Figure 5:
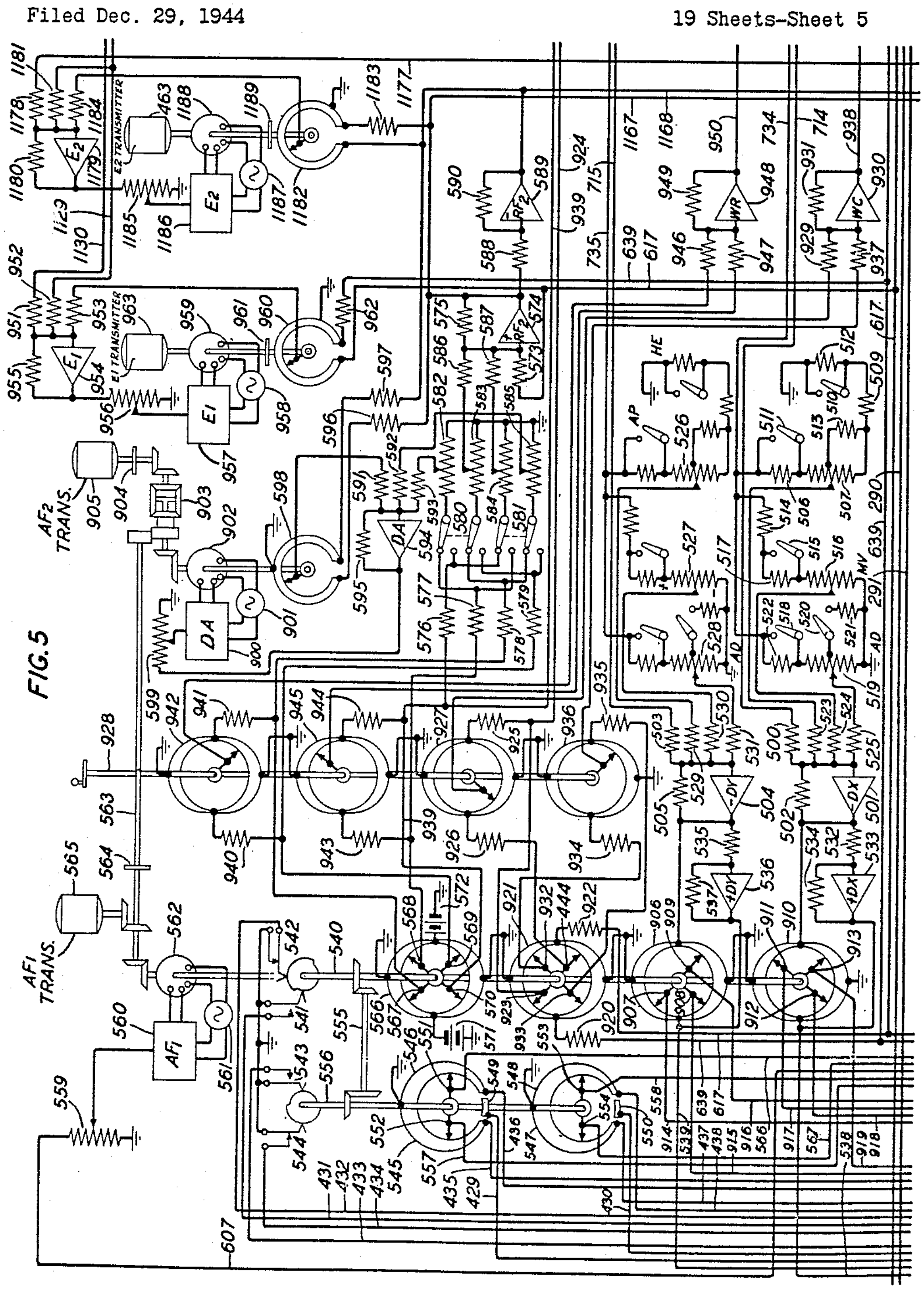

The output circuits of the differentiator amplifier 283 and 283′, Fig. 4, or the amplifiers 321, 331, Fig. 3, when arranged to supply rate voltages are respectively connected by connections 290, 291, Figs. 3 and 5, through resistors 700, 701, Fig. 7, and the winding of potentiometer 702, and through resistors 703, 704 and the winding of potentiometer 705, to ground. The brushes of potentiometers 702, 705 are rotated by the shaft 800 and assist in fractionating the voltages from connections 290, 291 proportionally to the time of flight of the shell from the pivot gun $G_1$ to the predicted position of the target.

One of the most difficult problems encountered in the development of a computer for controlling artillery fire is the production of physical quantities, such as electrical voltages, electrical currents, or physical movements, which vary in magnitude in accordance with the differential ballistic effects which control the flight of the shell after it leaves the weapon. The regular firing tables for a given weapon and ammunition are based upon the assumption of standard conditions, such as lack of wind and earth rotation, standard temperature and pressure of the air, normal muzzle velocity of the weapon and weight of the projectile, etc. If any of these conditions are non-standard, an appropriate correction in the gun orders must be made.

In prior artillery computers, ballistic corrections were made for only one type of weapon and ammunition, and conditions, such as air density, muzzle velocity, temperature, etc., which may be larger or smaller than normal, were assumed to vary symmetrically above and below the normal value. Thus, in electromechanical computers, the card supporting the winding of a potentiometer, or, in mechanical computers, the contour of a three-dimensional cam, was empirically shaped to produce a physical quantity, such as the voltage selected by the brush of the potentiometer or the movement of the cam follower, which varied with the desired ballistic effect.

With the larger weapons of longer range, such as the weapons used in coast defense batteries, it has been found that the assumption of symmetrical variation of the ballistic effects above and below the normal values is not sufficiently accurate, and that these value smust be independently computed. Also, in the present computer, the ballistic effects are determined for one weapon using two or more different types of shells of propellants, and for another different weapon, which may be a small caliber, short range weapon used for practice shooting.

If the present computer were to be designed in accordance with the prior practice, five shaped potentiometer cards would be required for each ballistic effect, that is, plus and minus values of the effect for one type of shell or propellant, plus and minus values of the effect for another type of shell or propellant, and one card for all values of the effect for the subcaliber weapon.

In the present invention, the card supporting the winding of a single potentiometer is so shaped and combined with any one of five resistance networks that, for the same movements of the brush of the potentiometer, the output voltage from a given network will have the same variation as one of the desired ballistic effects.

In the present computer, these ballistic effects are computed with respect to the "ballistic elevation angle" B for the gun. The "ballistic elevation angle" B corresponds to the elevation angle of the gun as given in the firing tables, for firing at a target in the horizontal plane of the gun.

The tabulated values of these ballistic effects may be plotted as functions against the ballistic elevation angle B, in mils, to produce curves similar to the curves shown in Figs. 21 to 28. In the computer, the values of these effects are to be represented by the amplitudes of voltages with respect to ground, thus, the roots, or zeros, of the functions will be represented by points on the potentiometer winding at which the output voltage of the network is zero, or ground potential. With a single source of potential connected to a point in the winding, or to the brush, two points in the winding may be grounded, to represent two roots of the function, but any more grounds would, in general, be ineffective, as they would short-circuit a portion of the winding.

Figure 21:
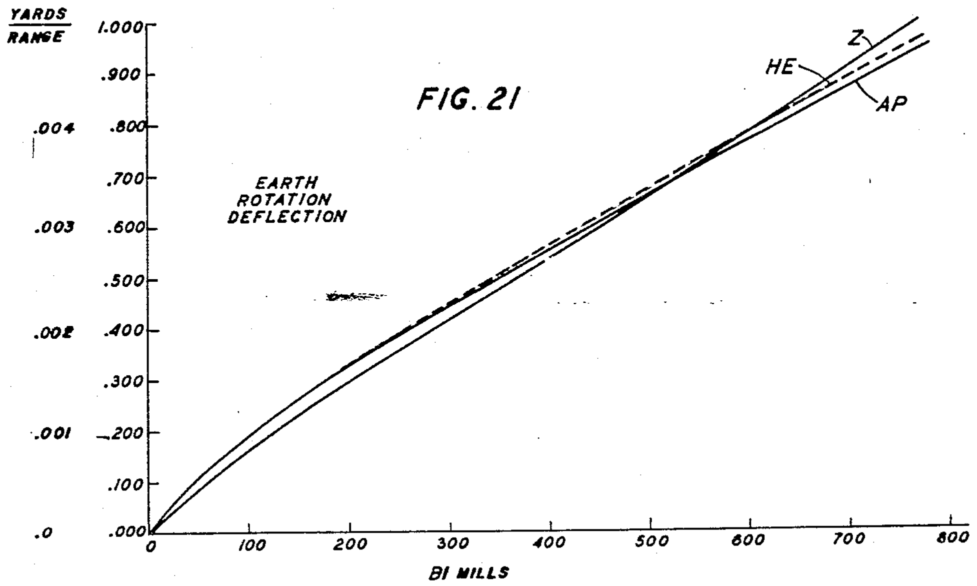
Figure 28:
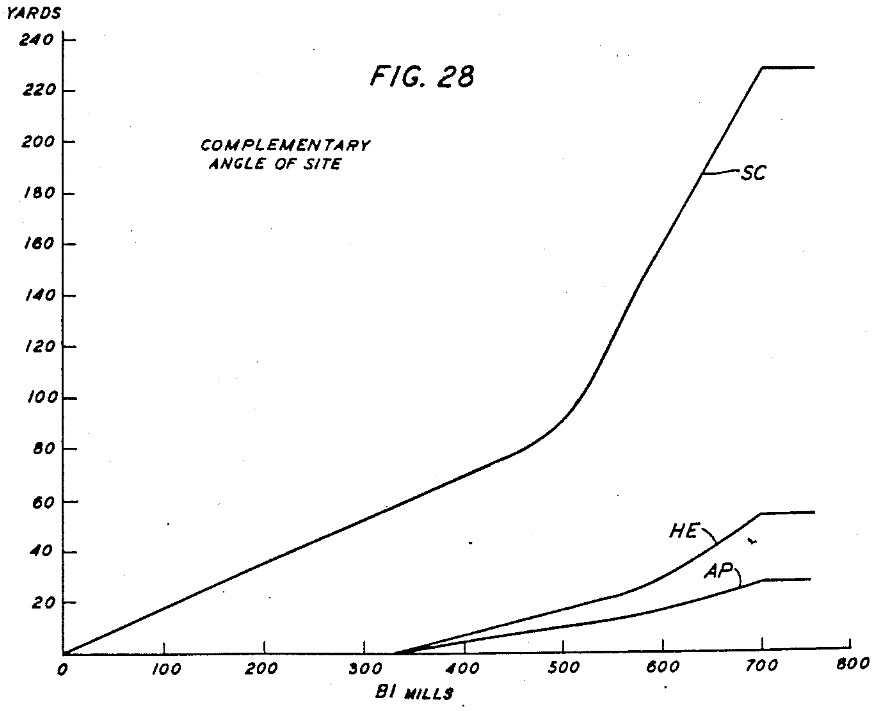

It is well known that a continuous analytic function, such as the functions shown in Figs. 21 and 28, may be represented, to any desired degree of accuracy by the quotient of two polynomials, and this method of analysis of the functions may conveniently be used, because, if a single potentiometer per network is used, it may be shown that the most general output voltage $v$ of the network can be expressed by the quadratic relationship:

$$v(Z)=\frac{K(R_1-Z)(R_2-Z)}{(P_1-Z)(P_2-Z)} \qquad (8)$$

Z is the independent variable, which, in the useful range is the portion of the resistance of the potentiometer winding from the end of the winding which is assumed to be zero to the brush, the resistance of the complete winding being taken as unity, K is related to the applied voltage, the poles $P_1$, $P_2$ are real numbers with certain restrictions on their values, and the roots $R_1$, $R_2$ may be real or conjugate complex, with no restrictions, and $v(Z)$ is the functional variation of $v$ with variation of Z. The roots $R_1R_2$ represent the points on the potentiometer winding at which the output voltage of the network is zero, and the poles $P_1P_2$ represent points, outside the range of the winding, at which the theoretical output of the netpork would be infinite.

It is evident that by giving K, $R_1$, $R_2$, $P_1$ and $P_2$ various possible values, a great variety of voltage characteristics $v(Z)$ may be obtained. These quantities are to be chosen so that the expression (8) will fit the ballistic data to a good degree of approximation. The only real limitations are on the locations of the poles $P_1$ and $P_2$. The nature of these can be shown as follows.

The denominator of (8) may be written as $$-(P_1-Z)(P_2-Z)=-P_1P_2+(P_1+P_2)Z-Z^2=C+DZ-Z^2$$

An analysis of this equation will show that, as the determinant of the equation of a resistance network must be positive for all positions of the potentiometer brush, C is a positive quantity while D may be of either sign. As $C=-P_1P_2$ and since $C>0$ the poles $P_1$ and $P_2$ must have opposite signs. Further, neither pole can lie in the region $0<Z<1$ as this would require a finite resistance circuit to give an infinite output voltage. Also $D=P_1+P_2$ and if C is expressed in terms of D and $P_2$ there results $C=DP_2+P_2^2$. The pole $P_2$ may be arbitrarily taken to be positive. Hence we must have $C>1-D$.

In fitting ballistic data with (8), these restrictions, namely, $C>0$, $C>1-D$ must be observed.

Figures 25, 26:
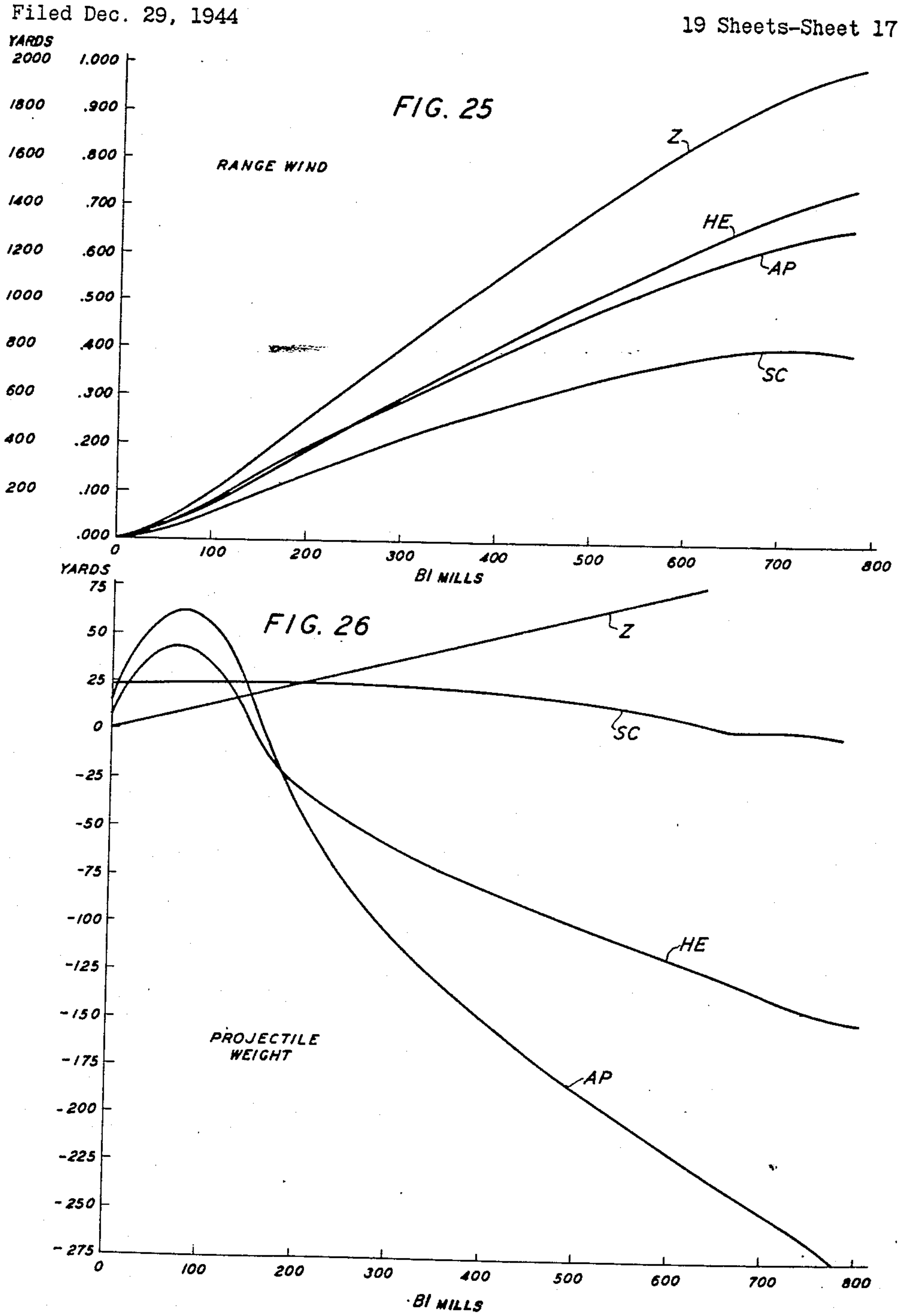

Functions having two roots, such as the functions shown in Fig. 26, may be simplified by shifting the zero axis until the function has only one root, thus, the analysis can be considerably simplified by noting that Equation 8 may be also written as $$v(Z)=K_1-\frac{K_2Z(R-Z)}{(P_1-Z)(P_2-Z)} \qquad (8a)$$

This shows that the most general output voltage can be broken down into a constant term plus a variable term which vanishes at zero value of the independent variable Z, which is at zero elevation. Hence the fitting of ballistic data may proceed by first subtracting out the intercept at zero elevation and fitting the remainder with the variable part of (8a). The intercept, if any, is later restored by methods to be described. With this understanding, $$v(Z)=\frac{KZ(R-Z)}{C+DZ-Z^2} \qquad (9)$$

Potentiometer circuits will now be described that permit the physical realization of the equations.

Figure 13A:
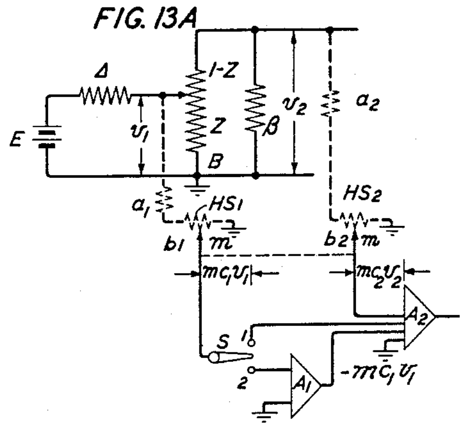

In Fig. 13A, a grounded source of voltage E, is connected through a resistance $\Delta$ to the brush of a potentiometer B. The brush of this potentiometer is moved in accordance with the ballistic elevation angle B. The winding of potentiometer B varies in resistance from zero at the grounded end to unity, and the brush divides the winding into two fractions, Z and $1-Z$ where Z is less than one. A resistance $\beta$ may be connected across the winding of potentiometer B. Resistance $\Delta$ may have values from zero to any finite quantity; resistance $\beta$ may have any value, including zero, when the upper end of the winding of potentiometer B is grounded, or infinity, when the upper end of the winding of potentiometer B is open circuited.

The output voltage function may be taken as that between the brush of potentiometer B and ground and is designated as $v_1$. It may also be taken across the winding of the potentiometer, or, what is the same thing across the resistance $\beta$. This is designated as $v_2$. At times it is necessary to take a linear combination of the voltages, such as $c_1v_1+c_2v_2$, where $c_1$ and $c_2$ are fixed fractions. Also, the voltage functions, as generated by the ballistic networks, are for the maximum values of the ballistic effect, and must be further fractionated in the ratio $m$ of the desired value to the maximum value of the effect.

In Fig. 13A, the resistance of the handset potentiometer $HS_1$ is $b_1$. One end is grounded and the other end is connected to the brush of potentiometer B through a resistance $a_1$. The values of $a_1$ and $b_1$ are chosen such that $c_1=b_1/(a_1+b_1)$. If the slider of $HS_1$ is set at the fraction $m$ of the resistance $b_1$, the voltage between the slider and ground is then $mc_1v_1$.

Similarly, the resistance of handset potentiometer $HS_2$ is $b_2$ and the resistance in series with it is $a_2$. The values of $a_2$ and $b_2$ are such that $$c_2=b_2/(a_2+b_2)$$

The slider of $HS_2$ is positioned by ganging or otherwise, so that it takes off the same fraction $m$ as in $HS_1$, and the voltage from it to ground is $mc_2v_2$.

The handsets $HS_1$ and $HS_2$, together with their associated resistors $a_1$ and $a_2$ are shown by dotted lines in Fig. 13A. Unless $a_1+b_1$ is very much greater than $\Delta$, and $a_2+b_2$ is very much greater than $\beta$, suitable modifications must be made in the values of E, $\Delta$ and $\beta$.

For further discussion, $m$ may be taken as unity, that is, we shall restrict the treatment to the case of the maximum ballistic effect.

*Case I*

In the circuit shown in Fig. 13A:

$$v_1=\frac{EZ(\beta+1-Z)}{\Delta(\beta+1)+(\beta+1)Z-Z^2} \qquad (10)$$

$$v_2=\frac{E\beta Z}{\Delta(\beta+1)+(\beta+1)Z-Z^2} \qquad (11)$$

By comparing (10) and (11) with (9), it will be seen that K corresponds to E in (10) and to $E\beta$ in (11). It will be noted that since the least value of $\beta$ is zero, the negative pole $P_1$ will be closer to the origin than the positive pole $P_2$ is to $Z=1$. This necessarily restricts the types of output characteristics obtainable. Furthermore, in (10) and (11) there is no control over the location of the root R. In (10) it is at $Z=\beta+1$ and in (11) at $Z=\infty$.

*Generalized Case I*

The restriction imposed by Equations 10 or 11 on the root R may be eliminated by adding together appropriate fractions of $v_1$ and $v_2$ in a feedback amplifier as shown in Fig. 13A.

If $v=c_1v_1+c_2v_2$ $$v=\frac{Ec_1Z[\beta+1+c_2\beta/c_1-Z]}{\Delta(\beta+1)+(\beta+1)Z-Z^2} \qquad (12)$$

By proper choice of the sign and value of $c_2/c_1$ the root R in (9) may now be placed anywhere on the Z axis. The restrictions on the poles are still the same as for (10) and (11). The method for obtaining the fractionations $c_1$ and $c_2$ has been described previously. If the ratio $c_1/c_2$ is positive the switch S in Fig. 13A must be operated to position 1, and if negative to position 2. In the former case, the feedback amplifier $A_2$ adds together the voltage components $c_1v_1$ and $c_2v_2$. In the latter case, the feedback amplifier $A_1$ reverses the $c_1v_1$ term in sign and then the amplifier $A_2$ will form the sum $c_2v_2-c_1v_1$.

*Generalized Case II*

Figure 13B:
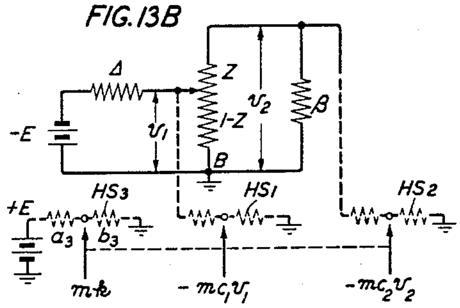

In Fig. 13B the connections to the winding of potentiometer B are interchanged and the sign of the driving voltage is reversed with respect to Fig. 13A and a handset potentiometer $HS_3$ is ganged with $HS_1$ and $HS_2$ to supply a voltage $mk$.

If $v=k-c_1v_1-c_2v_2$ and if $k$ is taken to have the value $$k=\frac{E\beta(c_1+c_2)}{\Delta(\beta+1)+\beta}$$

$$v=\frac{EZ[c_1\Delta(\beta+1)-c_2\beta]}{\Delta(\beta+1)+\beta}\times\frac{\left[\frac{\beta(c_1+c_2)(\Delta(\beta+1)+1)-c_1(\Delta(\beta+1)+\beta)}{c_1\Delta(\beta+1)-c_2\beta}+Z\right]}{\Delta(\beta+1)+\beta+Z(1-\beta)-Z^2} \qquad (13)$$

It is to be noted first of all that the coefficient of the Z term in the denominator can be made anything between unity and negative infinity by proper choice of $\beta$. This means that the negative pole $P_1$ may now be placed farther from the origin than the positive pole $P_2$ is from $Z=1$. Thus Cases I and II cover any possible locations of the poles, subject to the restrictions already stated.

Just as in Case I, the root R may now be placed anywhere on the Z axis by suitable choice of $c_1/c_2$.

Thus, the circuits for Cases I and II permit the root and poles to be placed arbitrarily, subject to the limitation that the poles must be of opposite sign and cannot be within the useful range of the variable Z. Cases I and II are plotted on a unit scale in Figs. 14 and 15 for various values of R, with $P_1=-.25$ and $P_2=1.5$ for Case I and $P_1=-1.5$, $P_2=1.25$ for Case II.

*Case III*

As a useful special condition of Fig. 13A, take $\beta$ as being infinite and $c_2=0$, $c_1=1$. In Equation 9, this corresponds to $R=P_2$ and $K=E$. Then, $$v_1=\frac{EZ}{\Delta+Z} \qquad (14)$$

For this circuit, the pole $P_1$ may be placed anywhere on the negative Z axis.

*Case IV*

In Fig. 13B, let $\beta$ be infinite, $c_2=0$, $c_1=1$ and $k=E/(\Delta+1)$, then, $$v_1=\frac{E\Delta}{\Delta+1}\cdot\frac{Z}{\Delta+1-Z} \qquad (15)$$

For this circuit the pole $P_2$ may be placed anywhere on the positive Z axis except between zero and unity.

*Case V*

Figure 13C:
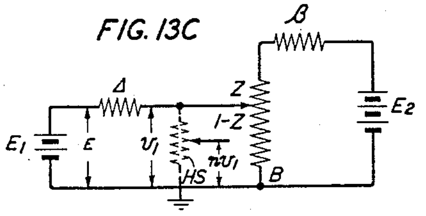

In Fig. 13C, a source of voltage $E_1$ is connected through a resistance $\Delta$ to the brush of potentiometer B and a second source of voltage $E_2$ is connected through a resistance $\beta$ to the potentiometer winding. Then, $$v_1=\frac{Z[E_1(\beta+1-Z)+E_2\Delta]}{\Delta(\beta+1)+(\beta+1)Z-Z^2} \qquad (16)$$

which can be made identical with Equation 12 by letting $E_1=E$ and $E_2\Delta/E_1=c_2/c_1$. The applied voltages may be made of opposite sign if desired. This circuit will thus give the same characteristic as in Fig. 13A in a somewhat simpler manner.

In an analogous manner, it is possible to insert a source of voltage in series with the resistance $\beta$ in Fig. 13B, and the voltage $v_1$ can then be of a form which is identical with Equation 13.

Figure 13D:
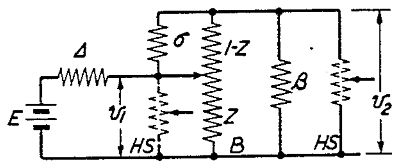
Figure 13E:
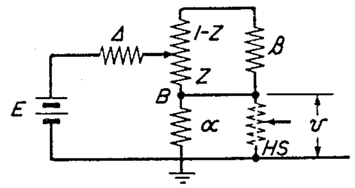
Figure 13F:
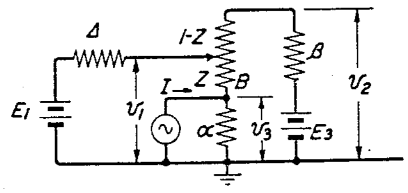
Figure 13G:
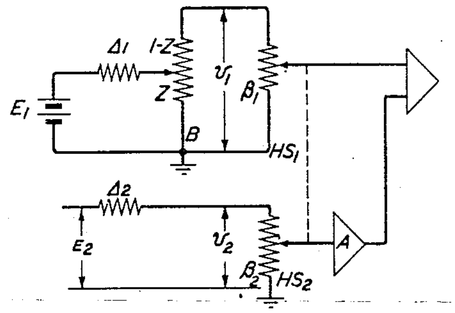
Figure 13H:
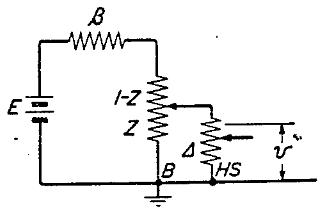

In Fig. 13H, a grounded source of voltage E is connected through a resistance $\beta$ to the winding of potentiometer B. The brush of potentiometer B is connected through the winding of a potentiometer HS, having a resistance $\Delta$ to ground. The voltage across the winding of potentiometer HS is designated $v$. Then, $$v=\frac{E\Delta Z}{\Delta(\beta+1)+Z(\beta+1)-Z^2} \qquad (19)$$

which is the same as Equation 11.

In Fig. 13G, a source of voltage E is connected through a resistance $\Delta_1$, to the brush of potentiometer B. A handset potentiometer $HS_1$ having a resistance $\beta_1$, is connected across the winding of potentiometer B. Then, from Equation 11, the voltage $v_1$ across the winding of potentiometer $HS_1$ will be $$v_1=\frac{E\beta_1 Z}{\Delta_1(\beta_1+1)+Z(\beta_1+1)-Z^2}$$

The source of voltage E is also connected through resistance $\Delta_2$ and the winding of potentiometer $HS_2$, having a resistance $\beta_2$ to ground. The voltage across $\beta_2$ will be $$\frac{E\beta_2}{\Delta_2+\beta_2}$$

The brush of potentiometer $HS_2$ is connected through amplifier A, of the type shown in Fig. 11, to the brush of potentiometer $HS_1$. The maximum voltage will then be $$\frac{E\beta Z}{\Delta_1(\beta_1+1)+Z(\beta_1+1)-Z^2}-\frac{E\beta_2}{\Delta_2+\beta_2} \qquad (20)$$

which is a special case of Equation 8a.

*Case VI*

In Fig. 13D a source of voltage E is connected through a resistance $\Delta$ to the brush of potentiometer B. A resistance $\beta$ is connected across the winding of potentiometer B, and a resistance $\sigma$ is connected from the upper end of the winding of potentiometer B to the brush. The handset potentiometer HS is connected either from the brush of potentiometer B to ground, or across the resistance $\beta$.

$$v_1=\frac{EZ[\beta+\sigma+\beta\sigma-Z(\beta+\sigma)]}{\Delta(\beta+\sigma+\beta\sigma)+Z(\beta+\sigma+\beta\sigma+\Delta-\Delta\beta)-Z^2(\Delta+\beta+\sigma)} \qquad (21)$$

$$v_2=\frac{E\beta Z(1+\sigma-Z)}{\Delta(\beta+\sigma+\beta\sigma)+Z(\beta+\sigma+\beta\sigma+\Delta-\Delta\beta)-Z^2(\Delta+\beta+\sigma)} \qquad (22)$$

Thus in this case, $$C=\frac{\Delta(\beta+\sigma+\beta\sigma)}{\Delta+\beta+\sigma}$$

$$D=1+\frac{\beta(\sigma-\Delta)}{\Delta+\beta+\sigma}$$

$$R=1+\sigma \text{ or } 1+\frac{\beta\sigma}{\beta+\sigma}$$

It will be seen that by proper choice of values of $\beta$, $\sigma$ and $\Delta$, the coefficient D may be made greater or less than unity, thereby enabling the poles to be placed as desired without reversal of the potentiometer winding; subject, of course, to the limitations already described, namely, $$C>0, C>1-D$$

By taking a suitable linear combination of voltages $c_1v_1+c_2v_2$, the root R may be placed any desired place on the Z axis.

*Case VII*

It will be noted that Equation 8a differs from Equation 9 only in the added constant $K_1$. This difference is equivalent to shifting the Z axis in Figs. 14 and 15. Methods of adding constant voltages to the voltage functions given by Equation 9 have been described in connection with Figs. 13B and 13G. These may require a handset potentiometer, or at least, a pair of fractionating resistances, such as $a_3$ and $b_3$ in Fig. 13B. This may be obviated by constructing a circuit that will give Equation 8a directly.

In Fig. 13F, a grounded source of voltage $E_1$ is connected through resistance $\Delta$ to the brush of potentiometer B. The lower end of the winding of potentiometer B is connected through resistance $\alpha$ to ground. A grounded source of constant current I is connected to the junction of B and $\alpha$. A resistance $\beta$ is connected to the upper end of the winding of potentiometer B and through a source of voltage $E_3$ to ground. The windings of handset potentiometers may be connected from the brush of potentiometer B to ground to fractionate the voltage $v_1$, or from the upper end of the winding of B to ground to fractionate the voltage $v_2$ or across resistance $\alpha$ to fractionate the voltage $v_3$. Then, $$v_1\cdot D'=E_1\left(\alpha\left[\beta+1+\frac{E_3}{E_1}\Delta+\frac{I\Delta}{E_1}(\beta+1)\right]+Z\left[\frac{E_3}{E_1}\Delta+\beta+1-\alpha-\frac{I\Delta\alpha}{E_1}\right]-Z^2\right) \qquad (23)$$

$$v_2\cdot D'=E_3\left(\Delta+\alpha\left(\Delta+1+\frac{E_1}{E_3}\beta+\frac{I\Delta\beta}{E_3}\right)+Z\left(1-\alpha+\frac{E_1}{E_3}\beta\right)-Z^2\right) \qquad (24)$$

$$v_3\cdot D'=\alpha\left(E_3\Delta+(E_1+I\Delta)(\beta+1)+Z[I(\beta+1)-E_1]-IZ^2\right) \qquad (25)$$

where $$D'=\Delta(1+\beta+\alpha)+\alpha(\beta+1)+Z(1+\beta-\alpha)-Z^2 \qquad (26)$$

By comparing these equations, for example, Equation 23, with Equation 8a, evidently $$D^1K_1 = E_1\alpha\left[\beta+1+\frac{E_3}{E_1}\Delta+\frac{I\Delta}{E_1}(\beta+1)\right]$$

and $$-K_2Z(R-Z)=E_1Z\left[\frac{E_3}{E_1}\Delta+\beta+1-\alpha-\frac{I\Delta\alpha}{E_1}-Z^2\right]$$

Usually, in order to obtain a match, the sign of $$\frac{E_3}{E_1}$$

will be determined by the latter expression. In Fig. 13F, assuming $E_1$ to be positive, the current I flows in the same direction through $\alpha$ as the current from $E_1$, and this direction of flow is assumed to be positive. If $K_1$ in Equation 8a is negative, usually I will also be negative, but, if $K_1$ is positive I may be positive, or zero. In Equations 23 to 26, the roots may be placed, as required, anywhere on the Z axis, or may be conjugate complex. By a judicious choice of the value of $\alpha$, the values of $\beta$ and $\Delta$ may be controlled.

Also, depending on the value of $\alpha$, the poles $P_1$ and $P_2$ may be placed wherever desired, subject only to the limitations already stated. However, from the standpoint of practical design, it may be more desirable to reverse the connections to the windings of the potentiometer B. The necessary design equations can be obtained by replacing Z with 1−Z and 1−Z with Z in Equations 23, 24, 25 and 26.

*Case VIII*

In Fig. 13E, a source of voltage E is connected through a resistance $\Delta$ to the brush of potentiometer B. A resistance $\beta$ is connected across the winding of potentiometer B, and a resistance $\alpha$ is connected from the lower end of the winding of potentiometer B to ground. A handset potentiometer HS is connected across resistance $\alpha$. Then, $$v=\frac{E\alpha}{\alpha+\Delta+Z-\frac{Z^2}{(1+\beta)}} \qquad (27)$$

Figure 16:
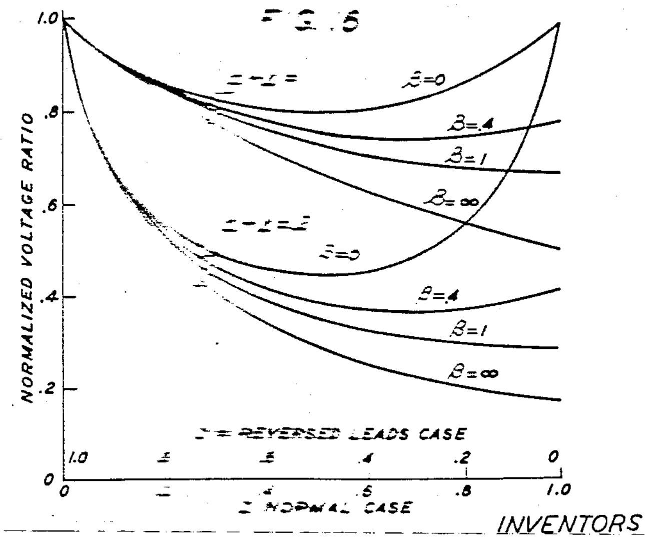

Characteristics which may be obtained with this circuit are shown in Fig. 16. The effect of reversal of leads can be seen by using the scale of reversed abscissae.

One method of choosing a circuit configuration to produce a voltage function varying in accordance with given data is to first normalize the data, that is, make the value of the data for the maximum value of the parameter Z equal unity and compute the other values accordingly. The data may then be plotted and the resultant curves compared with the curves in Figs. 14, 15 or 16 in order to decide which circuit variant will best fit the data.

Figure 14:
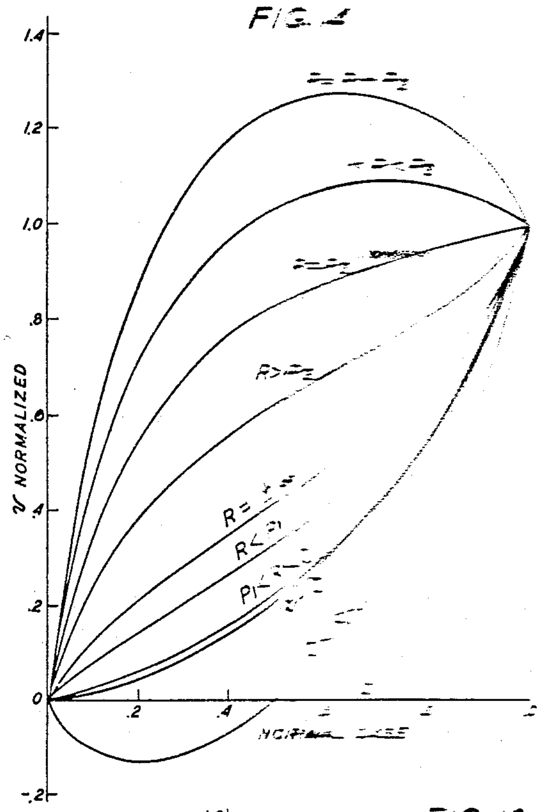
Figs. 14 to 18 show curves related to the networks of Fig. 13.
Figure 15:
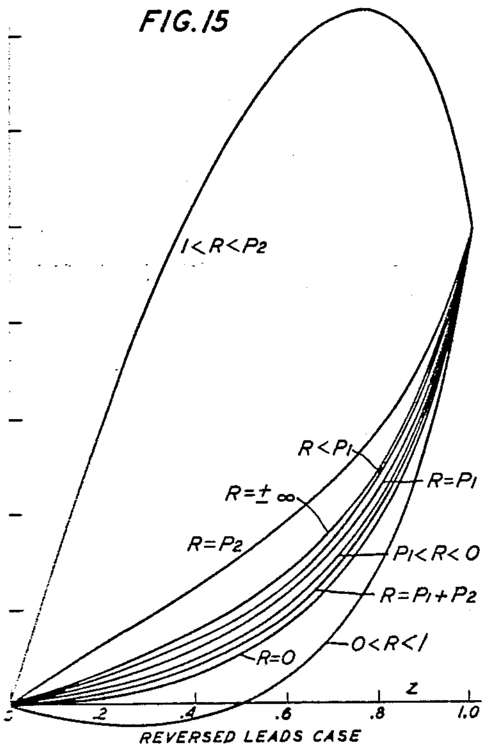

However, many of the curves of Figs. 14, 15 and 16 appear to be qualitatively similar and the proper choice is not easy.

Figure 17:
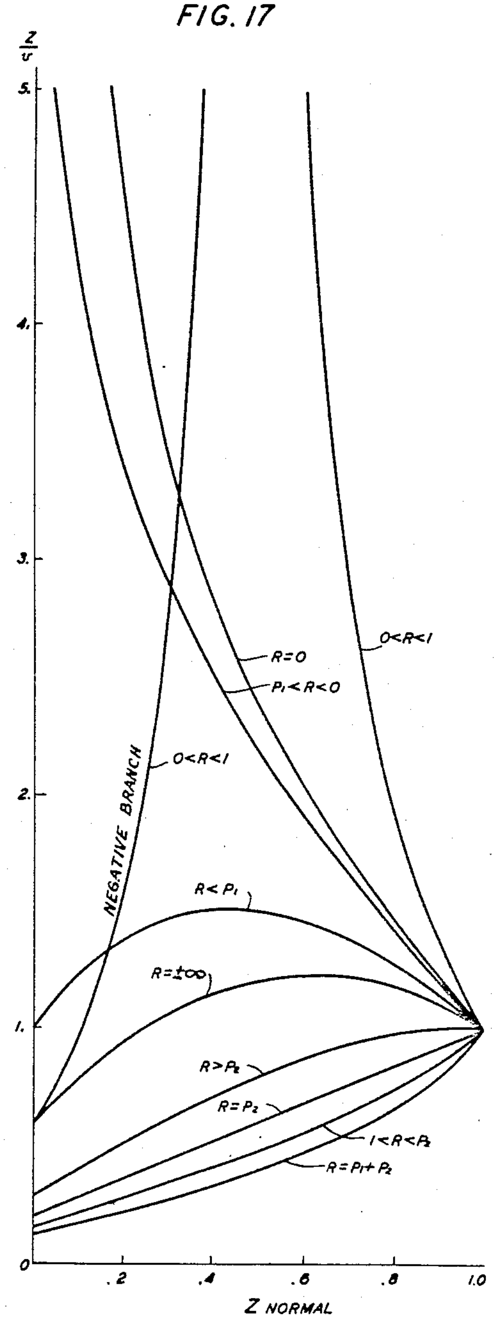
Figure 18:
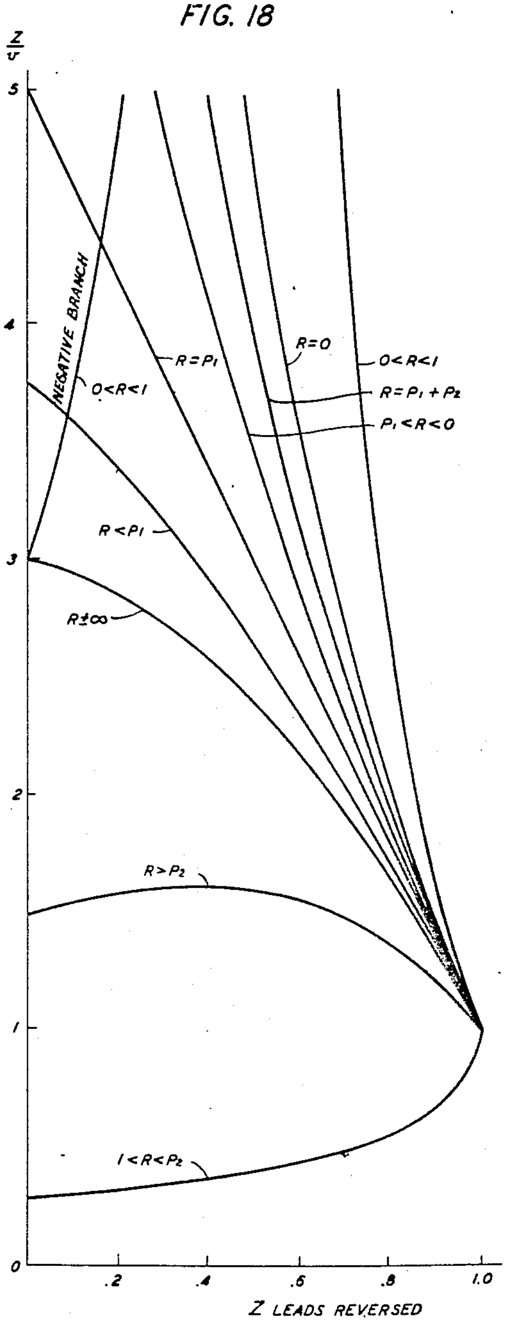
Figure 20:
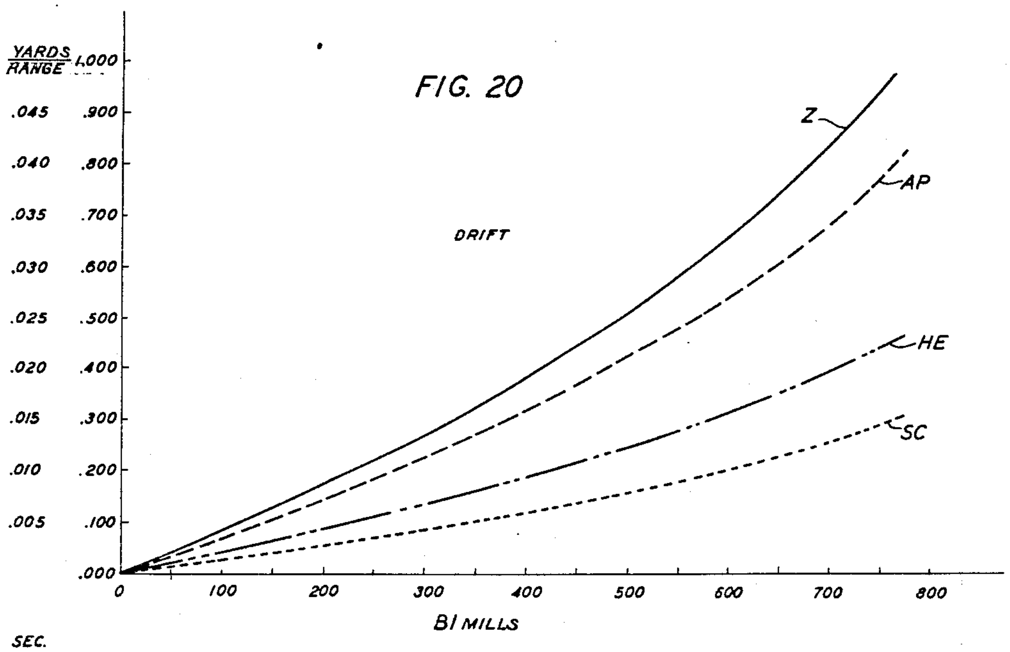
Figs. 19 to 28 show curves related to Figs. 7 and 8.

A more accurate method is to divide the given data into the corresponding resistance ratio Z and plot the quotient against Z. In Figs. 17 and 18, the curves of $$\frac{Z}{v}$$

plotted against Z, correspond to the curves of Figs. 14 and 15. The plots of $$\frac{Z}{\text{data}}$$

plotted against Z may be compared with the curves of Figs. 17 and 18.

Equation 9 may be written as:

$$KR\frac{Z}{v(Z)}-KZ\frac{Z}{v(Z)}-DZ=C-Z^2$$

and, to match the data, the quantities K, R, D, C, must be determined.

The problem of choosing the coefficients of (9) to fit the given $Z/v$ curve is still difficult. No general method now known is entirely satisfactory.

The values of the data are tabulated in regular order, then, by heuristic methods, corresponding values of Z are tabulated, and the resultant values of $$\frac{Z}{\text{data}}$$

are computed and tabulated. Normally, to determine four unknowns, four equations are required, but it has been found from experience that, in many cases, less work is involved if three equations are used with an estimated value of C. The tabulated values of $$\frac{Z}{\text{data}}$$

are divided into three regions of $n$ items each, the last one or two values being ignored if necessary. It is reasonable to assume the errors are somewhat compensatory, so that the sum $$\Sigma\frac{Z}{v}$$

of the values of $$\frac{Z}{v}$$

in any region will be more accurate than any arbitrarily chosen value of $$\frac{Z}{v}$$

in this region. Thus, for each region, the values of $$\Sigma\frac{Z}{v}$$

$\Sigma Z$, and $\Sigma Z^2$ are determined, thus, for each region, a typical equation may be written of the form:

$$KR\Sigma\frac{Z}{v}-KZ\Sigma\frac{Z}{v}-D\Sigma Z=nC-\Sigma Z^2 \qquad (9a)$$

where $n$ is the number of points in the region. These three equations are solved for D, R and K in terms of C. Solving for three constants in terms of the fourth allows specific values to be chosen that will give a physically realizable circuit. However, there is no rule for the proper choice of C to get the best match within the limits of realizability. Some cases show very little change in the matching errors over most of the range of C, in which case the choice would depend only on practical circuit considerations such as power dissipation. Sometimes a special case such as $R=\infty$ occurs within the realizable region of C. Since this means a simpler circuit, C may be chosen to give the special case. It is possible sometimes to simplify the problem by starting with one more equation of the form of (9a) and solving for all four constants directly. This might apply, for example, in the later stages of approximation where new matching constants would not be radically different from the old. In general, however, there is no simple rule for the choice of C.

For certain of the special cases there are much better methods.

In Fig. 13A, let $\beta$ be infinite, then $$Z/v_1=(\Delta+Z)/E$$

Hence, if the data $Z/v$ can be fitted adequately by a straight line, we have at once the slope, $1/E$, and the intercept $\Delta/E$. If the slope and intercept are of the same sign, the potentiometer winding is connected as in Fig. 13A, if of opposite sign, the connections to the winding are reversed.

For the circuit of Fig. 13A, with output taken off at $v_2$, the $Z/v$ function is parabolic since $$Z/v=\frac{C+DZ-Z^2}{K}$$

Hence if the data $Z/v$ is concave downward, this circuit may be appropriate and the values of C, D and K may be determinmed.

*Data having a peak in the useful range*

If the data has a maximum at some point $Z_m$ within the region $0\leqslant Z\leqslant 1$, then this fact can be of help in choosing the matching coefficients.

Differentiating (9) we get $$RC-2CZ_m-Z_m^2(D-R)=0 \tag{28}$$

For the special but important case where $R=D$, the peak will occur at $Z_m=D/2$. This case occurs for the circuit of Fig. 13A when the output is taken off at $v_1$. For a given $Z_m$ there is a single infinity of possible characteristics.

Define $y=Z/2Z_m$ then $$v/E=\frac{y(1-y)}{C/4Z_m^2+y-y^2} \tag{29}$$

It is thus possible to plot a single family of curves as a function of $C/4Z_m^2$, all having a peak at $y=\frac{1}{2}$. For $Z_m>\frac{1}{2}$, $D>1$ and hence any member is realizable. If, however, $Z_m\leqslant\frac{1}{2}$, then $D\leqslant 1$. The realizability of a given characteristic will depend on whether $C>1-D$.

Another approach to the special case of $R=D$ is a straight line test. Making the substitution $$y=Z(D-Z)$$

where D is determined as before, then $$v=\frac{Ey}{C+y}$$

and hence $$y/v=(C+y)/E \tag{30}$$

Then a straight line of positive slope and intercept is passed through the data $y/v$.

In the case where $R=D$, we have from (28)

$$C=\frac{Z_m^2(D-R)}{R-2Z_m} \tag{31}$$

This gives an additional relationship between C, D and R, and furthermore, in this particular form, it gives some indication of values of R and D that must be excluded if the condition $C>1-D$ is to be satisfied.

*Matching of multiple sets of data*

To match multiple sets of data with a common potentiometer resistance function demands first of all the determination of a suitable $Z(B_1)$ function. One method makes use of the conclusion formed from observations of curves similar to those shown in Figs. 19 to 28, that even for highly loaded circuits the plot of $Z(B_1)$ does not depart too greatly from a straight line passing through the origin and the point ($B_1=B_1$ max, $Z=1$). This suggests the first approximation $$\overline{Z}_1=B_1/B_1\text{ max}$$

and to plot $\overline{Z}_1/v_n$ against $\overline{Z}_1$ for all sets of data. By comparing these characteristics to those shown in Figs. 17 and 18 each curve is fitted with the most nearly appropriate network. This then gives a circuit together with an appropriate set of element values for each set of data. For convenience in writing denote the element values for the $n$th circuit by $e_{1n}$. Using $e_{1n}$ and the circuit, a resistance ratio $Z_{2n}$ is calculated to give an exact match for each set of data. Naturally the various sets of Z's thus calculated do not agree among themselves. Consequently, a second approximation to the resistance ratio is defined such that $$\overline{Z}_2=\frac{\Sigma Z_{2n}}{n}$$

or when desired, a suitably weighted average is computed. Incidentally, this is a worth while advantage for this method, since if in a given characteristic certain regions may be omitted or are less important than other regions this fact may be allowed for by appropriate weighting forces.

Using $\overline{Z}_2$, a new set of $Z/v$ characteristics are plotted against Z and appropriate circuits and element values $e_{2n}$ are found. This process can be carried on until it no longer changes Z.

In carrying out the method, it is best in the case of Figs. 13A and 13B to choose the matches so that the different sets of errors oscillate together in sign and (roughly) in magnitude. The reason for this is apparent from the effect on the matching formulae of a change in Z. For the two cases just mentioned this effect is in the same direction; that is, if the errors do oscillate together in phase a change in Z will wipe out the errors at the point in question.

It is clear that the matches cannot be indefinitely improved as further approximations are made, and that the errors approach an irreducible minimum average, which depends on fortuitous circumstances attendant on the data. It has been found by experience that data can be matched with a maximum error under 30 yards, regardless of the size of the correction. The explanation is that the minor corrections, such as that for temperature, have characteristics which cannot be well fitted, as they have both maxima and minima, while the major corrections have at the most one such point.

It will be appreciated that the general method outlines here has a number of advantages. At each stage it indicates the best network to be used. It also results in the potentiometer card shape that is nearest to constant width. The method can be advantageously applied to fitting even a single function. By forcing the circuits to supply as much as possible of the required curvature in the transmission characteristic, a better shape of the potentiometer card will result than if it is made proportional to the slope of the function.

There are times when the method just described is ill adapted for the first step. This situation arises when the function $(v-Z)$ is negative near the origin. When this happens, the first step is more easily accomplished thus: one of the sets of normalized data is chosen as a base and the others are plotted against it. The base is chosen so that all the other sets of data have $(v-Z)$ functions which are positive near the origin.

Then the base function is transformed with an appropriate transformation to permit matching it with a circuit of finite elements.

In principle, the inverse of Equation 9 is suitable as a transformation. For the lack of a suitable guide in choice of parameters, it is easiest to use the simplest transform, namely, $$Z_1=\frac{\Delta v}{\Delta+1-v}$$

whose single parameter can be varied to get the best conditions. Then $Z_1$ is used instead of the linear Z to get matches, and process is carried on in the normal manner. In getting $Z_1$ the value of $\Delta$ is chosen with some attention to the resulting card shape, because the card shape will be changed but little in the succeeding steps.

In some cases, practical reasons may dictate the choice of the base function, despite the fact that some of the data will have a negative loop in the error function near the origin. In such cases the inverse transform just given will remove these initial negative loops.

*Use of further transformations*

It sometimes happens that the general method of successive approximations yields good matches with inconvenient element values. Here we can make use of the fact that a bilinear transformation on the Z's leaves the matching errors unaltered, while changing the matching constants and hence the element values. There are certain restrictions on the transformation to insure the realizability of the transformed circuit. If the transformation is $$y=\frac{\Delta Z}{\Delta+1-Z}$$

then if $\Delta>0, \Delta+1>P_2>1$, and if $\Delta<-1, \Delta+1<P_1<0$.

In prior computers, it was assumed that the ballistic effects are independent of each other, and that each effect could be independently corrected. A more rigorous study of the firing tables has shown that this assumption is not correct, and that certain effects interact with some of the other effects. For example, assume for a given shoot, that the muzzle velocity of the gun and the density of the air are non-standard. The effect of a non-standard muzzle velocity for standard air density and the effect of non-standard air density for standard muzzle velocity are given in the firing tables and appropriate corrections for these effects were made in prior computers. But, no corrections were made for interactions such as the effect of non-standard air density on the correction for non-standard muzzle velocity, or for the effect of non-standard muzzle velocity on the correction for non-standard air density. In the present computer, corrections are made, when necessary, for these interactions between the ballistic effects.

The normal range $R_N$ of the weapon fired under normal conditions is tabulated in the firing tables as a function of the elevation angle $B_1$. The firing range $R_F$ of this weapon will depend upon the elevation angle, and the ballistic effects. Mathematically, $R_F$ is a function of a number of variables, thus $$R_F=f\,(B_1, MV, AD, WR, \ldots)$$

where $B_1$ is the elevation angle for standard ballistic conditions, MV the muzzle velocity change from normal, AD the air density change, WR the range component of the wind speed, etc.

This expression may be expanded into a series by Taylor's theorem, thus, $$R_F=R_N(B_1)+\frac{\delta R_N}{\delta MV}\cdot\overline{MV}+\frac{\delta R_N}{\delta AD}\cdot\overline{AD}+\frac{\delta R_N}{\delta WR}\cdot\overline{WR}+\cdots+\frac{1}{2}\left[\frac{\delta^2 R_N}{\delta_{MV}{}^2}\cdot\overline{MV}^2+\frac{\delta^2 R_N}{\delta_{AD}{}^2}\cdot\overline{AD}^2+\frac{\delta^2 R_N}{\delta_{WR}{}^2}\cdot\overline{WR}^2+\cdots\right]+\left[\frac{\delta^2 R_N}{\delta MV\delta AD}\cdot\overline{MV}\cdot\overline{AD}+\frac{\delta^2 R_N}{\delta MV\delta WR}\cdot\overline{MV}\cdot\overline{WR}+\frac{\delta^2 R_N}{\delta AD\delta WR}\cdot\overline{AD}\cdot\overline{WR}+\cdots\right] \quad (32)$$

It is assumed that the elevation is kept at the value $B_1$ and the partial derivatives are evaluated for this value. These derivatives are themselves functions of the elevation angle. The above expression is thus an implicit equation in elevation, which may be solved for $B_1$ when $R_F$, MV, AD, WR, etc. are determined.

As explained below, in the present computer, a potentiometer card is so shaped that, when the brush is rotated by the shaft 800 to the angle $B_1$, the voltage selected by this brush is proportional to $R_N$.

The terms including only a single variable, such as $$\frac{\delta R_N}{\delta MV}\cdot MV+\frac{1}{2}\,\frac{\delta^2 R_N}{\delta MV^2}\cdot\overline{MV}^2$$

for a given value of $R_N$ will obviously have different values when MV has equal values of opposite sign. As explained above, a single potentiometer, having a brush rotated by the shaft 800, may be associated with a resistance network including a potentiometer adjusted to the value of the variable MV that, by switching certain elements in the network, the output voltage will have the proper functional variation for one or the other sign of the variable. In this way, these "self-interaction" effects are properly corrected.

The "interactions" between different variables may be compensated by first producing a voltage proportional to the desired function of the elevation angle, fractionating this voltage proportionally to ne of the variables, say MV, then further fractionating the result proportionally to the other variable, say AD, and adding the resultant voltages to the other voltages representing this function.

While the time of flight of the shell, TF, is principally a function of the elevation angle $B_1$, it is also affected by non-standard muzzle velocity, air density and temperature. The time of flight may be expressed as, $$TF=TF(B_1)+\frac{\delta TF}{\delta MV}\cdot MV+\frac{\delta TF}{\delta AD}\cdot AD+\cdots \quad (33)$$

From a study of the firing tables, it is found that the terms of higher order than the first order are negligible and that the first order terms vary substantialy linearly with the changes in muzzle velocity, air density, etc. Thus $$TF=TF(B_1)\,[1+K_1\cdot MV+K_2\cdot AD+\ldots] \quad (34)$$

Spotting controls are also provided, so that the firing officer may arbitrarily change the range or azimuth voltages by a small amount. A change in range spot will cause a change in the values of the ballistic elevation angle and the firing elevation angle, thus changing the corrections for the deflection effects, drift, cross-wind and earth rotation and slightly changing the azimuth angle. A change in the azimuth spot will change the azimuth angle and will also cause a slight shortening of the firing range $R_F$, and the firing elevation angles.

The height of site, that is, the difference in elevation or depression between the gun and the target is treated as a small angular correction to the elevation angle, with a further correction for the complementary angle of site which is treated as a correction in range.

The complete list of interaction effects may be tabulated as follows:

| | MV | AD | RW | PW | T | ERR | HS | RS | D | ERD | CW | AS | TF |
|---|---|---|---|---|---|---|---|---|---|---|---|---|---|
| MV | i | | | | | | | | | | | | |
| AD | i | i | | | | | | | | | | | |
| RW | s | s | s | | | | | | | | | | |
| PW | s | s | s | i | | | | | | | | | |
| T | s | s | s | s | i | | | | | | | | |
| ERR | s | s | s | s | s | i | | | | | | | |
| HS | i | i | i | i | i | i | i | | | | | | |
| RS | i | i | i | i | i | i | i | i | | | | | |
| D | s | s | s | s | s | s | i | i | i | | | | |
| ERD | s | s | s | s | s | s | i | i | s | s | | | |
| CW | s | s | s | s | s | s | i | i | s | s | s | | |
| AS | s | s | s | s | s | s | i | s | s | i | i | i | |
| TF | i | i | s | s | i | s | i | i | i | s | s | s | i |

in which the effects are abbreviated to MV for muzzle velocity, AD for air density, RW for range component of the wind, PW for projectile weight, T for temperature, ERR for the range effect of the earth's rotation, HS for height of site, RS for range spot, D for drift, ERD for the deflection effect of the earth's rotation, CW for the cross component of the wind, AS for the azimuth spot, TF for the time of flight of the projectile, and *i* indicates the interaction has been included in the effects which are corrected, *s* indicates the interaction is small. The interactions in the above table between AD and MV, TF and MV, TF and AD, TF and T are large enough to require special corrective means; the interactions marked *s* may be neglected; and the remaining interactions may be included by slight modifications of the values of the ballistic quantities tabulated in the firing tables.

In Fig. 10, the target will move from the present position $T_0$ to the predicted position $T_P$ during the time of flight TF of the projectile. The rates of change in the coordinates are $\dot{X}$ and $\dot{Y}$, thus the changes in the coordinates during the time of flight of the shell will be $$DX=\dot{X}TF \text{ and } DY=\dot{Y}TF$$

The present computer is designed to control the fire of a battery of 155-millimeter guns, firing armor piercing or high explosive shells, and a subcaliber 75-millimeter gun. For convenience, the ballistic effects for the armor piercing shell will be designated AP, for the high explosive shell HE, and for the 75-millimeter shell, SC.

The time of flight of the HE shell for maximum range is about 80 seconds, thus, the circuit may conveniently be designed on the basis of a nominal maximum time of flight of 100 seconds. The gains of the amplifiers 283 and 283′, Fig. 4, are adjusted so that the maximum voltage has the proper scale factor for 100 seconds' time of flight.

When operating with the subcaliber weapon, SC, switches 706, 707, 708, 709, Fig. 7, are closed, connecting the outputs of amplifiers 283 and 283′, Fig. 4, respectively, directly to the windings of potentiometers 702 and 705, Fig. 7. The brushes of potentiometers 702, 705 are rotated counterclockwise for increasing values of $B_1$ from zero at the grounded right end. The maximum range of a weapon requires an elevation angle of less than 800 mils (6400 mils equal 360 degrees). For convenience, the windings of potentiometers 702, 705 have been shown as extending over an angle of 3200 mills. In this case, the shaft 800 may be geared to rotate through the angle $4B_1$, or the brushes of potentiometers 702, 705 may be geared to shaft 800 with a 4 to 1 gear ratio. If preferred, the windings of potentiometers 702, 705 may extend over an angle of 1600 mils, with the brushes geared to shaft 800 with a 2 to 1 gear ratio, or the windings may extend over an angle of 800 mils, with the brushes driven directly by shaft 800. In these cases, two, four or eight cards may be disposed about the shaft 800 as arcs of the same circle.

Figure 19:
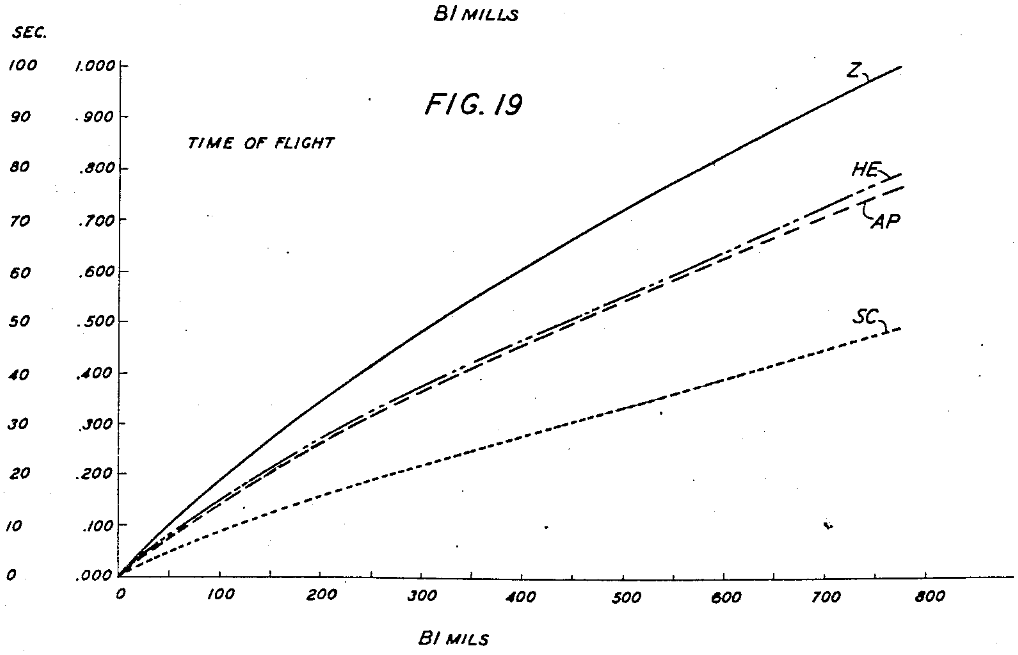

The brush of potentiometer 702 is connected through resistors 710, 711 and switch 707 to ground. The junction of resistors 710 and 711 is connected by connection 714, through resistor 500, Fig. 5, to the input circuit of the DX amplifier 501, of the type shown in Fig. 11, having a feedback resistor 502. In a specific computer, the winding of potentiometer 702, Fig. 7, had a total resistance of 18,000 ohms, and the resistors 710, 711 were respectively 31,000 and 30,700 ohms. The card supporting the winding of potentiometer 702 was shaped so that the winding varied in resistance with the unit resistance function shown by solid line Z in Fig. 19, plotted against the angle of rotation of the brush $B_1$ in mils (800 mils equals 45 degrees). The voltage function delivered by the network varies with the function shown by the dotted line SC, plotted against the time of flight TF in seconds.

Similarly, with switches 708, 709, Fig. 7, closed, the connection 291 is connected through the winding of potentiometer 705 to ground, and the brush of potentiometer 705 is connected through resistors 712, 713 and switch 709 to ground. The junction of resistors 712, 713 is connected by connection 715 through resistor 503, Fig. 5, to the input circuit of the DY amplifier 504, of the type shown in Fig. 11, having a feedback resistor 505.

The winding of potentiometer 705, Fig. 7, and the resistances of resistors 712, 713 are respectively similar to the winding of potentiometer 702 and the resistances of resistors 710, 711, thus producing the functions shown in Fig. 19.

When firing with HE shell, switches 706, 707 are open and switches 716 and 717 are closed. The connection 290 is thus connected through resistor 700, having a resistance of 5672.5 ohms to the winding of potentiometer 702, and the brush of potentiometer 702 is connected through switch 717, resistor 711, resistor 718, having a resistance of 170,000 ohms, and resistor 719, having a resistance of 65,000 ohms, to ground. The voltage applied to connection 714 will then vary in accordance with the function shown by the dash-double dot line HE in Fig. 19.

Similarly, with switches 708, 709, Fig. 7, open and switches 721, 722 closed, connection 291 is connected through resistor 703 to the winding of potentiometer 705; the brush of potentiometer 705 is connected through switch 722, and resistors 713, 723, 724 to ground; and the voltage applied to connection 715 varies in accordance with the HE function shown in Fig. 19.

When firing with AP shell, switches 706, 716, 707, 717 are open, switches 726, 727 closed, thus connecting connection 290 through resistor 700 and resistor 701, having a resistance of 2692.6 ohms, to the winding of potentiometer 702, and connecting the brush of potentiometer 702 through switch 726, resistor 711, 718 and switch 727 to ground. The voltage applied to connection 714 will then vary in accordance with the function shown by the dashed line AP in Fig. 19.

Similarly, with switches 708, 721, 722, 709 open, and switches 728, 729 closed, connection 291 is connected through resistors 703, 704 to the winding of potentiometer 705; the brush of potentiometer 705 is connected through switch 728, resistors 713 and 723 and switch 729 to ground; and the voltage applied to connection 715 varies with the function shown by the dashed line AP, Fig. 19.

When firing HE shell, switch 720, Fig. 7, is closed, connecting connection 714, through resistor 730, of 4500 ohms resistance and resistor 731, of 56,700 ohms resistance to connection 734. Similarly, switch 725 is closed, connecting connection 715 through resistors 732, 733 to connection 735.

When firing AP shell, switches 720 and 725 are open, switches 736, 737 closed, thus connecting connection 714 through switch 736 and resistor 731 to connection 734 and connection 715 through switch 737 and resistor 733 to connection 735.

When firing HE shell, connection 734 is connected through resistor 506, Fig. 5, having a resistance of 75,000 ohms, the two sections, each of 22,500 ohms, of the winding of potentiometer 507, resistor 509, having a resistance of 10,000 ohms, and switch 510 to ground. Resistor 513, having a resistance of 22,500 ohms is shunted across the lower section of the winding of potentiometer 507. When firing AP shell, switch 511 is closed, shunting out resistor 506, and switch 510 is opened, connecting resistor 512, having a resistance of 150,000 ohms, in series with resistor 509.

When firing HE shell, connection 734 is also connected through resistor 514, having a resistance of 10,000 ohms, switch 515, and the two sections, each of 22,500 ohms, of the winding of potentiometer 516 to ground. When firing AP shell, switch 515 is opened, connecting resistor 517, having a resistance of 2,000 ohms in series with resistor 514.

Also, when firing HE shell, connection 734 is connected through switch 518, and the two sections, each of 22,500 ohms, of the winding of potentiometer 519 to ground, and, through switch 520 and resistor 521, of 95,000 ohms to ground. When firing AP shell, switch 518 is opened, connecting resistor 522, having a resistance of 12,500 ohms, in series with the winding of potentiometer 519, and switch 520 is opened, disconnecting resistor 521.

The brushes of potentiometers 507, 516 and 519 are respectively connected through resistors 523, 524, 525 to the input circuit of amplifier 501.

The brush of potentiometer 507 is adjusted to the temperature of the air, the brush of potentiometer 516 is adjusted to the muzzle velocity of the pivot gun and the brush of potentiometer 519 is adjusted to the density of the air, the normal values of these effects being at the mid-points of the potentiometer windings.

Similarly, connection 735 is connected to similar networks associated with potentiometers 526, 527, 528. The brushes of potentiometers 526, 527, 528 are respectively ganged to move with the brushes of potentiometers 507, 516, 519 and are respectively connected through resistors 529, 530, 531 to the input circuit of amplifier 504.

Let $TFM$=maximum TF for standard conditions
$TAM$=maximum effect of air density
$TVM$=maximum effect of muzzle velocity
$TTM$=maximum effect of temperature With the brushes of potentiometers 509, 516, 519 (or 526, 527, 528) at the lowest points, the amplification of the X amplifier 283, Fig. 4, or the Y amplifier 283', is readjusted so that the output voltage is proportional to $$TFM-(TAM+TVM+TTM)$$

and the voltage supplied to the DX amplifier 501, Fig. 5, or the DY amplifier 504, is proportional to $$\frac{TF}{TFM}\cdot[TFM-(TAM+TVM+TTM)]$$

When the brushes of potentiometers 509, 516, 519 (or 526, 527, 528) are at the mid-points of their windings, the voltage supplied is proportional to $$\frac{TF}{TFM}\cdot TFM$$

and when the brushes of potentiometers 509, 516, 519, (or 526, 527, 528) are all at the highest points, the voltage supplied is proportional to $$\frac{TF}{TFM}(TFM+(TAM+TVM+TTM))$$

If $R_h$ be the resistance of the winding of one of the potentiometers, say the air density potentiometer 519, and $R_a$ the resistance of the series resistor 522, then $$\frac{R_h}{R_a+R_h}=\frac{2TAM}{TFM-(TAM+TVM+TTM)} \quad (35)$$

The complete networks associated with the time of flight potentiometer are similar to Fig. 13H and are a slight modification of Case I, Equation 11. Designating the series resistors 700, 701, Fig. 7, by $\beta$, and the shunt resistors 710, 711, 718, 719, 730, 731 and in Fig. 5, 500, 506, 507, 509, 512, 513, 514, 516, 517, 519, 521, 522, 523, 524, 525 by $\Delta$, the design equation is $$TF=\frac{KZ\Delta}{\Delta(\beta+1)+Z(\beta+1)-Z^2} \quad (36)$$

The design values for the curves of Fig. 19 are

| | HE | AP | SC |
|---|---|---|---|
| $\beta$ | .315478 | .46456 | 0 |
| $\Delta$ | 3.20792 | 2.99094 | 3.37222 |
| K | 111.607 | 123.678 | 49.00 |

The values of a desired correction are tabulated in the firing tables and, from these values an equation is deduced which matches the tabular values to a satisfactory degree of accuracy. The expression K is the coefficient of this matching equation, which is eventually related to the voltage applied to the corrective network. In the present case, as the full voltage of amplifier 283, Fig. 4, is applied to the network, $K=E$. But, as Equation 36 is in voltage form, and thus assumes, as a first approximation, that the load impedance is infinite, only the general configuration of the network may be determined by the methods set forth above, from which the design values, given above, may be determined and approximate values of the resistances computed.

These design values are then modified to take into account the finite value of the load impedance to determine the final values of the various resistances.

While normally K is a fraction, in the present case, due to the voltages supplied by potentiometers 509, 516, 519, Fig. 5, to amplifier 501, the total voltage supplied to amplifier 501 for normal conditions is greater than the output voltage of amplifier 283, Fig. 4, thus K is greater than 100 seconds.

The voltages supplied to the input circuit of the amplifier 501, Fig. 5, correctly represent the change, DX, in the X coordinate. As the amplifier 501 reverses the polarity of the applied voltages, the output voltage of amplifier 501 will have a polarity which is the negative of the polarity of the applied voltages. The output circuit of amplifier 501 is connected through resistor 532 to the input circuit of an amplifier 533, of the type shown in Fig. 11, having a feedback resistor 534. The output voltage of amplifier 533 will thus correctly represent, in magnitude and polarity, the magnitude and sign of the change DX, in the X coordinate.

Similarly the output circuit of amplifier 504 is connected through resistor 535 to the input circuit of amplifier 536, of the type shown in Fig. 11, having a feedback resistor 537. The output voltage of amplifier 536 will thus correctly represent, in magnitude and polarity, the magnitude and sign of the change DY, in the Y coordinate.

Figure 6:
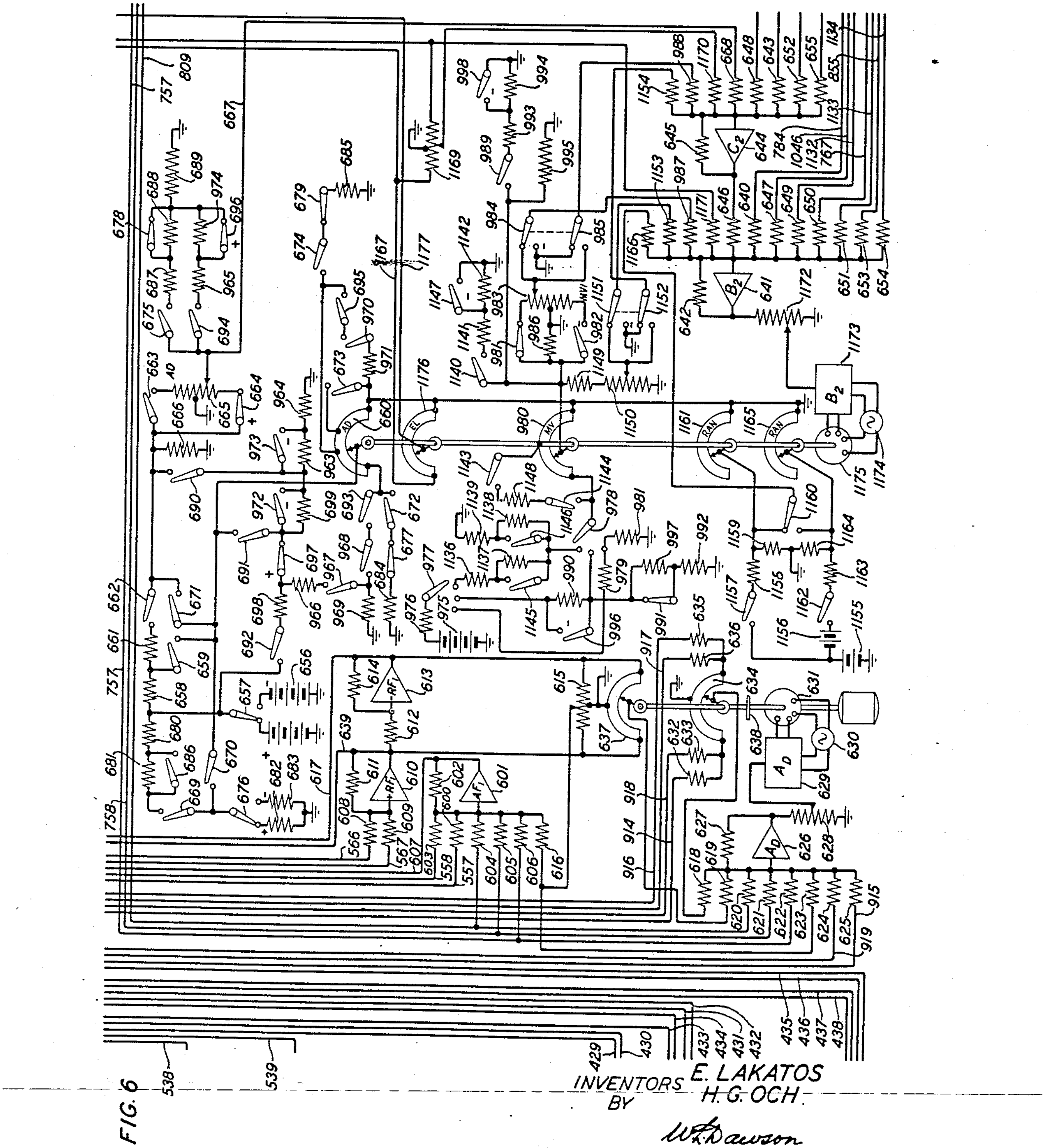

The output circuit of amplifier 533 is connected by connection 538, Figs. 5, 6 and 4, through a resistor 401, Fig. 4, to the input circuit of an amplifier 402, of the type shown in Fig. 11, having a feedback resistor 403.

Similarly, the output circuit of amplifier 536, Fig. 5, is connected by connection 539, Figs. 5, 6 and 4, through resistor 404, Fig. 4, to the input circuit of an amplifier 405, of the type shown in Fig. 11, having a feedback resistor 406.

The output circuit of amplifier 164, Fig. 2, or of the corresponding amplifier in the CD triangle solver 273, or the output circuit of amplifier 321, Fig. 3, is connected by connection 204 through resistor 406, Fig. 4, to the input circuit of amplifier 402.

Similarly, the output circuit of amplifier 167, Fig. 2, or of the corresponding amplifier in the CD triangle solver 273, or the output circuit of amplifier 331, Fig. 3, is connected by connection 217 through resistor 407, Fig. 4, to the input circuit of amplifier 405.

In some cases, the data transmission system controlled by the data transmission potentiometer 12, Fig. 1, may be disabled, and only the values of the data, as telephoned at regular intervals are available at the computer. These data are of a time in the past equal to the time interval, TD, between the regular transmissions of the data, and during this time interval the coordinates of the predicted position of the target will have changed by the amounts XTD and YTD.

Thus the output circuit of amplifier 283, Fig. 4, or of amplifier 321, Fig. 3, is connected by connection 290 through the winding of a potentiometer 408, Fig. 4, to ground. The brush of potentiometer 408 is connected through a resistor 409 to the input circuit of amplifier 402.

Similarly the output circuit of amplifier 283', Fig. 4, or of amplifier 331, Fig. 3, is connected by connection 291 through the winding of a potentiometer 410 to ground. The brush of potentiometer 410 is connected through a resistor 411 to the input circuit of amplifier 405.

The brushes of potentiometers 408 and 410 are adjusted to respectively select voltages proportional to XTD and YTD.

The connection 204 supplies a voltage proportional to $X_0$, the coordinate of the present position of the target; the connection 538 supplies a voltage proportional to DX, the predicted change in the coordinate of the target during the time of flight, TF, of the shell; and the wiper of potentiometer 408 supplies a voltage proportional to the change in the position of the target during the time interval TD, thus the sum of the voltages supplied to the input circuit of the amplifier 402 are proportional to the coordinate $X_P$ of the predicted position of the target. Similarly the voltages supplied to the input circuit of the amplifier 405 are proportional to the coordinate $Y_P$ of the predicted position of the target.

The output voltage of amplifier 402 will have a magnitude proportional to $X_P$, and a polarity which is the opposite of the sign of $X_P$, and thus may be designated $-X_P$. The output circuit of amplifier 402 is connected through resistor 412 to the input circuit of an amplifier 413, of the type disclosed in Fig. 11, having a feedback resistor 414. The output voltage of amplifier 413 will then agree in magnitude and polarity with the magnitude and sign of the coordinate $X_P$ of the predicted position of the target.

Similarly the output circuit of amplifier 405 is connected through a resistor 415 to the input circuit of an amplifier 416, of the type shown in Fig. 11, having a feedback resistance 417. The output voltage of amplifier 405 will have a magnitude proportional to the magnitude of $Y_P$, and a polarity opposite to the sign of $Y_P$, while the output voltage of amplifier 416 will have a magnitude proportional to the magnitude of $Y_P$ and a polarity corresponding to the sign of the coordinate $Y_P$ of the predicted position of the target.

As will be explained later, the shaft 540, Fig. 5, is rotated proportionally to the firing azimuth angle AF1 of the pivot gun, and is geared by the counter-shaft 555 to rotate the shaft 556 through twice the firing azimuth angle, 2AF1. The brushes 551, 552, 553 and 554 are rotated by the shaft 556 but are insulated from the shaft 556 and from each other.

The potentiometer cards 545, 546, 547 and 548 all vary in width with a cosinusoidal function extending over substantially a complete quadrant but are each of sufficient length to extend over substantially a half circle. For a short distance from the narrow end, the potentiometer cards are of constant width and a number of turns of the winding at the end of the card are short-circuited. The potentiometer cards 545 and 546 are formed on the circumference of a circle concentric with the shaft 556, the narrow ends of the cards being separated by an insulating spacer. A conductive bridge 549 is supported by this insulating spacer and overlaps some of the short-circuited turns of the winding, but is insulated therefrom. The potentiometer cards 547 and 548 are similarly disposed with respect to the bridge 550.

The cam switches 541 and 542 are operated for slightly more than one-half revolution of the shaft 540, that is, for slightly more than 180 degrees of the angle AF1. The cam switches 543 and 544 are operated for slightly more than one-half revolution of the shaft 556, that is, for slightly more than 90 degrees of the angle AF1, and are operated twice for each revolution of the shaft 540. The operation of cam switch 541 extends ground through the connection 431, Figs. 5, 6 and 4, to the winding of relay 421, Fig. 4, operating relay 421. Similarly, the operation of cam switch 542 will connect ground through connection 432, Figs. 5, 6 and 4, to the winding of relay 422, operating relay 422. The operation of cam switch 543 will connect ground through connection 433, Figs. 5, 6 and 4, to the winding of relay 423, operating relay 423. The operation of cam switch 544 will connect ground through connection 434, Figs. 5, 6 and 4, to the winding of relay 424, operating relay 424. In Fig. 4 with relay 421 released, and relays 422, 423 and 424 operated, ground is connected through the armature and make spring of the second pile-up of relay 422 through the armature and make spring of the first pile-up of relay 424 and the winding of relay 426 to battery operating relay 426; and ground is connected through the armature and make spring of the third pile-up of relay 422 through the armature and make spring of the second pile-up of relay 424 through the winding of relay 428 to battery, operating relay 428. With relay 421 released, relay 422 operated, relay 423 released, and relay 424 operated, ground is connected through the armature and make spring of the second pile-up of relay 422, through the armature and make spring of the first pile-up of relay 424, through the winding of relay 426 to battery, operating relay 426; ground is connected through the armature and make spring of the third pile-up of relay 422, the armature and make spring of the second pile-up of relay 424, the winding of relay 428 to battery, operating relay 428; and ground is connected through the armature and make spring of the fourth pile-up of relay 422, the break springs of the second pile-up of relay 423 through the winding of relay 427 to battery, operating relay 427. With relays 421, 422 and 424 operated and relay 423 released, ground is connected through the armature and make spring of the second pile-up of relay 42, the armature and make spring of the first pile-up of relay 424, the winding of relay 426 to battery, operating relay 426; ground is connected through the armature and make spring of the third pile-up of relay 422, the armature and make spring of the second pile-up of relay 424, the winding of relay 428 to battery, operating relay 428; and ground is connected through the armature and make spring of the fourth pile-up of relay 422, the break springs of the second pile-up of relay 423, the winding of relay 427 to battery, operating relay 427. With relays 421 and 422 operated, and relays 423 and 424 released, ground is connected through the armature and make spring of the fourth pile-up of relay 421, the break springs of relay 424, the winding of relay 426 to battery, operating the relay 426; and ground is connected through the armature and make spring of the fourth pile-up of relay 422, the break springs of relay 423, the winding of relay 427 to battery, operating relay 427. With relays 421, 422 and 423 operated and relay 424 released, ground is connected through the armature and make spring of the second pile-up of relay 421, the armature and make spring of the first pile-up of relay 423, the winding of relay 425 to battery, operating relay 425; ground is connected through the armature and make spring of the third pile-up of relay 421, the armature and make spring of the second pile-up of relay 423, the winding of relay 427, to battery, operating relay 427; and ground is connected through the armature and make spring of the fourth pile-up of relay 421, the break springs of the first pile-up of relay 424, the winding of relay 426 to battery, operating relay 426. With relays 421 and 423 operated and relays 422 and 424 released, ground is connected through the armature and make spring of the second pile-up of relay 421, the armature and make spring of the first pile-up of relay 423, the winding of relay 425 to battery, operating relay 425; ground is connected through the armature and make spring of the third pile-up of relay 421, the armature and make spring of the second pile-up of relay 423, the winding of relay 427 to battery, operating relay 427; and ground is connected through the armature and make spring of the fourth pile-up of relay 421, the break springs of the first pile-up of relay 424, the winding of relay 426 to battery, operating relay 426. With relays 421, 423 and 424 operated and relay 422 released, ground is connected through the armature and make spring of the second pile-up of relay 421, the armature and make spring of the first pile-up of relay 423, the winding of relay 425 to battery, operating relay 425; and ground is connected through the armature and make spring of the third pile-up of relay 421, the armature and make spring of the second pile-up of relay 423, the winding of relay 427 to battery, operating relay 427. With relays 421 and 424 operated and relays 422 and 423 released, ground is connected through the armature and break spring of the fourth pile-up of relay 422, the break springs of the first pile-up of relay 423, the winding of relay 425 to battery operating relay 425. With relays 421, 422 and 423 released and relay 424 operated, ground is connected through the armature and break spring of the fourth pile-up of relay 422, the break springs of the first pile-up of relay 423, the winding of relay 425 to battery operating relay 425. With relays 421, 422, 423 and 424 released, battery is connected through the armature and break spring of the fourth pile-up of the relay 421 and the break springs of the second pile-up of relay 424, the winding of relay 428 to battery, operating relay 428; and ground is connected through the armature and break spring of the fourth pile-up of relay 422, the break springs of the first pile-up of relay 423, the winding of relay 425 to battery operating relay 425. With relays 421, 422 and 424 released, and relay 423 operated, ground is connected through the armature and break springs of the fourth pile-up of relay 421, the break springs of the second pile-up of relay 424, the winding of relay 428 to battery, operating relay 428. With relays 421 and 424 released, and relays 422 and 423 operated, ground is connected through the armature and break spring of the fourth pile-up of relay 421, the break springs of the second pile-up of relay 424, the winding of relay 428 to battery, operating relay 428.

The output circuit of amplifier 402 is connected to the break spring of the first pile-up of relay 421, the output circuit of amplifier 413 is connected to the make spring of this pile-up and the armature of this pile-up is connected to connection 429 to the conductive bridge 549, Fig. 5. Thus the operation of relay 421, Fig. 1, will switch the conductive bridge 549 from the output of amplifier 402, Fig. 4, to the output of amplifier 413.

Similarly, the output circuit of amplifier 405, Fig. 4, is connected to the break spring of the first pile-up of relay 422, the output circuit of amplifier 416 is connected to the make spring of this pile-up and the armature of this pile-up is connected by connection 430, to the conductive bridge 550, Fig. 5.

The output circuit of amplifier 402, Fig. 4, is connected to the break spring of relay 425, the output circuit of amplifier 413 is connected to the make spring of this relay, while the armature of the relay is connected by connection 435 to the end of the grounded winding 545, Fig. 5. Similarly, the output circuit of amplifier 402, Fig. 4, is connected to the break spring and the output circuit of amplifier 413 is connected to the make spring of relay 426, the armature of this relay being connected by connection 436 to the end of the potentiometer winding 546, Fig. 5.

The output circuit of amplifier 405, Fig. 4, is connected to the break spring of relay 427, the output circuit of amplifier 416 is connected to the make spring of relay 427, and the armature of this relay is connected by connections 437 to the grounded potentiometer winding 547, Fig. 5. Similarly, the output circuit of amplifier 405, Fig. 4, is connected to the break spring and the output circuit of amplifier 416 is connected to the make spring of relay 428, the armature of this relay being connected by connection 438 to the potentiometer winding 548, Fig. 5.

The cam switches 541, 542, 543, and 544, Fig. 5, and the relays 421, 422, 423, 424, 425, 426, 427 and 428, Fig. 4, connect the outputs of amplifiers 402, 413, 405 and 416, to the potentiometer windings 545, 546, 547 and 548, Fig. 5, so that the voltages selected by the brushes 551, 552, 553 and 554 are correct. The complete operation of the switching system is given in the relay operation table of Fig. 29, which is tabulated for the significant values of the firing azimuth angle AF1. In this table, for the cam switches and relays, O means operated and R means released. For the potentiometer cards, bridges and brushes, G means ground, + means the element is connected to the output of amplifier 413 or 416, Fig. 4, and − means the element is connected to the output of amplifier 402 or 405, Fig. 4.

In Fig. 10, the pivot gun G1 is fired at a virtual target $T_{v1}$ such that the shell, under the influence of the sum of the range components, SR, of the ballistic effects, will tend to travel to a firing target $T_F$, at a range RF1 and an azimuth AF1; and the shell, under the influence of the sum of the deflection components, −SD, of the ballistic effects, will drift to meet the target at the predicted position $T_P$.

Let $X_F$ and $Y_F$ be the coordinates of the point $T_F$ and $X_P$ and $Y_P$ be the coordinates of the point $T_P$.

Then $$-X_F \cos AF1 + Y_F \sin AF1 = 0$$

$$-X_F = -X_P + SD \cos AF1$$

$$Y_F = Y_P + SD \sin AF1$$

$$-(X_P - SD \cos AF1) \cos AF1 + (Y_P + SD \sin AF1) \sin AF1 = 0$$

$$-X_P \cos AF1 + Y_P \sin AF1 + SD = 0 \quad (37)$$

Also $$-X_F \sin AF1 - Y_F \cos AF1 = RF1$$

$$-(X_P - SD \cos AF1) \sin AF1 - (Y_P + SD \sin AF1) \cos AF1 = RF1$$

$$+X_P \sin AF1 + Y_P \cos AF1 = -RF1 \quad (38)$$

Potentiometer brush 552, Fig. 5, selects a voltage proportional to $-X_P \cos AF1$ and is connected by connection 557 through resistor 600, Fig. 6, to the input circuit of an amplifier 601, of the type shown in Fig. 11, having a feedback resistor 602. Brush 553, Fig. 5, selects a voltage proportional to $Y_P \sin AF1$ and is connected by connection 558 through resistor 603, Fig. 6, to the input circuit of amplifier 601.

As explained hereinafter, voltages from the ballistic correction circuits of Fig. 7, proportional to SD, are also supplied through resistors 604, Fig. 6, 605 and 606 to the input circuit of amplifier 601. The output circuit of amplifier 601, Fig. 6, is connected by connection 607 to the winding of potentiometer 559, Fig. 5. The brush of potentiometer 559 is connected to a phase controlling network 560, of the type disclosed in Fig. 12. A source of two-phase power 561 is connected directly to one winding of a two-phase motor 562 and through the control networks 560 to the other winding of the motor 562.

If the output voltage of amplifier 601, Fig. 6, is not equal to zero, power will be supplied from the source 561, Fig. 5, to the motor 562, rotating the shafts 540 and 556, adjusting the brushes 552 and 553, until the output voltage of the amplifier 601, Fig. 6, is reduced to zero, and in accordance with Equation 37, the shaft 540, Fig. 5, has been rotated through the angle AF1. The azimuth AF1 may be indicated by a suitable dial 564 mounted on a shaft 563 geared to the shaft 540. A synchronous transmitter 565, driven by the shaft 563 transmits the indications of this angle to the gun position.

The brush 551, Fig. 5, selects a voltage proportional to $X_P \sin AF1$, and is connected by connection 566 through resistor 608, Fig. 6, to the input circuit of an amplifier 610, of the type shown in Fig. 11, having a feedback resistor 611. The brush 554, Fig. 5, selects a voltage proportional to $Y_P \cos AF1$ and is connected by connection 567 through resistor 609, Fig. 6, to the input circuit of amplifier 610. Thus, from Equation 38, the output voltage of amplifier 610 will be proportional to RF1.

The output circuit of amplifier 610, Fig. 6, is connected through resistor 612 to the input circuit of an amplifier 613, of the type shown in Fig. 11, having a feedback resistor 614. The output voltage of amplifier 613 is equal in magnitude, but opposite in polarity, to the output voltage of amplifier 610. The output circuit of amplifier 610 is connected to one end of the winding of a potentiometer 615, the output circuit of amplifier 613 being connected to the other end of this winding, the mid-point of the winding being grounded. The brush of potentiometer 615 is connected through resistor 616 to the input circuit of amplifier 601. The potentiometer 615 forms an azimuth spotting control for the ranging officer as the addition of a deflection component proportional to the range to the input of the amplifier 601, is equivalent to an angular change in the azimuth AF1.

In Fig. 10, the firing target $T_F$ is at a range RF1 and an azimuth AF1 with respect to the pivot gun G1. The coordinates, $-X_G$ and $-Y_G$, of a second gun G2, with respect to the first gun G1, are determined by ordinary surveying methods. Draw *ab* from the end of $X_G$ perpendicular to RF1, and *ad* parallel to RF1, and draw G2·*d* perpendicular to RF1, cutting RF1 at *c*. The firing target $T_F$ is at a range RF2, and azimuth AF2 with respect to the second gun G2. Let the difference in the azimuth of the target from the two guns be DA, then $$DA = AF2 - AF1 = \text{angle } G1 \cdot T_F \cdot G2$$

$$\text{Angle } G1ab = \text{angle } G2ad = AF1$$

$$ab = dc = -X_G \cos AF1;\ G1b = -X_G \sin AF1$$

$$ad = bc = -Y_G \cos AF1;\ G2d = -Y_G \sin AF1$$

$$T_Fc = RF2 \cos DA$$

and, as DA is usually a small angle, $$T_Fc = RF2$$

$$RF1 - RF2 = G1c + bc = -X_G \sin AF1 - Y_G \cos AF1$$

$$-RF2 = -RF1 - X_G \sin AF1 - Y_G \cos AF1 \quad (39)$$

In cases where the two guns are separated by more than a quarter mile, the assumption that $RF2 \cos DA = RF2$ may not be sufficiently accurate. In such cases, a corrective term $$\tfrac{1}{2} RF1 \sin^2 DA$$

may be added, and the equation becomes $$-RF2 = -RF1 - X_G \sin AF1 - Y_G \cos AF1 + \tfrac{1}{2} RF1 \sin 2\, DA \ldots$$

Consider the lateral distance G2c:

$$G2c = RF2 \sin DA = G2d - dc = -Y_G \sin AF1 + X_G \cos AF1$$

$$RF2 \sin DA - X_G \cos AF1 + Y_G \sin AF1 = 0 \ldots \quad (40)$$

The output circuit of amplifier 613, Fig. 6, is connected by connection 617 through resistor 573, Fig. 5, to the input circuit of an amplifier 574, of the type shown in Fig. 11, having a feedback resistor 575.

The potentiometer winding 566, Fig. 5, varies in resistance with a complete sinusoidal function and is grounded at the diametrically opposite points where the function passes through zero. A source of voltage 571, having the positive pole grounded, and a second source of voltage 572, having the negative pole grounded are connected to diametrically opposite points of the potentiometer winding 566, at the points where the function is a maximum. The brushes 567, 568, 569, and 570 are rotated by the shaft 540 through the angle AF1, but are insulated from the shaft 540 and from each other. The brush 567 selects a voltage proportional to a negative cosine, the brush 568 selects a voltage proportional to a positive sine, the brush 569 selects a voltage proportional to a positive cosine, and the brush 570 selects a voltage proportional to a negative sine, all of these functions being with respect to the angle AF1. The brush 567 is connected through resistor 578 to the third contact of the double-pole-double-throw switch 580 and to the second contact of the double-pole-double-throw switch 581. The brush 568 is connected through resistor 577 to the first contact of switch 580 and the second contact of switch 581. The brush 569 is connected through resistor 579 to the fourth contact of switch 580, and to the fourth contact of switch 581. The brush 570 is connected through resistor 576 to the second contact of switch 580, and the first contact of switch 581.

The switch 580 is placed in the upper position when the coordinate $Y_G$ is positive and in the lower position when $Y_G$ is negative; similarly, the switch 581 is placed in the upper position when the coordinate $X_G$ is positive and in the lower position when the coordinate $X_G$ is negative.

The blades of switch 580 are respectively connected to ground through the windings of potentiometers 582 and 583; and similarly, the blades of switch 581 are respectively connected to ground through the windings of potentiometers 584 and 585.

The brush of potentiometer 583 is adjusted to select the voltage proportional ot the coordinate $Y_G$ and is connected through resistor 586 to the input circuit of amplifier 574. Similarly the brush of potentiometer 584 is adjusted to select a voltage proportional to the coordinate $X_G$ and is connected through resistor 587 to the input circuit of amplifier 574. Thus, from Equation 39, the output voltage of amplifier 574 will be proportional to the magnitude of RF2, and will correspond in polarity with the sign of RF2.

The output circuit of amplifier 574 is connected through a resistor 588 to the input circuit of an amplifier 589 of the type shown in Fig. 11, having a feedback resistor 590.

The brush of potentiometer 582 is adjusted to select a voltage proportional to the coordinate $Y_G$ and is connected through resistor 593 to the input circuit of an amplifier 594, of the type shown in Fig. 11, having a feedback resistor 595. The brush of potentiometer 585 is adjusted to select a voltage proportional to the coordinate $X_G$ and is connected through resistor 592 to the input circuit of amplifier 594.

The output circuits of the amplifiers 574 and 589 are respectively connected through the decoupling resistors 596 and 597 to the ends of the winding of potentiometer 598, having a mid-point grounded. The brush of potentiometer 598 is connected through resistor 591 to the input circuit of amplifier 594. The winding of potentiometer 598 has a sinusoidal variation of resistance. The output circuit of amplifier 594 is connected through the winding of potentiometer 599 to ground. The brush of potentiometer 599 is connected to a control network 900, of the type shown in Fig. 12. A source of two-phase power 901, has one phase connected directly to one winding of a two-phase motor 902 and the other phase connected through the control network 900 to the other winding of motor 902.

The voltage supplied to the input circuit of amplifier 594 corresponds to the terms of Equation 40 and the sum of these terms should be zero. If the sum of these voltages is not zero, a voltage will be supplied from the output circuit of amplifier 594 to the control circuit 900, starting the motor 902, and rotating the brush of potentiometer 598 until the sum of the terms is reduced to zero, and the shaft of motor 902 has been rotated through the angle DA. The shaft of motor 902 is geared to the planet gears of a differential gear 903 and the shaft 563 is geared to one pinion of the differential gear 903. The other pinion of gear 903 will then be rotated through the angle $AF1 + DA$ which equals AF2, the azimuth of the target with respect to the second gun. This angle may be indicated as by a dial 904 and is transmitted by a synchronous transmitter 905 to a synchronous receiver at the guns.

In Fig. 10, the angle $T_0 G1 T_F$ is the angle of deflection AD, that is, the angle by which the line of fire leads the line to the present position of the target. Extend $G1T_F$ to $j$; draw $T_0j$ perpendicular to $G1j$; draw $gh$ perpendicular to $G1j$ through $e$ the intersection of DX and DY; draw $T_pk$ and $ef$ parallel to $G1j$. Angles $e\,T_pg$ and $e\,T_0f$ equal AF1.

The line of fire must be rotated counter-clockwise from $T_0$ to $T_F$, thus the tangent of AD is negative.

$$-\tan AD = \frac{T_0 j}{G1j}$$

$$T_0 j = T_0 f - fk - SD$$

$$= DX \cos AF1 - D_Y \sin AF1 - SD$$

$$G1j = G1T_F + T_F h + hj$$

$$= RF1 + T_F g + ef$$

$$= RF1 + D_Y \cos AF1 + DX \sin AF1$$

$$-\tan AD = \frac{(DX \cos AF1 - DY \sin AF1 - SD)}{RF1 + (DX \sin AF1 + DY \cos AF1)}$$

$$-\tan AD \cdot RF1 - \tan AD\,(DX \sin AF1 + DY \cos AF1) - DX \cos AF1 + DY \sin AF1 + SD = 0 \ldots \quad (41)$$

The output circuits of amplifiers 610 and 613, Fig. 6, are respectively connected to the ends of the winding of a potentiometer 637, having a mid-point grounded. The resistance of the winding of potentiometer 637 varies with a tangent function. The brush of potentiometer 637 is connected through resistor 619 to the input circuit of an amplifier 626, of the type shown in Fig. 11, having a feed back resistor 627.

The windings of potentiometers 906 and 910, Fig. 5, vary in resistance with complete sinusoidal functions and are grounded at the points where the functions pass through zero. The output circuits of amplifiers 536 and 504 are respectively connected to the points in the winding of potentiometer 906 at which the function is a maximum and similarly the output circuits of the amplifiers 533 and 501 are respectively connected to the points in the potentiometer winding 910 at which the function is a maximum. The brushes 907, 908, 909, 911, 912, 913 are rotated by the shaft 540, but are insulated from the shaft and from each other. The brush 907 selects a positive cosine function, the brush 908 a positive sine function and the brush 909 a negative cosine function of the angle of rotation, that is, the angle AF1. The brush 911 selects a negative sine function, the brush 912 a positive sine function and the brush 913 a negative cosine function of the angle of rotation AF1. The brush 907 is connected by connection 914 through resistor 632, Fig. 6, to one end of the winding of potentiometer 634. The brush 912, Fig. 5, is connected by connection 918 through resistor 633 to the same ending of the winding of potentiometer 634. The brush 909, Fig. 5, is connected by connection 916 through a resistor 635 to the other end of the potentiometer winding 634. The brush 911, Fig. 5, is connected by connection 917 through resistor 636, Fig. 6, also to the other end of the potentiometer winding 634, which is grounded at mid-point. The winding of potentiometer 634 varies in resistance with a tangent function. The brush of potentiometer 634 is connected through resistor 618 to the input circuit of amplifier 626. The brush 903, Fig. 5, is connected by connection 915 through resistor 625, Fig. 6, to the input circuit of amplifier 626. The brush 913, Fig. 5, is connected by connection 919 through resistor 624, Fig. 6, to the input circuit of amplifier 626. The brush of the azimuth spotting potentiometer 615 is connected through resistor 623 to the input circuit of amplifier 626. As will be explained hereinafter, voltages proportional to the sum of the deflection components SD are supplied through resistors 620, 621 and 622 to the input circuit of amplifier 626. As the azimuth spotting potentiometer 615 is supplied with voltages proportional to range, the voltage selected by the wiper of potentiometer 615 is proportional to a deflection, and thus acts to slightly change the voltages proportional to the sum of the deflection components SD.

The output circuit of amplifier 626 is connected through the winding of potentiometer 628 to ground. The brush of potentiometer 628 is connected to a control circuit 629, of the type shown in Fig. 12. A source of two-phase power 630 has one phase connected directly to one winding of a two-phase motor 631, and the second phase connected through the control circuit 629 to the other winding of motor 631.

From Equation 41 the voltages supplied to the input circuit of amplifier 626 should equal zero, and the output voltage of amplifier 626 also should be zero. If the output voltage of amplifier 626 is not zero, a voltage is applied to the control circuit 629, starting the motor 631 and rotating the brushes of potentiometers 634 and 637 until the sum of the input voltages supplied to amplifier 626 is reduced to zero. The brushes of potentiometers 634 and 637, which are mounted on the shaft of motor 631 but insulated therefrom, are thus rotated through the angle AD, which may be indicated by a suitable dial 638.

At long ranges, the rotation of the earth during the time of flight of the shell moves the target with respect to the shell producing an effect of sufficient magnitude that a correction is required. With the smaller weapons of shorter range, such as the subcaliber weapon, the effect is inappreciable. From theoretical considerations, it has been found that the deflection effect is of the form A sin L—B cos L cos AF1, where L is the latitude of the gun, A and B are factors which have been found to be, in part, functions of the ballistic elevation, B1, of the gun. In the present computer, the linear deflection effect is proportional to $$(RF1 \sin L - .1607 RF1 \cos AF1 \cos L)\, f\,(B1)$$

The output circuit of the +RF1 amplifier 610, Fig. 6, is connected by connection 639, Figs. 6, 5 and 7, to the left contact of switch 738, Fig. 7. The output circuit of the —RF1 amplifier 613, Fig. 6, is similarly connected by connection 617, Figs. 6, 5 and 7 to the right-hand contact of switch 738, Fig. 7. The switch 738 is placed on the left contact if the gun is located in the southern hemisphere and on the right contact if the gun is located in the northern hemisphere. The blade of switch 738 is connected through a resistor 739, having a resistance of 141,686 ohms and the winding of potentiometer 740, having a resistance of 20,000 ohms, to ground. The winding of potentiometer 740 varies in resistance with a cosinusoidal function having 0 degrees at the grounded end. The brush of potentiometer 740 is adjusted to select a voltage proportional to sin L and is connected through a decoupling resistor 741 having a resistance of 100,000 ohms and the winding of potentiometer 742 to ground.

The output circuit of amplifier 610, Fig. 6, is connected by connection 639, through resistor 920, Fig. 5, to a tap in the potentiometer winding 921 and the output circuit of amplifier 613, Fig. 6, is similarly connected by connection 617 through resistor 922, Fig. 5, to a diametrically opposite point in the potentiometer winding 921. The potentiometer winding 921 has a sinusoidal variation of resistance and is grounded at the points where the function passes through zero. The brush 923 is rotated by the shaft 540 to select a voltage proportional to the negative cosine of the angle AF1, and is connected by connection 924 through the winding of potentiometer 743, Fig. 7, to ground. The winding of potentiometer 743 has a cosinusoidal variation of resistance extending over one quadrant with 90 degrees at the grounded end. The brush of potentiometer 743 is adjusted to the latitude of the gun and is connected through the decoupling resistor 744, having a resistance of 100,000 ohms, to the end of the winding of potentiometer 742. When firing with the subcaliber weapon SC, the switch 745 is closed connecting the brush of potentiometer 742 to ground. When firing the larger weapon with high explosive shell HE, the brush of potentiometer 742 is connected through resistor 746, having a resistance of 38,864 ohms, and through resistor 747, having a resistance of 4,267 ohms, to ground. When firing with armor piercing shell, AP, the switch 748 is closed short-circuiting the resistor 747. The network formed by the winding of potentiometer 742 and the resistors 746 and 747 is designed in accordance with Equation 10. The resistance variation of the winding of potentiometer 742 is shown by the solid curve Z of Fig. 21, and the voltage output of the network when firing high explosive shell is shown by the dotted curve, HE, Fig. 21, and the voltage output when firing armor-piercing shell is shown by the solid curve AP. The brush of potentiometer 742, as will be explained later, is rotated by the shaft 800 through the ballistic elevation angle B1, and is connected by connection 758 to the resistors 605 and 621, Fig. 6.

Owing to the spin imparted to the shell by the rifling of the gun, the shell tends to drift off the line of fire. This linear deflection effect will be proportional to the range and a function of the ballistic elevation angle, B1, of the gun. The output circuit of amplifier 613, Fig. 6, is connected by connection 617, Figs. 6, 5 and 7, through resistor 747′, having a resistance of 83,040 ohms, resistor 748′ having a resistance of 57,587 ohms, and resistor 749, having a resistance of 80,000 ohms, through the winding of potentiometer 752 to ground. A switch 750 is connected across resistors 748′ and 749 and a switch 751 is connected across resistor 749. When firing with the subcaliber weapon, a switch 753 is closed connecting the end of the winding of potentiometer 752 through resistor 754, having a resistance of 30,000 ohms, and resistor 756, having a resistance of 80,000 ohms, to ground. When firing with high explosive shell, the brush of potentiometer 752 is connected through a switch 755 and resistor 756 to ground, and switch 751 is closed short-circuiting resistor 749. When firing with armor piercing shell, switch 750 is closed short-circuiting resistors 748′ and 749. The winding of potentiometer 752 has a resistance of 7,500 ohms and varies in resistance in accordance with the solid curve Z of Fig. 20. The brush of potentiometer 752 is rotated by the shaft 800 proportionally to the ballistic elevation angle B1, and is insulated from the shaft. This circuit is similar to the circuit of Fig. 13C and the functional variation of the voltage selected by the brush of potentiometer 752 for the subcaliber gun is shown by the dotted curve SC, of Fig. 20, the function for the high explosive shell being shown by the dash, double dot line, HE and the function for the armor piercing shell being shown by the dashed curve AP. The brush of potentiometer 752 is connected by the connection 757, Figs. 7, 8 and 6 to resistors 606 and 622, Fig. 6.

In Fig. 10, a wind having magnitude $W$ is blowing from a bearing BW, measured from north clockwise.

The cross-wind CW will be:

$$CW=W\sin(AF1-BW)$$
$$=W(\sin AF1\cos BW-\cos AF1\sin BW)\quad(42)$$

The range wind RW will be:

$$RW=W[-\cos(AF1-BW)]$$
$$=W(-\cos AF1\cos BW-\sin AF1\sin BW)\quad(43)$$

The effect of the cross-wind CW on the shell must be included in the sum of the deflection effects SD.

The values given by Equations 42, 43 are for the maximum time of flight of the projectile, which, in the present computer, is assumed to be 100 seconds. The actual linear effects of the cross and range winds will be proportional to the actual time of flight of the projectile at the time of firing. The voltages proportional to the range wind are therefore supplied to a potentiometer having a brush moved proportionally to the ballistic elevation of the gun and a winding so proportioned that the applied voltage is fractionated proportionally to the actual time of flight of the projectile. A similar procedure may normally be used with the cross wind, but, in the present computer, it was found this procedure resulted in a rather complicated winding of the elevation potentiometer, and that a much simpler winding could be used if the azimuth potentiometers were supplied with voltages proportional to the range, as the range is approximately proportional to the time of flight of the projectile.

The brushes 923 and 444, Fig. 5, respectively select voltages proportional to the negative and the positive cosine of the angle AF1, and are respectively connected through resistors 925 and 926 to diametrically opposite taps in the winding of potentiometer 927. The winding of potentiometer 927 has a sinusoidal variation of resistance and is grounded at the points where the function passes through zero. The brush of potentiometer 927 is rotated by a shaft 928, but is insulated therefrom. The shaft 928 is manually rotated through the bearing of the wind BW. The brush of potentiometer 927 selects a voltage proportional to sin BW, and is connected through resistor 929 to the input circuit of an amplifier 930, of the type shown in Fig. 11 having a feedback resistor 931.

The brushes 932 and 933 are rotated by the shaft 540, but are insulated therefrom and from each other, to respectively select voltages proportional to the positive and negative sine of the angle AF1, and are respectively connected through the decoupling resistors 934 and 935 to diametrically opposite taps in the winding of potentiometer 936. The winding of potentiometer 936 has a sinusoidal variation of resistance and is grounded at the points where the function passes through zero. The brush of potentiometer 936 is rotated by the shaft 928, but is insulated therefrom, and selects a voltage proportional to the negative cosine of the angle BW. The brush of potentiometer 936 is connected through resistor 937 to the input circuit of amplifier 930. Thus, by Equation 42, the output voltage of amplifier 930 will be proportional to CW. The output circuit of amplifier 930 is connected by connection 938, Figs. 5, 7 and 8, through resistor 801, having a resistance of 14,564 ohms, resistor 802, having a resistance of 2318 ohms, to the brush of potentiometer 803. The brush of potentiometer 803 is rotated by the shaft 800, but is insulated therefrom. One end of the winding of potentiometer 803 is grounded. The brush of potentiometer 803 is connected through resistor 804, having a resistance of 55,000 ohms and resistance 805 having a resistance of 115,000 ohms to ground. When firing armor piercing or high explosive shells, a switch 806 is closed short-circuiting resistor 805 and a switch 807 is closed short-circuiting resistor 802. The brush of potentiometer 803 is connected through the winding of a potentiometer 808, having a resistance of 57,000 ohms to ground. The winding of potentiometer 803 has a resistance variation as shown by the solid curve Z, Fig. 23, and a resistance of 15,000 ohms. This circuit is similar to the circuit of Fig. 13A, and may be designed with the aid of Equation 14. The functional variation of the voltage supplied to the winding of potentiometer 808 for the armor piercing or high explosive shell is shown by the solid curve AP, Fig. 23. The functional variation of the voltage supplied to the winding of potentiometer 808 for the subcaliber weapon is shown by the dotted curve SC, Fig. 23. The output voltage of amplifier 930, Fig. 5, is adjusted to produce a voltage proportional to the maximum value of the wind across the winding of potentiometer 808, Fig. 8, and the brush of potentiometer 808 is adjusted to the magnitude of the wind and is connected by connection 809 to the resistors 604 and 620, Fig. 6.

Figure 9:
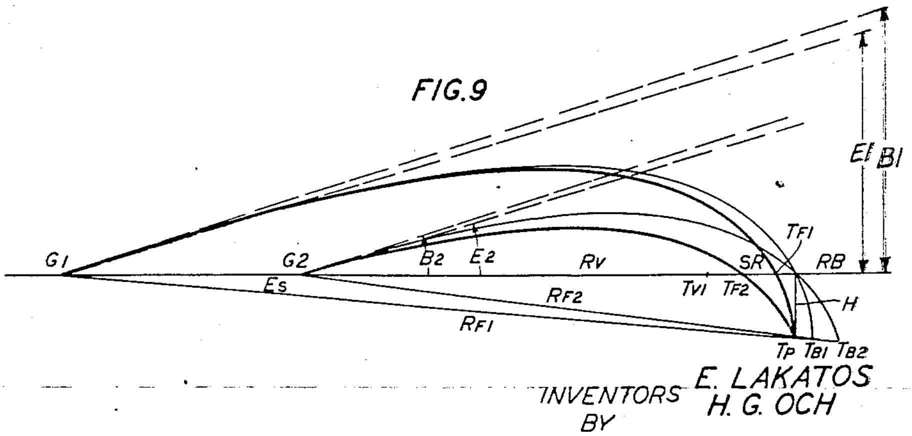

In Fig. 9, the trajectories of the two guns are shown in elevation; the ballistic elevation angle B1 of the pivot gun G1 being the angle above the horizontal plane to which the pivot gun must be elevated in order that, under standard conditions, the shell will travel to the virtual target $T_{v1}$, at a range RV1, and under non-standard conditions the shell will travel the extra distance SR, the algebraic sum of the wind and ballistic differential effects, to a target RB, in the horizontal plane at the distance RB from G1. The distance RB is substantially equal to the firing range RF1.

$$RF1=RB=RV1+SR$$

Now RV1 and SR are functions of ballistic elevation angle B1 and $$-RF1+f_2(B1)+f_3(B1)=0 \qquad (44)$$

where $$RV1=f_2(B1),\ SR=f_3(B1)$$

If the target is not in the same horizontal plane as the pivot gun, the firing elevation angle R1 will not be the same as the ballistic elevation angle B1. Assuming the validity of the principle of the rigidity of the trajectory $E1=B1-E_S$, where $E_S$ is the angle of site. As $E_S$ is usually small, $$E_S=\sin E_S=\frac{H}{RF1}$$

where H is the height of site.

Thus $$E1=B1-\frac{H}{RF1}$$

or, $$RF1\cdot B1-RF1\cdot E1-H=0 \qquad (45)$$

In the present computer, it is assumed that the height of site, H, is the same for both guns. Thus, for the second gun, $$-RF2+f_2(B2)+f_3(B2)=0 \qquad (46)$$

$$RF2\cdot B2-RF2\cdot E_2-H=0 \qquad (47)$$

The principle of the rigidity of the trajectory is not rigorously true, and may provide serious errors at long range. A corrective term, called the complementary angle of site $E_C$, is given in the firing tables for the larger weapons. The correction for the complementary angle of site may be expressed as a correction in range $$R_C=E_C\frac{\delta R}{\delta B}$$

The complementary angle $E_C$ is a function of ballistic elevation $B_1$ and is also proportional to H. The partial derivative $$\frac{\delta R}{\delta B}$$

is also a function of $B_1$. The correction may, therefore, be expressed as $$Rc=Hf(B) \qquad (48)$$

and included in the sum of the range correction SR.

The rotation of the earth during the time of flight of the shell moves the target with respect to the shell and may produce a change in the range, which is termed the earth rotation range effect, ERR. This effect is proportional to $$-\sin AF1 \cos L \qquad (49)$$

where L is the latitude of the gun.

Brush 570, Fig. 5, selects a voltage proportional to $-\sin AF1$ and is connected by connection 939 through resistor 759, Fig. 7, having a resistance of 491,000 ohms, and the winding of potentiometer 760 to ground. The winding of potentiometer 760 has a cosinusoidal variation of resistance extending over one quadrant, 0 degrees being at the upper end and having a resistance of 20,000 ohms. The brush of potentiometer 760 is adjusted to select a voltage proportional to cos L and is connected through resistor 761, having a resistance of 37,500 ohms, resistor 762, having a resistance of 2,500 ohms, and resistor 763, having a resistance of 75,000 ohms to ground. When firing high explosive, HE, shells switch 764 is closed connecting the junction of resistors 761 and 762 to connections 767; when firing armor piercing, AP, shell switch 765 is closed connecting the junction of resistors 762 and 763 to connections 767; and when firing the subcaliber, SC, gun, which does not require any correction for the effects of earth rotation, switch 766 is closed, grounding the connection 767. Connection 767 is connected through resistor 810, Fig. 8, to the input circuit of an amplifier 811, of the type shown in Fig. 11, having a feedback resistor 812.

Brush 569, Fig. 5, selects a voltage proportional to $+\cos AF1$ and is connected through resistor 940 to a tap in the winding of potentiometer 942. Brush 567 selects a voltage proportional to $-\cos AF1$ and is connected through resistor 941 to a diametrically opposite tap in the winding of potentiometer 942. The winding of potentiometer 942 has a sinusoidal variation of resistance, is grounded at the points where the function passes through zero, and the resistors 940 and 941 are connected at the points where the function is a maximum. The brush of potentiometer 942 is connected through resistor 946 to the input circuit of amplifier 948, of the type shown in Fig. 11, having a feedback resistor 949. Brush 568 selects a voltage proportional to +sin $AF1$ and is connected through resistor 943 to a tap in the winding of potentiometer 945. Brush 570 selects a voltage proportional to −sin $AF1$ and is connected through resistor 944 to a diametrically opposite tap in the winding of potentiometer 945. The winding of potentiometer 945 has a sinusoidal variation of resistance, is grounded at the points where the function passes through zero, and is connected to the resistors 943 and 944 at the points where the function is a maximum. The brush of potentiometer 945 is connected through resistor 947 to the input circuit of amplifier 948. The brushes of potentiometers 942 and 945 are rotated by the shaft 928 through the bearing BW of the wind, but are insulated from the shaft 928 and from each other. The brush of potentiometer 942 selects a voltage proportional to −cos $AF1$ cos $BW$, and the brush of potentiometer 945 selects a voltage proportional to −sin $AF1$ sin $BW$, thus by Equation 43, the output voltage of amplifier 948 will have a functional variation corresponding to the functional variation of the range component WR, of the maximum wind. The output circuit of amplifier 948 is connected by connection 950, Figs. 5, 7 and 8 to the contacts of switches 813, 814 and 815, Fig. 8. Switch 813 is closed when firing with the subcaliber, SC, weapon; switch 814 is closed when firing with armor piercing, AP, shell; and switch 815 is closed when firing with high explosive, HE, shell.

When firing with the subcaliber, SC, weapon, switch 813 is closed connecting connection 950 through resistor 816, having a resistance of 36,650 ohms and the winding of potentiometer 819 having a resistance of 70,000 ohms to ground, and to the brush of potentiometer 820. The winding of potentiometer 820 has a total resistance of 9,125 ohms, and has a variation in resistance as shown by the curve, Z, Fig. 25. The switch 824 is closed short-circuiting the first 91.8 ohms of the winding; and the switch 823 is closed short-circuiting the last 1,008.4 ohms of the winding of potentiometer 820. This circuit is designed in accordance with Equation 14. The brush of potentiometer 819 is adjusted to select a voltage proportional to the actual speed of the wind, and the variation of the voltage selected by this brush with movement of the brush of potentiometer 820 is shown by the curve SC, Fig. 25.

When firing AP shell, switch 814 is closed connecting connection 950 through resistor 817, having a resistance of 19,500 ohms, and the winding of potentiometer 820 to ground; switch 825 is closed connecting the brush of potentiometer 820 through resistor 828, having a resistance of 70,000 ohms, to ground; and the brush of potentiometer 820 is connected through the winding of potentiometer 819 to ground. The circuit then has the configuration of the circuit shown in Fig. 13H. The voltage selected by the brush of potentiometer 819 will then vary with the position of the brush of potentiometer 820 as shown by the curve marked AP, Fig. 23.

When firing HE shells, switch 815 is closed connecting connection 950 through resistor 818 having a resistance of 4,450 ohms and the winding of potentiometer 820 to ground; switch 822 is closed connecting resistor 821 having a resistance of 2,650 ohms, across the winding of potentiometer 820; switch 826 is closed connecting the brush of potentiometer 820 through resistor 827 having a resistance of 40,000 ohms, and resistor 828 to ground, and connecting the brush of potentiometer 820 through the winding of potentiometer 819 to ground. The voltage selected by the brush of potentiometer 819 will then vary with the position of the brush of potentiometer 820 as shown by the curve marked HE, Fig. 25.

The brush of potentiometer 819 is connected through resistor 830 to the input circuit of amplifier 811.

A source of voltage 768, Fig. 7, having the negative pole grounded is connected through resistor 769, having a resistance of 37,500 ohms, resistor 770, having a resistance of 75,000 ohms and resistor 771, having a resistance of 120,000 ohms, to the brush of a potentiometer 772. The winding of potentiometer 772 is grounded at one end, and connected at the other end through the winding of potentiometer 775 to ground. The brush of potentiometer 772 is adjusted to the value of the height of site, H. The winding of potentiometer 775 has a linear variation of resistance extending over 700 mils of rotation, and a constant resistance for 50 mils, a total resistance of 4,000 ohms, and is tapped at 1,891.4 ohms, 2,788.5 ohms, and 3,328.6 ohms from the grounded end. A switch 779, when operated connects the first tap to ground. A switch 778, when operated, connects the second tap of the winding through resistor 777 having a resistance of 1,000 ohms, to ground.

The third tap is connected to the contacts of the switches 781 and 783. Switch 781, when operated, connects the third tap through resistor 780, having a resistance of 1,100 ohms to ground. The switch 783, when operated, connects the third tap through resistor 782, having a resistance of 440 ohms, and 780 to ground.

When firing the subcaliber weapon, switch 773 is closed, short-circuiting resistors 770 and 771, and switch 778 is closed. The voltage selected by the brush of potentiometer 775 will then vary with rotation as shown by the curve SC, Fig. 28. When firing with armor piercing shell, switch 774 is closed, short-circuiting resistor 771, switch 779 is closed and switch 781 is closed. The voltage selected by the brush of potentiometer 775 will then vary as shown by the curve AP, Fig. 28.

When firing with high explosive HE shell, switches 779 and 783 are closed and the voltage selected by the brush of potentiometer 775 varies as shown by the curve HE, Fig. 28. The brush of potentiometer 775 is connected by connection 784 through resistor 831, Fig. 8, to the input circuit of amplifier 811, and supplies a voltage proportional to Rc, Equation 48.

A source of voltage 785, Fig. 7, having the midpoint grounded has the positive pole connected to the upper contact of switch 786 through resistor 1198 of value 80,000 ohms and the negative pole connected to the lower contact of switch 786, through resistor 1199 of value 80,000 ohms. For convenience of description, the operation of this circuit with the subcaliber weapon will first be given. If the density of the air is greater than normal, the blade of switch 786 is placed on the upper contact and if the density of the air is less than normal, the blade of switch 786 is placed on the lower contact. The blade of switch 786 is connected through resistor 787, having a resistance of 730,000 ohms, resistor 788 having a resistance of 14,500 ohms, switch 789 and resistor 791, having a resistance of 315,000 ohms, to ground. Switch 790 is closed, connecting the mid-

SEARCH ROOM point of resistors 787 and 788 to the brush of potentiometer 792. The winding of potentiometer 792 is grounded at one end, and has a variation in resistance as shown by the curve Z, Fig. 22. The lower end of resistor 791 is connected to the blades of switches 793 and 794. The contacts of switches 793 and 794 are respectively connected to the ends of the winding of potentiometer 795 having a resistance of 70,000 ohms and the mid-point grounded. The brush of potentiometer 795 is adjusted to the value of the density of the air. This circuit may be designed with the aid of Equation 10. The switch 793 is closed when the density of the air is less than normal and the switch 794 is closed when the density of the air is greater than normal. For convenience in adjusting the circuit, the shaft rotating the brush of potentiometer 795 may be arranged to operate a cam switch when passing through the mid-point of the winding, similar to the cam switch commonly used on radio volume controls. This cam switch may conveniently be arranged to operate one or more relays, switching the circuit from the condition for air density greater than normal to the condition for air density less than normal. Thus, while the switches 786, 793 and 794, for convenience have been shown as simple single-pole-single-throw switches, they may conveniently be springs of this relay. This idea may conveniently be carried still further, thus, while a number of simple switches have been shown for switching the circuit connections from the conditions for the subcaliber weapon SC to the condition for high explosive HE, or armor piercing AP shell, a three-position master switch may conveniently be provided controlling a number of relays which make all the connections required by the various circuits.

When firing armor piercing AP shell, switches 796, 797, 798, 799 and 1,000 are closed. If the density of the air is greater than normal, switch 786 is on the upper contact and switch 794 is closed. Switch 1001 is also closed, connecting the blade of switch 786 through switch 798, resistor 1002 having a resistance of 13,500 ohms, switch 1001, resistor 1005 having a resistance of 10,700 ohms, resistor 1006, having a resistance of 13,600 ohms and resistor 1007 having a resistance of 5907 ohms to ground. The junction of resistors 1005 and 1006 is connected through switches 796 and 794 to the winding of potentiometer 795. The contact of switch 1001 is connected through switch 797 to the brush of potentiometer 792. This circuit may also be designed with the aid of Equation 10. The functional variation of the voltage selected by the brush of potentiometer 795 will then be as shown in the curve AP+, Fig. 22. When the density of the air is less than normal, switch 786 is on the lowest contact, and switches 793, 1003, 1004, 1008, 1009, 1010 are closed, connecting the blade of switch 786 through switch 798, resistor 1002, resistor 1011 having a resistance of 8,000 ohms, switch 1008, and resistor 1012 having a resistance of 81,000 ohms to ground. The brush of potentiometer 792 is connected through switches 797, 1003, 1004, and resistor 1007 to ground. The junction of switches 1003 and 1004 is connected through switch 796 and switch 793 to the winding of potentiometer 795. The free end of the winding of potentiometer 792 is connected through switches 1090 and 1009, and resistor 1012 to ground. The winding of potentiometer 792 has a total resistance of 14,195 ohms and is tapped at 345.7 ohms and 5999.7 ohms from the grounded end. The upper tap is connected through switches 799 and 1010, and resistor 1013 having a resistance of 120,000 ohms to ground. The functional variation of the voltage selected by the brush of potentiometer 795 is shown by the curve AP−, Fig. 22. When firing high explosive, HE, shell switches 1014, 1015, 1016, 1017, 1018, and 1019, are closed. When the air density is above normal, switch 786 is on the upper contact and is connected through resistor 1020, having a resistance of 75,000 ohms, resistor 1021 having a resistance of 9160 ohms and switch 1016 and 1015 to the brush of potentiometer 792. Switch 1022 is on the upper contact, connecting the junction of switches 1015 and 1016 through resistor 1023, having a resistance of 13,085 ohms to ground. The ungrounded end of the winding of potentiometer 792 is connected through switch 1017, switch 1025, and resistor 1026, having a resistance of 28,000 ohms to ground. Switch 1027 is closed, connecting the second tap of the winding of potentiometer 792 through switches 1019 and 1027, and resistor 1028, having a resistance of 17,000 ohms, to ground. With these connections, the functional variation of the voltage selected by the brush of potentiometer 795 is shown by the curve HE+, Fig. 22. If the density of the air is less than normal, switches 786 and 1022 are placed on their lower contacts and switches 793 and 1029 are closed. The blade of switch 786 is connected through resistor 1020, switches 1029, 1016, and 1015, to the brush of potentiometer 792 and through switches 1014 and 793 through the winding of potentiometer 795 to ground. The junction of switches 1015 and 1016 is connected through switch 1022, resistor 1024, having a resistance of 12,400 ohms to ground. The functional variation of the voltage selected by the brush of potentiometer 795 is then as shown by the dotted curve HE−, Fig. 22. The brush of potentiometer 795 is connected by connection 1030 through resistor 832, Fig. 8, to the input circuit of an amplifier 833, of the type shown in Fig. 11, having a feedback resistor 834.

In addition to the effect of non-standard air density for standard muzzle velocity, the interaction effect, that is, the effect of non-standard air density for non-standard muzzle velocity, must be taken into account. The brush of potentiometer 795, Fig. 7, is connected by connection 1030 through resistor 1031, having a resistance of 29,000 ohms to the contacts of switches 1032 and 1038. When firing with HE shell, switch 1032 is closed, and when firing with AP shell, switch 1038 is closed. When firing HE shell, resistor 1031 is connected through switch 1032, resistor 1033, having a resistance of 55,000 ohms, resistor 1034 having a resistance of 31,500 ohms, or switch 1035 to the contacts of switches 1036 and 1042. When firing AP shell, switch 1038 is closed connecting resistor 1031 through switch 1038, resistor 1039, having a resistance of 6,500 ohms, resistor 1040, having a resistance of 14,700 ohms, or switch 1041, to the contacts of switches 1036 and 1042. The blades of switches 1036 and 1042 are respectively connected to the ends of the winding of potentiometer 1037, the mid-point of the winding of potentiometer 1037 being grounded. The brush of potentiometer 1037 is connected to the upper contact of switch 1043 and the lower contact of switch 1044, the lower contact of switch 1043 and the upper contact of switch 1044 being grounded. Potentiometer 1037 is similar to potentiometer 795, thus when the brush of potentiometer 1037 passes the mid-point of the winding, a cam switch is closed operating a relay controlling switches 1035, 1036, 1041, 1042, 1043 and 1044. Thus, when the muzzle velocity is greater than normal, switches 1035, 1036, 1041 are operated and switches 1043 and 1044 are on the upper contacts; when the muzzle velocity is less than normal, switch 1042 is closed and switches 1043 and 1044 are on the lower contacts. The blade of switch 1043 is connected by connection 1045 through resistor 836, Fig. 8, to the input circuit of amplifier 833. The blade of switch 1044, Fig. 7, is connected by connection 1046 through resistor 837 to the input circuit of amplifier 811, Fig. 8. Thus when the muzzle velocity of the gun is above normal, a voltage is supplied through resistor 836 to the input circuit of amplifier 833, and is reversed in polarity by amplifier 833 and supplied to the input circuit of amplifier 811, the resistor 837 being grounded. When the muzzle velocity of the gun is less than normal, voltage is supplied through resistor 837 directly to the input circuit of amplifier 811, and thus is of opposite polarity to the voltage supplied through resistor 836. Thus by the use of the intermediate amplifier 833, the voltage representing one of the ballistic effects may be reversed in polarity before being supplied to the amplifier 811. The use of the intermediate amplifier 833, thus simplifies the air density circuit of Fig. 7 by avoiding the necessity of supplying two voltages of opposite polarity proportional to the air density effect from the potentiometer 795.

Figure 8:
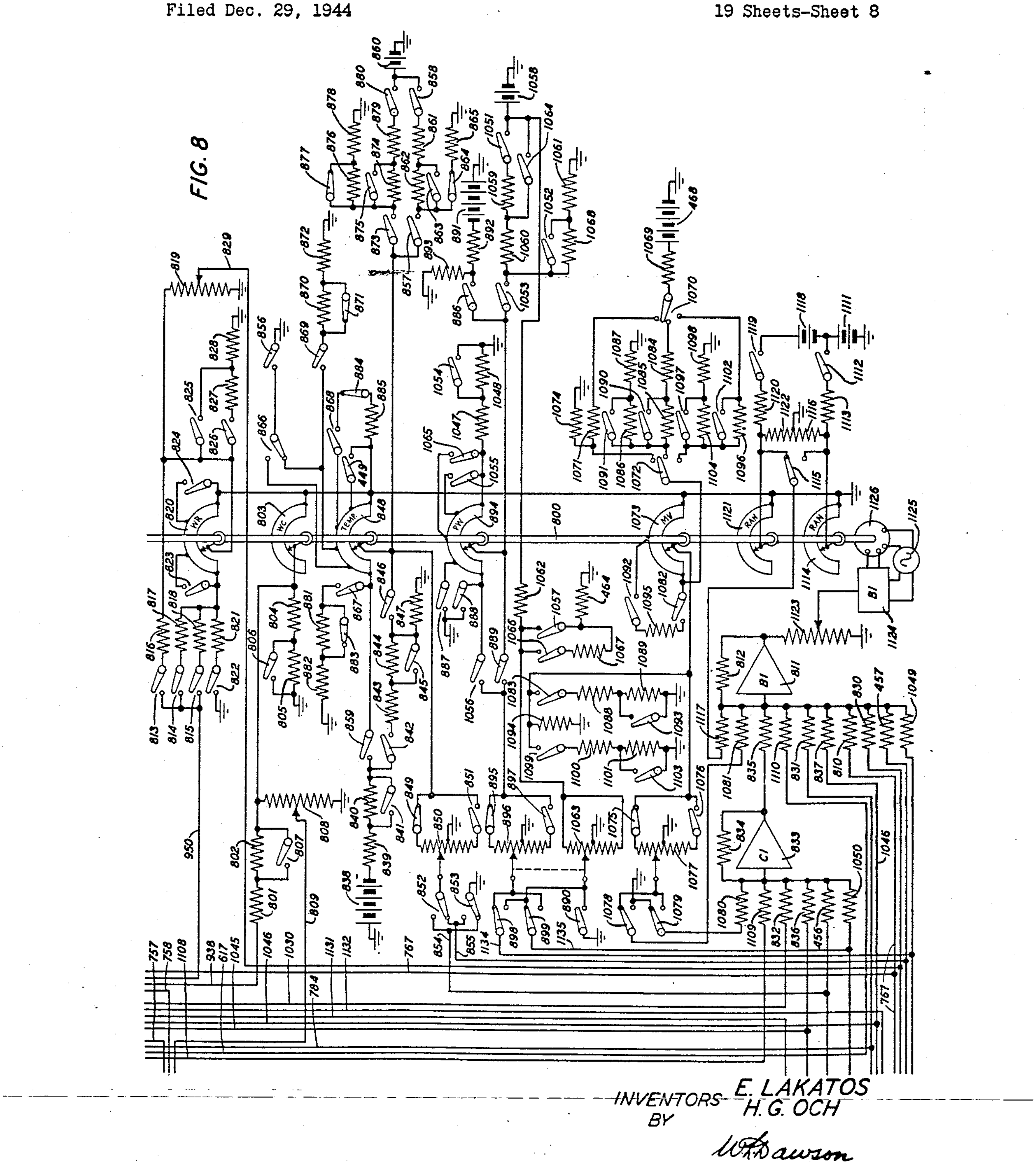

The standard temperature of the air is assumed to be 59° F. and if the temperature is above or below this value, the range of the shell will be affected. The circuit for the subcaliber SC weapon will first be described. Switches 842 and 846, Fig. 8, are closed. A source of voltage 838, having the positive pole grounded, is connected through resistor 839, having a resistance of 190,000 ohms, resistor 840, having a resistance of 230,000 ohms, switch 842, resistor 843, having a resistance of 509,000 ohms, resistor 844 having a resistance of 80,000 ohms, through switch 846 to the brush of potentiometer 848. Resistor 847, having a resistance of 78,500 ohms is connected from the contact of switch 846 to ground. The winding of potentiometer 848 has a variation in resistance as shown by the curve Z, Fig. 24, a total resistance of 8142 ohms and is tapped at 1119.8 ohms, 5718.6 ohms, 7068.0 ohms, and 7800.0 ohms from the grounded end. A switch 449 short-circuits the last section of 1119.8 ohms of the winding. The brush of potentiometer 848 is connected to the contacts of switches 849 and 851. The blades of switches 849 and 851 are respectively connected to the ends of the winding of potentiometer 850, having the mid-point grounded. Potentiometer 850 is of the same type as potentiometer 795, Fig. 7. The brush of potentiometer 850, Fig. 8, is connected to the blade of switch 852, the blade of switch 853 being grounded. The brush of potentiometer 850 controls a relay, which, when the temperature is higher than normal closes switch 849, and closes switches 852 and 853 on the lower contacts. When the temperature is below normal, the brush of potentiometer 850 operates a relay which closes contacts 841, 845, and 851, and operates the switches 852 and 853 to the upper contacts. The upper contact of switch 852 and the lower contact of switch 853 are connected by connection 854 through resistor 856 to the input circuit of amplifier 833. The lower contact of switch 852 and the upper contact of switch 853 are connected by connection 855 through resistor 857 to the input circuit of amplifier 811. The brush of potentiometer 850 is adjusted to the temperature of the atmosphere and the functional variation of the voltage selected by the wiper of potentiometer 850 for temperatures less than normal is shown by the solid curve marked SC 0°, Fig. 24. The functional variation of the voltage selected by the wiper of potentiometer 850 for temperatures greater than normal is shown by the dotted curve marked SC 100°, Fig. 24. This circuit may be designed with the aid of Equation 14.

When firing HE shell, switches 856, 857, 858, and 859 are closed. The source of voltage 838 is then connected through resistors 839 and 840, switch 859 and the winding of potentiometer 848 to ground. A source of voltage 860, having the negative pole grounded is connected through switch 858, resistor 861, having a resistance of 63,800 ohms, resistor 862, having a resistance of 35,000 ohms and switch 857 to the brush of potentiometer 848. If the temperature is above normal, switch 864 is operated, connecting the brush of potentiometer 848 through switches 857 and 864, and resistor 865 having a resistance of 22,000 ohms to ground. If the temperature is above normal switch 866 is operated to the lower contact, connecting the 7068 ohms tap in the winding of potentiometer 848, through switch 856 to ground. If the temperature is below normal, switch 866 is operated to the upper contact connecting the 7800-ohm tap in the winding of the potentiometer 848, through switch 856 to ground, switch 841 is closed short-circuiting resistor 840, and switch 863 is closed short-circuiting resistor 862. The functional variation of the voltage selected by the brush of potentiometer 850 for the temperature less than normal is shown by the dash double dot line marked HE 0°, Fig. 24; and the functional variation of voltage for temperature greater than normal is shown by the dotted curve marked HE 100°, Fig. 24. This circuit has the configuration of the circuit shown in Fig. 13C and may be designed with the aid of Equation 16.

When firing AP shell, switches 867, 868, 869, 873 and 880 are closed. The ungrounded end of the winding of potentiometer 848 is connected through switch 867, resistor 881, having a resistance of 180 ohms and resistor 882 having a resistance of 740 ohms to ground. The 7068-ohm tap in the winding of potentiometer 848 is connected through switch 869, resistor 870 having a resistance of 1620 ohms and resistor 872 having a resistance of 360 ohms to ground. The source of power 860 is connected through switch 880, resistor 879 having a resistance of 33,500 ohms, resistor 874, having a resistance of 20,000 ohms and switch 873 to the brush of potentiometer 848. The brush of potentiometer 848 is connected through switch 873, resistor 876, having a resistance of 340 ohms, resistor 878, having a resistance of 1740 ohms, to ground. If the temperature is greater than normal, switch 883 is closed short-circuiting resistor 881; switch 884 is closed connecting the 5718.6 ohms tap in the winding of potentiometer 848 through switches 868 and 884 and resistor 885, having a resistance of 1300 ohms, to ground; switch 879 is closed short-circuiting resistor 870; and switch 877 is closed short-circuiting resistor 876. If the temperature is below normal, switch 875 is closed short-circuiting resistor 874. The functional variation of the voltage selected by the wiper of potentiometer 850, for temperatures below normal is shown by the dashed curve marked AP 0°, Fig. 24, and the functional variation for temperatures above normal is shown by the dash curve marked AP 100°, Fig. 24. The circuit may be designed with the aid of Equation 10.

If the weight of the projectile is larger or smaller than normal, the range of the projectile will be affected, and allowance must be made for this effect. When firing the subcaliber weapon, switches 886, 887, 888, 889 and 890, Fig. 8, are closed. A source of current, 891, having the positive pole grounded is connected through resistor 892, having a resistance of 2.5 megohms and switch 886 to the brush of potentiometer 894. A resistor 893, having a resistance of 19,000 ohms is connected from the contact of switch 886 to ground. The winding of potentiometer 894 has a linear variation in resistance a total resistance of 11,500 ohms and is tapped at 2038.1 ohms, 2264.5 ohms and 10190.3 ohms from the lower end. The upper end is grounded through switch 888 and the 10190.3-ohm tap is grounded through switch 887. The lower end of the winding is connected through resistor 1047, having a resistance of 1314.5 ohms and resistor 1048, having a resistance of 3,000 ohms to ground. The brush of potentiometer 894 is connected through switch 889 to the contacts of switches 895 and 897. The blades of switches 895 and 897 are respectively connected to the free ends of the winding of potentiometer 896 having a resistance of 70,000 ohms, and the mid-point grounded. The brush of potentiometer 896 is connected to the upper contact of switch 898 and the lower contact of switch 899; the lower contact of switch 898 and the upper contact of switch 899 being connected through switch 890 to ground. The switches 895, 897, 898 and 899 are springs of a relay controlled by the motion of the brush of potentiometer 896 so that when the projectile weight is larger than normal, switch 895 is closed and switches 898 and 899 are on the upper contacts; and when the weight of the projectile is less than normal, switch 897 is closed and switches 898 and 899 are on the lower contacts. The functional variation of the voltage selected by the brush of potentiometer 896 with movement of the brush of potentiometer 894 is shown by the curve marked SC, Fig. 26. The blade of switch 898 is connected through resistor 1049 to the input circuit of amplifier 811, and the blade of switch 899 is connected through resistor 1050 to the input circuit of amplifier 833. When firing with HE shell, switches 1051, 1052, 1053, 1054, 1055, 1056 and 1057 are closed. A source of voltage 1058, having the negative pole grounded is connected through switch 1051, resistor 1059 having a resistance of 200 ohms, resistor 1060 having a resistance of 8960 ohms and switch 1053 to the brush of potentiometer 894, the contacts of switch 1053 are connected through switch 1052 and resistor 1061, having a resistance of 763.07 ohms to ground. The 2038.1-ohm tap in the winding of potentiometer 894 is connected through switch 1055 to the lower end of the winding and through resistor 1047, and switch 1054 to ground. The upper end of the winding of potentiometer 894 is connected through switch 1056 to the contacts of switches 895 and 897. The source of voltage 1058 is connected through resistor 1062, having a resistance of 75,000 ohms to the free ends of the winding of potentiometer 1063, having a resistance of 57,000 ohms and the mid-point grounded. The upper end of the resistor 1062 is connected through switch 1057 and resistor 1064 having a resistance of 4064 ohms to ground. The brush of potentiometer 1063 is connected to the lower contact of switch 898 and the upper contact of switch 899, the brush of potentiometer 1063 is adjusted to the value of the weight of the projectile and may conveniently be ganged with the brush of potentiometer 896. The functional variation of the voltage supplied through switch 898 to the input circuit of amplifier 811 and the voltage of reverse polarity supplied by switch 899 through amplifier 833 to the input circuit of amplifier 811 is shown by the curve marked HE, Fig. 26. This circuit is similar to Fig. 13G.

When firing AP shell switches 1064, 1053, 1054, 1065, 1056 and 1066 are closed. The source of voltage 1058 is connected through switch 1064, resistor 1060, switch 1053, to the brush of potentiometer 894. The contacts of switch 1053 is connected through resistor 1068, having a resistance of 580 ohms, and resistor 1061 to ground. The 2264.5-ohm tap in the winding of potentiometer 894 is connected through switch 1065, resistor 1047, switch 1054 to ground. The upper end of the winding of potentiometer 894 is connected through switch 1056 to the contacts of switches 895 and 897. The source of voltage 1058 is also connected through resistor 1062 to the free ends of the winding of potentiometer 1063. The upper end of resistor 1062 is connected through switch 1066, resistor 1067, having a resistance of 2760 ohms and resistor 1064 to ground. The functional variation of the sum of the voltages of switches 898 and 899 with variations in the position of the brush of potentiometer 894, is shown by the curve marked AP, Fig. 26.

If the muzzle velocity of the weapon is not standard, the range of the projectile will be affected and the balance must be the same for this effect. When firing with the subcaliber weapon, switches 1070 and 1072 are placed on the upper contacts. A source of voltage 1068 having the negative pole grounded is connected through resistor 1069 having a resistance of 61,720 ohms, resistor 1071, having a resistance of 106,570 ohms, switch 1072, and the winding of potentiometer 1073 to ground. A resistor 1074, having a resistance of 95,000 ohms is connected from the contacts of switch 1072 to ground. The winding of potentiometer 1073 has a variation of resistance as shown by the curve marked Z, Fig. 27, a total resistance of 15,000 ohms and is tapped at 9,600 ohms from the grounded end.

The brush of potentiometer 1073 is connected to the contacts of switches 1075 and 1076. The blades of switches 1075 and 1076 are respectively connected to the free ends of the winding of a potentiometer 1077, having a total resistance of 70,000 ohms, the mid-point being grounded. Potentiometer 1077 is like potentiometer 795, Fig. 7, and the brush of potentiometer 1077 in passing through the mid-point causes the operation of a relay. The brush of potentiometer 1077 is connected through the upper contacts of switch 1078 and the lower contact of switch 1079, the lower contact of switch 1078 and the upper contact of switch 1079 being grounded. The switches 1075, 1076, 1078 and 1079 are contacts on the relay controlled by the brush of potentiometer 1077, but when the muzzle velocity is larger than normal, switch 1075 is operated and switches 1078 and 1079 are on the upper contacts, when the muzzle velocity is less than normal, switch 1076 is operated and switches 1078 and 1079 are on their lower contacts. The functional variation of the voltage selected by the brush of potentiometer 1077, with variations in the position of the brush of potentiometer 1073, is shown by the curve marked SC, Fig. 27. The blade of switch 1078 is connected through resistor 1081 to the input circuit of amplifier 811, and the blades of switch 1079 are connected through resistor 1080 to the input circuit of amplifier 833.

When firing with HE shell, switches 1070 and 1072 are placed on the middle contacts and switches 1082 and 1083 are closed. The source of power 1068 is connected through resistor 1069, switch 1070, resistor 1084 having a resistance of 1836.3 ohms, resistor 1085, having a resistance of 17,700 ohms, switch 1072 through the winding of potentiometer 1073 to ground. The contact of switch 1072 is connected through resistor 1086 having a resistance of 43,000 ohms, resistor 1087, having a resistance of 41,000 ohms to ground. The brush of potentiometer 1073 is connected through switch 1083, resistor 1088. Resistor 1088 having a resistance of 3016.5 ohms, resistor 1089 having a resistance of 3024 ohms to ground, and through resistor 1094, having a resistance of 2484.3 ohms to ground. The functional variation of the voltage selected by the brush of potentiometer 1077 when the muzzle velocity of the gun is larger than normal is shown by the curve HE+, Fig. 27. If the muzzle velocity is less than normal, the movement of the brush of potentiometer 1077 closes switches 1090 short-circuiting resistor 1085, switch 1091, short-circuiting resistor 1086 and switch 1093, short-circuiting resistor 1089 and switch 1092, connecting the uppper end of the winding of potentiometer 1073 through switch 1082, resistor 1095 having a resistance of 7540 ohms, switch 1096 to the tap in the winding of potentiometer 1073. The functional variation of the voltage selected by the brush of potentiometer 1077 with movement of the brush of the potentiometer 1073 when the muzzle velocity of the gun is less than normal, is shown by the curve marked HE−, Fig. 27.

When firing AP shell, with a muzzle velocity higher than normal, switches 1070 and 1072 are placed on their lower contacts. Switch 1099 is closed and the movement of the brush of potentiometer 1077 closes switch 1097. The source of voltage 1068 is connected through resistor 1069, switch 1070, resistor 1096, having a resistance of 4,500 ohms, switch 1072 and the winding of potentiometer 1073 to ground. The contact of switch 1072 is connected through switch 1097, and resistor 1098 having a resistance of 54,000 ohms to ground. The brush of potentiometer 1073 is connected through resistor 1094 to ground and through switch 1099, resistor 1100, having a resistance of 2690 ohms and resistor 1101 having a resistance of 1150 ohms to ground. The functional variation of the voltage selected by the wiper of potentiometer 1077 with movement of the brush of potentiometer 1073 is as shown by the curve marked AP+, Fig. 27. When the brush of potentiometer 1077 is adjusted to a muzzle velocity less than normal, switch 1097 is opened and switches 1102 and 1103 are closed. Switch 1102 short-circuits resistor 1096, switch 1103 short-circuits resistor 1101, and the opening of switch 1097 places resistor 1104, having a resistance of 3,500 ohms in series with resistor 1198. The functional variation of the voltage selected by the brush of potentiometer 1077 is then as shown by the dash line marked AP−, Fig. 27.

Thus the voltages proportional to the differential ballistic effects and the interactions between these effects have been supplied either directly to amplifier 811 or through amplifier 833 to amplifier 811, and the output circuit of amplifier 811 will have a voltage component proportional to SR.

The output circuits of amplifiers 613 and 610, Fig. 6, are respectively connected by connections 617 and 639, Figs. 6, 5 and 7, through resistors 1105 and 1106, Fig. 7, to the free ends of the windings of potentiometer 1107, the mid-point of the winding being grounded. The brush of potentiometer 1107 may be arbitrarily adjusted by the ranging officers to introduce a range spot correction, and is connected by connection 1108 through resistor 1109, Fig. 8, to the input circuit of amplifier 833.

The output circuit of amplifier 613, Fig. 6, having a voltage proportional to −RF1 is connected by connection 617, Figs. 6, 5, 7 and 8 through resistor 1110, Fig. 8, to the input circuit of amplifier 811.

When firing with the subcaliber weapon, a source of voltage 1111 is connected through switch 1112, resistor 1113, having a resistance of 29,843 ohms to the brush of potentiometer 1114. The winding of potentiometer 1114 has a substantially linear variation of resistance and a resistance of 50,000 ohms. The brush of potentiometer 1114 is connected through resistor 1116 having a resistance of 380,000 ohms to ground, and through switch 1115 and resistor 1117 to the input circuit of amplifier 811.

When firing with the larger weapon an additional source of voltage 1118 is connected in series with the source 1111 through switch 1119, resistor 1120 having a resistance of 54,000 ohms to the brush of potentiometer 1120, and through switch 1115 and resistor 1117 to the input circuit of amplifier 811. The brush of potentiometer 1121 is connected to ground through resistor 1122, having a resistance of 42,000 ohms. The winding of potentiometer 1121 has a substantially linear variation of resistance and a total resistance of 60,000 ohms.

Thus, to the input circuit of amplifier 811, the connection 1117, supplies a voltage proportional to the virtual range RV1, the connection 1110 supplies a voltage proportional to −RF1 and the other connections supply voltages to proportional to +SR and by Equation 45, the sum of these quantities should be zero. The output circuit of amplifier 811 is connected to the winding of potentiometer 1123. The brush of potentiometer 1123 is connected to a control circuit 1124, of the type shown in Fig. 12. A source of two-phase voltage is connected directly to one winding of the two-phase motor 1126, and through the control circuit 1124 to the other winding of motor 1126. If the output voltage of amplifier 811 is not equal to zero, current is supplied to the control circuit 1124 starting motor 1126 and rotating shaft 800 until the output voltage of amplifier 811 has been reduced to zero. The shaft 800 has been rotated to the angle B1, the ballistic elevation angle for the pivot gun G1.

The output circuit of amplifier 610, Fig. 6, is connected by connection 639, Figs. 6, 5 and 7, through the winding of potentiometer 776, Fig. 7, to ground. The brush of potentiometer 776 is rotated by the shaft 800 through the angle B1, to select a voltage proportional to $RF1 \cdot B1$, and is connected by connection 1130 through resistor 951, Fig. 5, to the input circuit of an am-

SEARCH ROOM plifier 954, of the type shown in Fig. 11 having a feedback resistor 955.

A source of voltage 1127, Fig. 7, is connected through the winding of potentiometer 1128 to ground. The brush of potentiometer 1128 is adjusted to select a voltage proportional to the height of site H, and is connected by connection 1129 through resistor 953, Fig. 5, to the input circuit of amplifier 954.

The output circuit of amplifier 613, Fig. 6, is connected by connection 617 through the left-hand portion of the winding of potentiometer 960, Fig. 5, to ground. The output circuit of amplifier 610, Fig. 6, is connected by connection 639 through resistor 962, Fig. 5, and the right-hand portion of the winding of potentiometer 960 to ground. It is assumed that the pivot gun G1 will have a maximum elevation of about 800 mils, and a maximum depression of about 100 mils. The left-hand portion of the winding of potentiometer 960 has a resistance of 50,000 ohms, the right-hand portion of the winding of potentiometer 960 has a resistance of about 6490 ohms and the resistor 962 has a resistance of 43,510 ohms; that is, the resistance of the resistor 962 and the right-hand section of the winding of potentiometer 960 is equal to the resistance of the left-hand section of the winding of potentiometer 960. As the total angle of elevation and depression is only about 900 mils, the winding of potentiometer 960 may be spread out over 6300 mils and the brush geared to rotate through seven times the angle of elevation. The brush of potentiometer 960 is connected through resistor 963 to the input circuit of amplifier 954. The voltages supplied to the input circuit of amplifier 954 are respectively equal to $+RE1B1-H-RF1E1$ and the sum of these voltages should be zero. The output circuit of amplifier 954 is connected through the winding of potentiometer 956 to ground. The brush of potentiometer 956 is connected to a control circuit 957, of the type shown in Fig. 12. A source of two-phase power 958 has one phase connected directly to one winding of the two-phase motor 959, and the other phase connected through the control circuit 957 to the other winding of the motor 959. If the output voltage of the amplifier 954 is not equal to zero, current will be supplied to the control circuit 957, starting the motor 959, rotating the brushes of potentiometer 960 until the voltage is reduced to zero and the brush of potentiometer 960 has been rotated through the quadrant elevation, E1, of the pivot gun G1, which may be indicated by a suitable dial 961, and transmitted to the gun by any suitable transmission system.

The difference in elevation of the two guns of a battery will generally be rather small and as the height of site effect is not very large, the same allowance for height of site may be made for both guns. Thus the brush of potentiometer 775, Fig. 7, is connected by connection 784, Figs. 7, 8 and 6, through resistor 640, Fig. 6, to the input circuit of an amplifier 641, of the type shown in Fig. 11 having a feedback resistor 642.

The interaction effect between muzzle velocity and air density for the second gun will equal the interaction effect for the muzzle velocity of the first gun plus the interaction effect for the difference in the muzzle velocities of the two guns. The blade of switch 1043, Fig. 7, is connected by connection 1045 through resistor 643, Fig. 6, to the input circuit of an amplifier 644 of the type shown in Fig. 11, having a feedback resistor 645. The output circuit of amplifier 644 is connected through resistor 646 to the input circuit of amplifier 641. The blade of switch 1044, Fig. 7, is connected by connection 1046 through resistor 647, Fig. 6, to the input circuit of amplifier 641. Thus a voltage corresponding to the interaction effect between the muzzle velocity and air density for the muzzle velocity of the first gun is applied to the input circuit of amplifier 641. The junction of resistors 1034 and 1040, Fig. 7, is connected through resistor 1127, having a resistance of 49,000 ohms, and the winding of potentiometer 1128 to ground. The brush of potentiometer 1128 is connected to the upper contact of switch 1129 and the lower contact of switch 1130, the lower contact of switch 1129 and the upper contact of switch 1130 being grounded. If the muzzle velocity of the second gun is less than the muzzle velocity of the first gun, switches 1129 and 1130 are placed on the upper contacts, and if the muzzle velocity of the second gun is larger than the muzzle velocity of the first gun, switches 1129 and 1130 are placed on the lower contacts. The brush of potentiometer 1128 is adjusted to the magnitude of the difference in muzzle velocity between the two guns. The blade of switch 1129 is connected by connection 1131 through resistors 648, Fig. 6, to the input circuit of amplifier 644. The blade of switch 1130, Fig. 7, is connected by connection 1132 through resistor 649, Fig. 6, to the input circuit of amplifier 641.

As the ranges of the two guns are not materially different, the range effect of the rotation of the earth, ERR will be substantially the same for both guns. The blades of switches 764, 765 and 766, Fig. 7, are connected by connection 767 through resistor 650, Fig. 6, to the input circuit of amplifier 641, thus supplying a voltage proportional to the range component of the earth rotation effect.

As the ranges of the two guns are not materially different, the range component of the effect of the wind will be substantially the same. Thus the wiper of potentiometer 819, Fig. 8, is connected by connection 1133 through resistor 651, Fig. 6, to the input circuit of amplifier 641.

As a non-standard temperature will have substantially the same effect on the ranges of both guns, the contacts of switches 852 and 853, Fig. 8, are connected by connection 854 through resistor 652, Fig. 6, to the input circuit of amplifier 644; and by connection 855, Fig. 8, through resistor 653, Fig. 6, to the input circuit of amplifier 641.

It is the usual practice in a battery to classify the projectiles according to weight, thus at any given instant both guns will be firing projectiles of the same weight. The blade of switch 898, Fig. 8, is connected by connection 1134 through resistor 654, Fig. 6, to the input circuit of amplifier 641; and the blade of switch 899, Fig. 8, is connected by connection 1135 through resistor 655, Fig. 6, to the input circuit of amplifier 644, thus supplying to amplifier 641 a voltage proportional to the effect of the weight of the projectile.

Figure 22:
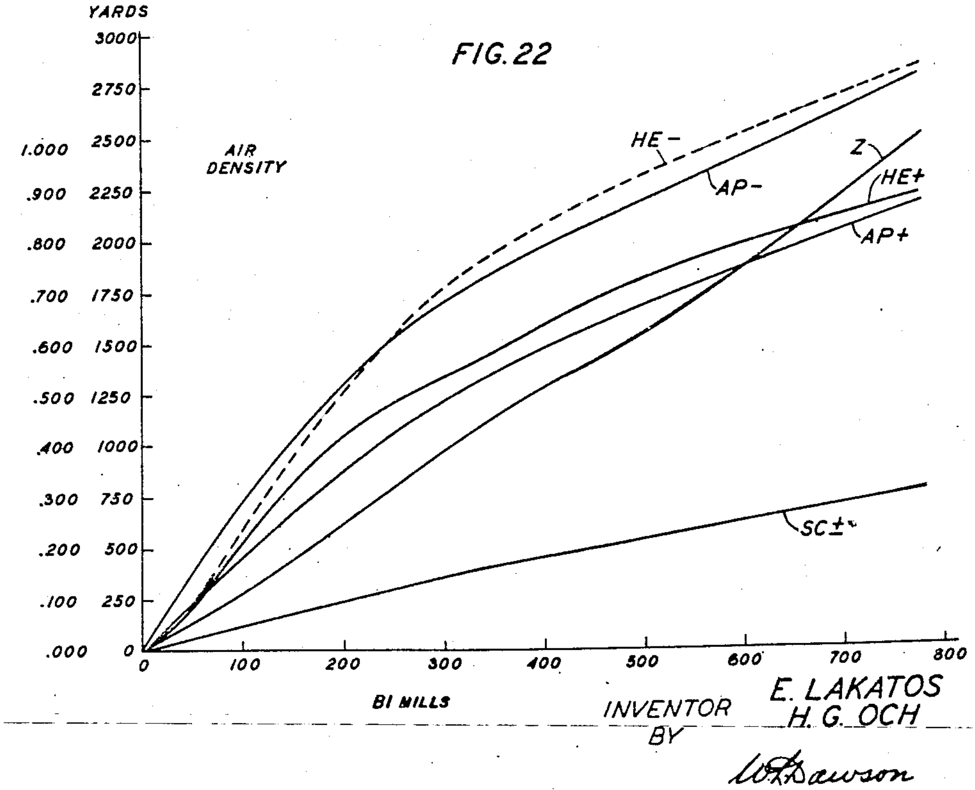
Figure 23:
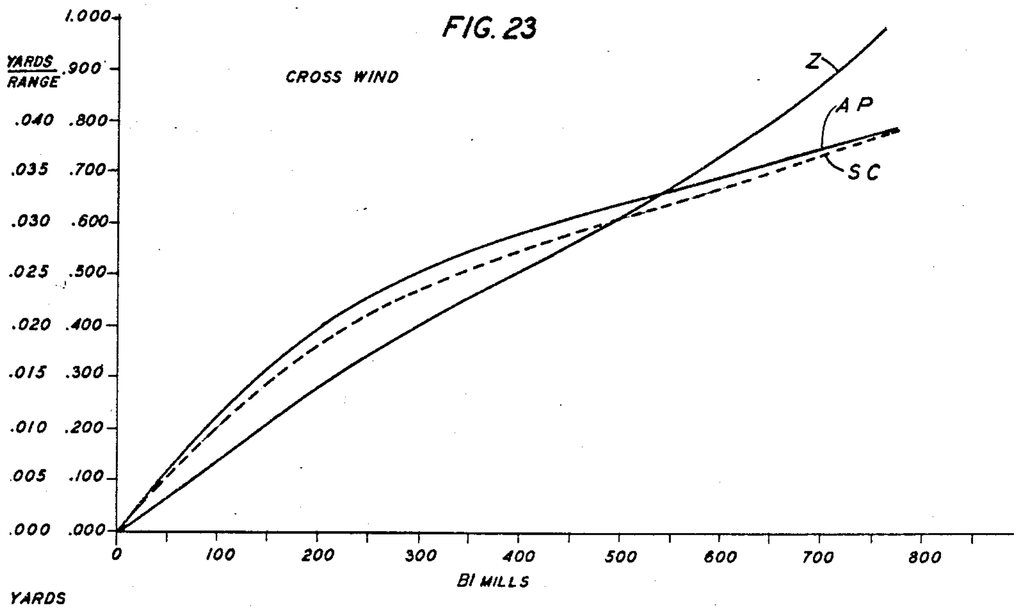
Figure 24:
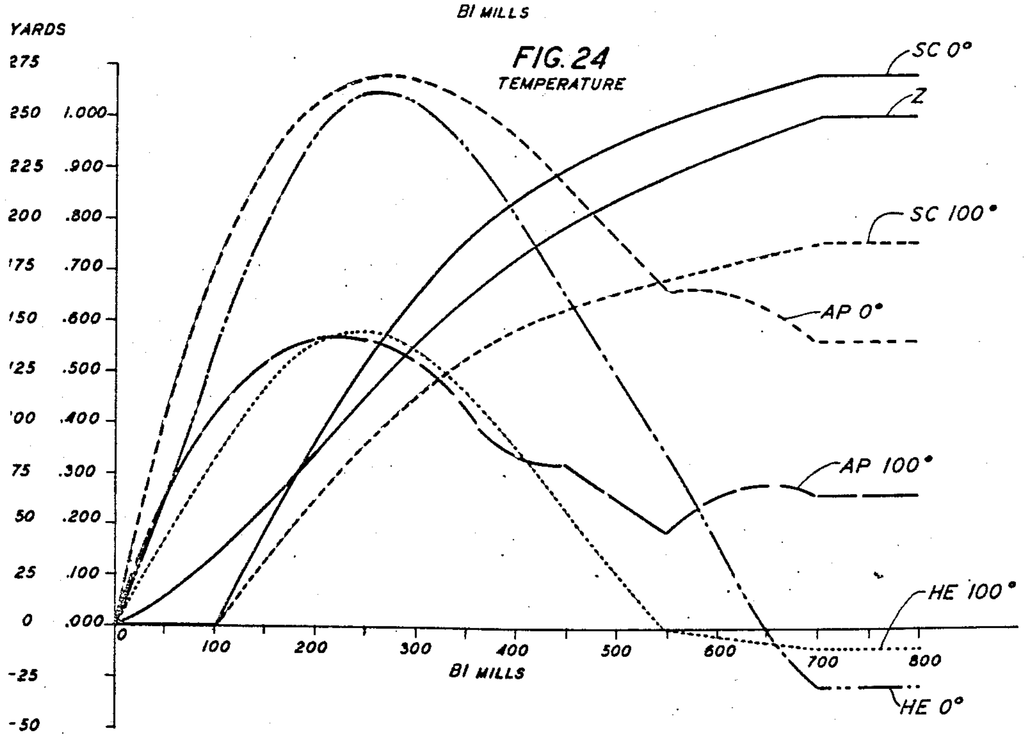
Figure 27:
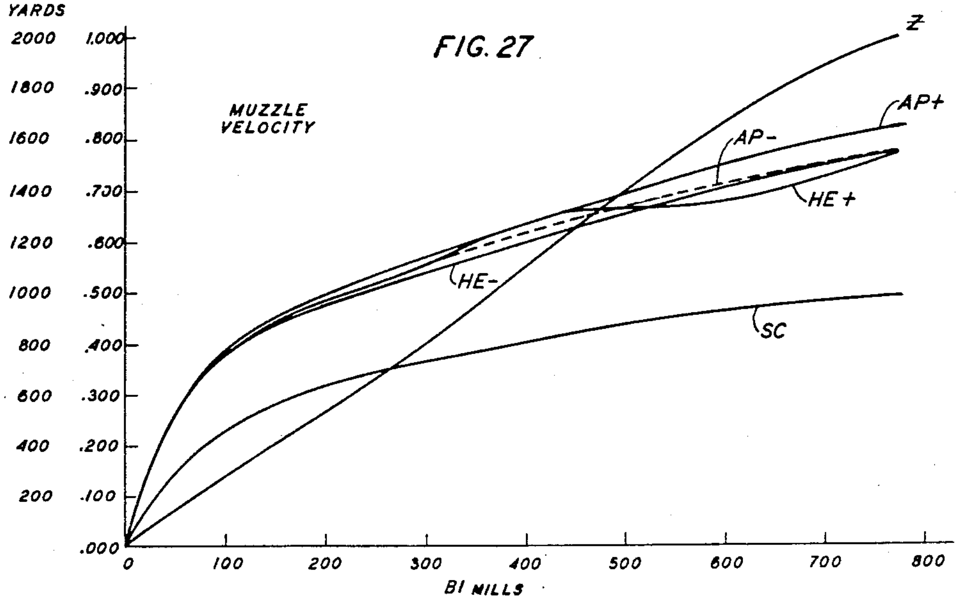

As shown in Figs. 22 and 27, the air density and muzzle velocity effects are rather large, thus it is advisable to independently allow for these two effects on the shell of the second gun. As the configurations of the circuits for the second gun are the same as the configurations of these circuits for the first gun, a brief description of these circuits will be sufficient. A source of voltage 656, having the mid-point grounded has the positive pole connected to the left contact of switch 657 and the negative pole connected to the right contacts of switch 657. If the density of the air is greater than normal, switch 657 is placed on the left contact and if the density of the air is less than normal, switch 657 is placed on the right-hand contacts. When firing with the subcaliber weapon, the source of voltage 656 is connected through switch 657, resistor 658, and switch 659 to the brush of potentiometer 660; and through resistor 661, switch 662, to the blades of switches 663 and 664, and through resistors 666 to ground. The contacts of switches 663 and 664 are respectively connected to the free ends of the winding of potentiometer 665, the mid-point being grounded. The brush of potentiometer 665 is adjusted to the density of the air and is connected by connection 667 through resistor 668 to the input circuit of amplifier 644. The winding of potentiometer 660 is the same as the winding of potentiometer 792, Fig. 7, and varies in resistance in accordance with the curve marked "Z," Fig. 22. The functional variation of the voltage selected by the brush of potentiometer 665, Fig. 6, will be as shown in the curve marked SC±, Fig. 22. When firing with HE shell, switches 669, 670, 671, 672, 673, 674 and 675 are closed. If the density of the air is higher than normal, switches 657 and 676 are placed on their left-hand contacts, and switches 664, 677, 678 and 679 are closed. The source of voltage 656 is connected through switch 675, resistor 680, resistor 681, switch 669, switch 676 and resistor 682 to ground. The blades of switches 669 and 676 are connected through switch 670 to the brush of potentiometer 660, and to switch 671 to the blades of switches 663 and 664. The upper end of the winding of potentiometer 660 is connected through switches 672 and 677 and resistors 684 to ground. The lower tap in the winding of potentiometer 660 is connected through switch 673 to ground and the intermediate tap is connected through switches 674 and 679 and resistor 685 to ground. If the density of the air is less than normal, switches 657 and 676 are moved to their right-hand contacts and switches 663 and 686 are closed. The source of voltage 656 is then connected through switch 657, resistor 680, switch 686, switch 669, switch 676 and resistor 683 to ground. The blades of switches 669 and 676 are connected through switch 670 to the brush of potentiometer 660 and through switch 671 to the blades of switches 663 and 664. The brush of potentiometer 665 is connected through switch 675, resistor 687, resistor 688 and resistor 689 to ground.

When firing AP shell, switches 690, 691, 692, 693, 694 and 695 are closed. If the density of the air is greater than normal, switches 657 and 676 are placed on their left-hand contacts, and switches 664 and 696 are operated. The source of voltage 656 is connected through switch 657, switch 692, resistor 698, switch 697 and resistors 699, 963, and 964 to ground. The contact of switch 697 is connected through switch 691 to the brush of potentiometer 660. The junction of resistors 699 and 963 is connected through switch 690 to the blades of switches 663 and 664. The brush of potentiometer 664 is connected to switch 694, resistor 965, switch 696 and resistor 689 to ground. If the density of the air is less than normal, switch 657 is moved to the right-hand contacts, and switches 663, 967, 968 and 970 are closed. The source of power 656 is connected through switch 657, switch 692, resistor 698, resistor 966, switch 967, and resistor 969 to ground. The upper end of resistor 969 is connected through switches 968 and 693 to the upper end of the winding of potentiometer 660. The upper tap in the winding of potentiometers 660 is connected through switches 695 and 970 and resistor 971 to ground. The brush of potentiometer 660 is connected through switch 972, switch 690 and switch 663 to the winding of potentiometer 665. The junction of switches 690 and 972 are connected through switch 973 and resistor 964 to ground. The brush of potentiometer 665 is connected through switch 694, resistor 965, resistor 972, and resistor 689 to ground.

The configuration and element values of the circuit for the muzzle velocity effect of the second gun are the same as the configuration and element values of the circuit for the first gun. When firing with the subcaliber weapon, switch 977 is placed on the left-hand contact and switch 978 is placed on the lower contact. A source of voltage 975 is connected through resistor 976, switch 977, resistor 979 and switch 978 through the winding of potentiometer 980 to ground. A resistor 981 is connected through the contacts of switch 978 to ground. The brush of potentiometer 980 is connected through resistor 986 to ground. The free end of resistor 986 is connected to the blades of the switches 981 and 982. The contacts of switches 981 and 982 are respectively connected to the free ends of the windings of a potentiometer 983, having the mid-point grounded. The brush of potentiometer 983 is connected to the upper contact of switch 984 and the lower contact of switch 985, the lower contact of switch 984 and the upper contact of switch 985 being grounded. When the muzzle velocity is larger than normal, the movement of the brush of potentiometer 983 as before, may operate a relay (not shown). The switches 981, 982, 984 and 985 may be springs operated by this relay so that when the muzzle velocity is larger than normal, switch 981 is operated and switches 984 and 985 are on their upper contacts. When the muzzle velocity is less than normal, switch 982 is operated, and switches 984 and 985 are on their lower contacts. The blade of switch 984 is connected through resistor 987 to the input circuit of amplifier 641, and the blade of switch 985 is connected through resistor 988 to the input circuit of amplifier 644. When firing with AP shell, switches 977 and 978 are placed on their center contacts. The source of voltage 975 is connected through resistor 976, switch 977, resistor 990, switch 991 and resistor 992 to ground. The contact of switch 991 is connected through switch 978 and the winding of potentiometer 980 to ground. The brush of potentiometer 980 is connected through resistor 995 to ground and through switch 989, resistor 993 and resistor 994 to ground. When the muzzle velocity is larger than normal, switches 991 and 981 are operated and switches 984 and 985 are on their upper contacts. The brush of potentiometer 980 is then connected through switch 981 and the upper section of the winding of potentiometer 983 to ground. When the muzzle velocity is less than normal, switches 996 and 998 are operated respectively short-circuiting resistors 990 and 994. Switch 991 is opened inserting resistor 997 in series with resistors 990 and 992, switch 982 is operated, connecting the brush of potentiometers 980 to the lower section of the winding of potentiometer 983, and switches 984 and 985 are operated to their lower contacts. When firing with HE shell, the source 975 is connected through resistor 976 to the blade of switch 977, Switch 977 is placed on its right-hand contact and switch 978 is placed on its upper contact and switch 1140 is closed. The source 975 is connected through the resistor 976, switch 977, resistor 1136, resistor 1137, resistor 1138 and resistor 1139 to ground. The junction of resistors 1137 and 1138 is connected through switch 978 to the upper end of the winding of potentiometer 980. The brush of potentiometer 980 is connected through switch 1140, resistor 1141 and resistor 1142 to ground, and is also connected through resistor 986 to ground. If the muzzle velocity is larger than normal, switch 981 is closed and switches 984 and 985 are on their upper contacts. The brush of potentiometer 980 is then connected to the upper portion of the winding of potentiometer 983. If the muzzle velocity is less than normal, switches 984 and 985 are on their lower contacts, and switches 982, 1143, 1144, 1145, 1146 and 1147 are closed. Switches 1145, 1146 and 1147 respectively short-circuit resistances 1137, 1138 and 1142. The upper end of the winding of potentiometer 980 is connected through switch 1144, resistor 1148 and switch 1143 to a tap in the winding of potentiometer 980.

The brush of potentiometer 983 could be adjusted to select a voltage proportional to the muzzle velocity of the second gun, but this would entail making a separate adjustment for this value. It is more convenient to have the brush of potentiometer 983 adjusted to the muzzle velocity of the first gun, as this brush may then be ganged to move with the adjustment of the brush of potentiometer 1077, Fig. 8. The brush of potentiometer 980, Fig. 6, is connected through resistor 1149 having a resistance of 48,000 ohms and the winding of potentiometer 1150 to ground. The brush of potentiometer 1150 is adjusted to the value of the difference in muzzle velocity between the second gun and the first gun and may conveniently be ganged to operate with the brush of potentiometer 1128, Fig. 7. The brush of potentiometer 1150 is connected to the upper contacts of switch 1151 and the lower contacts of switch 1152, the lower contacts of switch 1151 and the upper contacts of switch 1152 being grounded. If the muzzle velocity of the second gun is larger than the muzzle velocity of the first gun, switches 1151 and 1152 are placed on their upper contacts, and if the muzzle velocity of the second gun is less than the muzzle velocity of the first gun, switches 1151 and 1152 are placed on their lower contacts. The blade of switch 1151 is connected through resistor 1153 to the input circuit of amplifier 641, and the blade of switch 1152 is connected through resistor 1154 to the input circuit of amplifier 644.

The output circuits of amplifiers 574 and 589, Fig. 5, are respectively connected by connections 1167 and 1168 to the end of the winding of potentiometer 1169, having a mid-point grounded. The brush of potentiometer 1169 is adjusted by the ranging officer as a range spot and is connected through resistor 1170 to the input circuit of amplifier 644.

Thus voltages proportional to the sum of the range components of the differential ballistic effect have been supplied to amplifier 641, Fig. 6, either directly, or through amplifier 644.

The output circuit of amplifier 589, Fig. 5, produces a voltage proportional to −RF2, and is connected by connection 1168 through resistor 1171, Fig. 6, to the input circuit of amplifier 641.

The circuit elements for producing the balancing voltage proportional to the range RV2, to the virtual target for the second gun are similar to the elements for producing a voltage proportional to the range RV1 to the virtual target for the first gun.

When firing with the subcaliber weapon, switches 1157 and 1160 are closed and switch 1160 is on the upper contact. A source of voltage 1155 is connected from ground through switch 1157, resistor 1158, and to the brush of potentiometer 1161 and through the winding of potentiometer 1161 to ground. The contact of switch 1160 is connected through resistor 1159 to ground. The blade of switch 1160 is connected through resistor 1166 to the input circuit of amplifier 641. When firing with the larger weapon, switch 1162 is closed and switch 1160 is on the lower contact. The source 1155 is connected from ground through the source 1156, switch 1162, resistor 1163 to the brush of potentiometer 1165 and through the winding of potentiometer 1165 to ground. The contact of switch 1160 is connected through resistor 1164 to ground and the blade of switch 1160 is connected through resistor 1166 to the input circuit of amplifier 641. The output circuit of amplifier 641 is connected through the winding of potentiometer 1172 to ground. The brush of potentiometer 1172 is connected to a control circuit 1173 of the type shown in Fig. 12. A source of two-phase power 1174 has one phase connected directly to one winding of a two-phase motor 1175, and the other phase connected through the control circuit 1163 to the other winding of motor 1175. The wipers of potentiometers 660, 980, 1161 and 1165, are rotated by the shaft of motor 1175, but are insulated therefrom and from each other. If the output of amplifier 641 is not equal to zero, current will be supplied to the control circuit 1173 starting the motor 1175 and rotating the brushes of potentiometers 660, 980, 1161 and 1165, until the output voltage of amplifier 641 has been reduced to zero and the shaft of motor 1175 has been turned through the angle B2, the ballistic elevation for the second gun.

The output circuit of amplifier 574, Fig. 5, produces a voltage proportional to +RF2, and is connected by connection 1167 through the winding of potentiometer 1176, Fig. 6, to ground. The brush of potentiometer 1176 is rotated by the shaft of motor 1175 to select a voltage proportional to +RF2B2 and is connected by connection 1177 through resistor 1178, Fig. 5, to the input circuit of amplifier 1179, of the type shown in Fig. 11 having a feedback resistance 1180. The brush of potentiometer 1129, Fig. 7 selects a voltage proportional to −H, the height of site, and is connected by connection 1129 through resistor 1181, Fig. 5, to the input circuit of amplifier 1179. The output circuit of amplifier 589 is connected through the left portion of the winding of potentiometer 1182 to ground. The output circuit of amplifier 574 is connected through resistor 1183 to the right-hand portion of the winding of potentiometer 1182. The winding of potentiometer 1182 is similar to the winding of potentiometer 960. The brush of potentiometer 1182 is connected through resistor 1184 to the input circuit of amplifier 1179. The output circuit of amplifier 1179 is connected through the winding of potentiometer 1185 to ground. The brush of potentiometer 1185 is connected to a control circuit 1186 of the type shown in Fig. 12. A source of two-phase power 1187 has one phase connected to one winding of a two-phase motor 1188 and the phase connected through the control circuit 1186 to the other winding of motor 1188. The brush of potentiometer 1182 is rotated by the shaft of motor 1188, but is insulated therefrom. If the output voltage of amplifier 1179 is not equal to zero, current will be supplied to the control circuit 1186, starting the motor 1188 and rotating the brush of potentiometer 1182 until the output of amplifier 1179 has been reduced to zero, thus rotating the brush of potentiometer 1182 to the angle E2, the quadrant elevation of the second gun. This angle may be indicated as by the dial 1189 and is transmitted by the usual synchronous transmission circuit to the gun.

The apparatus for balancing the data transmission lines is claimed in United States application Serial No. 451,857, filed July 22, 1942 by W. Koenig, Jr., now Patent Number 2,443,623; the apparatus for target relocation is claimed in United States application Serial No. 502,794, filed September 17, 1943, by W. H. Boghosian and H. G. Och, now Patent No. 2,432,504; the apparatus for computing the deflection angle is claimed in United States application Serial No. 523,171, filed February 19, 1944 by E. Lakatos, now Patent No. 2,489,907; the apparatus for computing the elevation angle is claimed in United States application Serial No. 530,529, filed April 11, 1944 by E. Lakatos, now Patent No. 2,434,274; the apparatus for computing multiple ballistic functions with a single potentiometer is claimed in United States application Serial No. 570,284, filed December 29, 1944, by E. Lakatos; the apparatus for compensating for interactions between the ballistic effects is claimed in United States application Serial No. 570,285, filed December 29, 1944, by E. Lakatos, now U. S. Patent 2,414,819, patented January 28, 1947; and the apparatus for generating the target rate and position is claimed in United States application Serial No. 570,282, filed December 29, 1944 by D. C. Bomberger, W. E. Ingerson and H. G. Och; all of the above-mentioned applications being assigned to the assignee of the present application.

What is claimed is:

1. In apparatus for directing a shell from a gun to the predicted position of a target, a source of voltage, means energized by said source to produce a voltage proportional to the rate of change in a coordinate of the present position of said target, an amplifier having an input circuit connected to said means and an output circuit, a fractionating network having an input circuit connected to the output circuit of said amplifier and an output circuit, said network including means for selecting a portion of the output of said amplifier proportional to the tabular values of the normal time of flight of said shell to the predicted position of said target, a corrective network having an input circuit connected to the output circuit of said fractionating network and an output circuit, said corrective network including means for selecting portions of the output of said fractionating network respectively proportional to the differential ballistic effects affecting the time of flight of said shell, summing means connected to the outputs of said fractionating and said corrective networks to algebraically add the outputs of said networks, and computing means connected to said summing means.

2. In apparatus for directing a shell from a gun to the predicted position of a target, a source of voltage, means energized by said source to produce a voltage proportional to the rate of change in a coordinate of the present position of said target, an amplifier having an input circuit connected to said means and an output circuit, a fractionating network having an input circuit connected to the output circuit of said amplifier and an output circuit, said network including means for selecting a portion of the output of said amplifier proportional to the tabular values of the normal time of flight of said shell to the predicted position of said target, a corrective network having an input circuit connected to the output circuit of said fractionating network and an output circuit, said corrective network including means for selecting portions of the output voltage of said fractionating network respectively proportional to the differential ballistic effects affecting the time of flight of said shell, thermionic means connected to the output circuits of said networks to algebraically add said selected voltages, and computing means connected to said thermionic means.

3. The combination in claim 2 in which the voltage amplification of said amplifier is adjusted to make the output voltage proportional to the maximum time of flight of said shell minus the maximum corrections of the time of flight due to the differential ballistic effects.

4. In apparatus for directing a shell from a gun to the predicted position of a target including mechanism moving proportionally to the elevation of said gun, a source of voltage, means energized by said source to produce a voltage proportional to the rate of change in a coordinate of the present position of said target, an amplifier having an input circuit connected to said means and an output circuit, a fractionating network having an input circuit connected to the output circuit of said amplifier and an output circuit, said network including means driven by said mechanism to vary the output of said network proportionally to the tabular values of the normal time of flight of said shell to the predicted position of said target, a resistor, a potentiometer having a winding connected in series with said resistor across the output circuit of said network and a brush adjusted to select a voltage proportional to a ballistic effect, thermionic means connected to the output circuit of said network and the brush of said potentiometer, and computing means connected to said thermionic means.

5. The combination in claim 4 in which the amplification of said amplifier is proportional to the maximum normal time of flight of said shell minus the maximum value of said effect, and the resistance of the winding of said potentiometer is to the sum of the resistances of said resistor and said winding as twice the maximum value of said effect is to the maximum time of flight minus the maximum value of said effect.

6. In apparatus for directing a shell from a gun to the predicted position of a target including mechanism moving proportionally to the elevation of said gun, a source of voltage, means energized by said source to produce a voltage proportional to the rate of change in a coordinate of the present position of said target, an amplifier having a grounded input circuit connected to said means and a grounded output circuit, a first potentiometer having a grounded winding and a first brush moved by said mechanism, a first plurality of resistors connected in serial relationship from said output circuit to the winding of said potentiometer, a second plurality of resistors connected from said first brush to ground, computing means, a summing amplifier having an input circuit connected to said brush and an output circuit connected to said computing means, a plurality of networks connected from said brush to ground, each network including a plurality of resistors and a potentiometer having a winding connected in serial relationship with said latter resistors to said first brush and a brush connected to the input circuit of said summing amplifier and adjusted to the value of a ballistic effect, and switching means for, at will, short-circuiting some of the resistors of said pluralities of resistors, the winding of said first potentiometer having a variation of resistance such that when associated by said switching means with one combination of resistors, the sum of the voltages supplied to said summing amplifier varies functionally with the time of flight of one type of shell, and when associated with another combination of resistors the sum of the voltages varies functionally with the time of flight of another type of shell.

EMORY LAKATOS.
HENRY G. OCH.

REFERENCES CITED

The following references are of record in the file of this patent:

UNITED STATES PATENTS

| Number | Name | Date |
|---|---|---|
| 2,399,726 | Doyle et al. | May 7, 1946 |
| 2,411,511 | Abel | Nov. 26, 1946 |
| 2,414,102 | Hull et al. | Jan. 14, 1947 |

FOREIGN PATENTS

| Number | Country | Date |
|---|---|---|
| 164,765 | Great Britain | June 23, 1921 |